(12) United States Patent
Kurohori et al.

(10) Patent No.: US 6,845,835 B2
(45) Date of Patent: Jan. 25, 2005

(54) SEAT HOLDING STRUCTURE FOR A TWO-WHEEL VEHICLE AND TWO-WHEEL VEHICLE

(75) Inventors: Seiichi Kurohori, Saitama (JP); Hiromi Furuhashi, Saitama (JP); Yutaka Murata, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/210,044

(22) Filed: Aug. 2, 2002

(65) Prior Publication Data

US 2003/0075372 A1 Apr. 24, 2003

(30) Foreign Application Priority Data

Sep. 4, 2001 (JP) ........................................ 2001-268114

(51) Int. Cl.$^7$ .................................................. B62J 1/00
(52) U.S. Cl. ..................... 180/219; 297/195.1; 248/425
(58) Field of Search ................................. 180/219, 272, 180/273; 248/425, 157, 599, 407; 297/215.13, 338, 344.18, 195.1; 403/373, 374.1, 374.2, 109.1, 110, 377; 280/226.1

(56) References Cited

U.S. PATENT DOCUMENTS 4,067,589 A * 1/1978 Hon ........................... 280/278
5,423,393 A * 6/1995 Felt ............................ 180/221
5,957,551 A * 9/1999 Maron et al. ............... 303/191
6,457,545 B1 * 10/2002 Michaud et al. ............ 180/272
6,478,278 B1 * 11/2002 Duncan ...................... 248/407
6,499,800 B2 * 12/2002 Morgan, Jr. ............. 297/195.1
6,557,878 B2 * 5/2003 Chen ....................... 280/226.1

FOREIGN PATENT DOCUMENTS

JP          11020767 A      1/1999

* cited by examiner

Primary Examiner—Lesley D. Morris
Assistant Examiner—Tony Winner
(74) Attorney, Agent, or Firm—Birch, Stewart, Kolasch & Birch, LLP

(57) ABSTRACT

A seat holding mechanism for a two-wheel vehicle for holding a seat rotatably in the horizontal direction at a predetermined height. The seat holding mechanism is disposed on the side of the seat. The seat holding mechanism allows the seat to be to be fixed at another height, so that when the vehicle is in a driving mode, the seat is prevented from rotating and the riding state can be assured. By adjusting the seat at the predetermined height in a non-driving mode, the seat can rotate in the horizontal direction. Consequently, in the non-driving mode the seat can be used as a chair, thereby improving the attractiveness of the vehicle. The two wheel vehicle with the seat holding structure has a foldable body, allowing it to be easily mounted in a four wheel-vehicle.

20 Claims, 57 Drawing Sheets

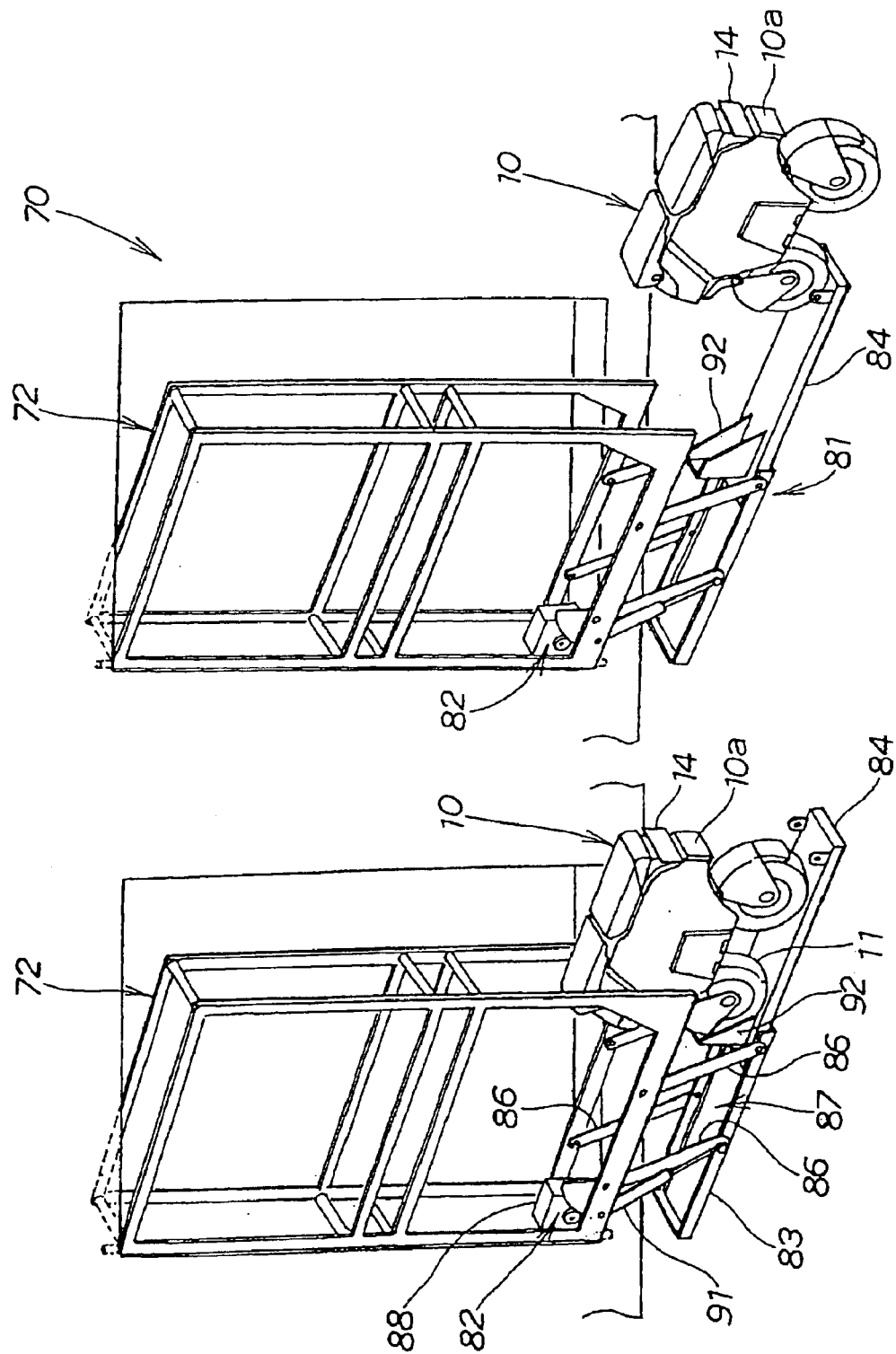

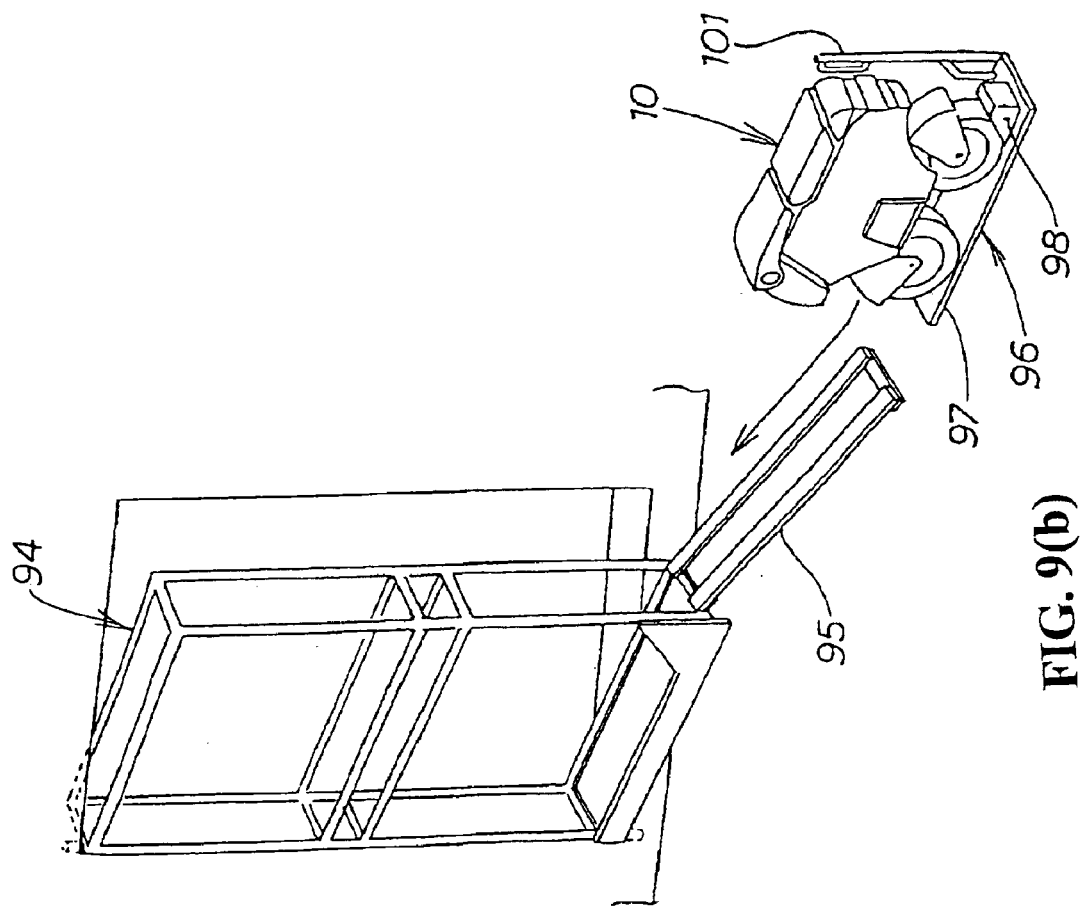
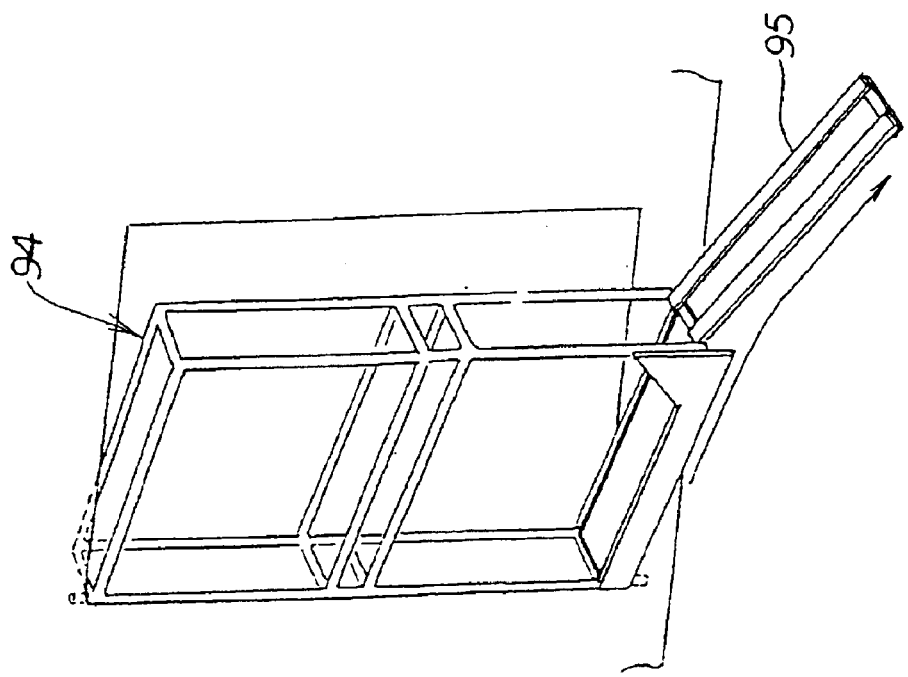
FIG. 9(a)
FIG. 9(b)

SEAT HOLDING STRUCTURE FOR A TWO-WHEEL VEHICLE AND TWO-WHEEL VEHICLE

CROSS-REFERENCE TO RELATED APPLICATION

The present application claims priority under 35 U.S.C. §119 to Japanese Patent Application No. 2001-268114, filed on Sep. 4, 2001, the entire contents of which are hereby incorporated by reference.

BACKGROUND OF THE INVENTION

1. Field of the Invention

The present invention relates to a seat holding structure for a two-wheel vehicle and to a two-wheel vehicle having enhanced commercial attractiveness.

2. Description of Background Art

Foldable two-wheel vehicles, or "foldable bicycles", have been disclosed in Japanese Unexamined Patent Application No. Hei-11-20767.

FIG. 1 of the publication illustrates a foldable bicycle in which a handle post 4 is folded downward to the front above a head pipe 6, which is attached to a front end of a front frame 7. A front fork 3, a front wheel 1, and the handle post 4 are folded backward at the front end of a main frame 9. A saddle post inner 14, to which a saddle 15 is attached, is inserted into a saddle post outer 12; and a rear fork 10, to which a rear wheel 2, is attached can be folded forward at the rear end of the main frame 9.

Usually, the seat of a bicycle is constructed so as to be movable in the vertical direction, and no particular attention is paid to realize an attractive product.

In the conventional foldable bicycle, although the front wheel 1 side, the saddle post outer 12, and the rear wheel 2 side can be compactly folded to the main frame 9 in the center, the foldable bicycle itself in the folded state cannot be used for any purpose.

If value can be added to a bicycle, a two-wheel vehicle, or a foldable bicycle, enhanced commercial value and attractiveness are derived.

SUMMARY AND OBJECTS OF THE INVENTION

An object of the invention is, therefore, to obtain enhanced commercial value and product attractiveness for a two-wheel vehicle by improving a seat holding structure for a two-wheel vehicle and a two-wheel vehicle.

To achieve this and other objects, a seat holding structure is provided on a two-wheel vehicle, for holding a seat at a seat post and capable of changing a position in the vertical direction of the seat, characterized by including a seat holding mechanism for holding the seat so as to be rotatable in the horizontal direction at a predetermined height.

For example, when the seat is adjusted at the predetermined height so as to be rotatable in the horizontal direction and is adjusted and fixed at another height, by fixing the seat in the driving mode, the riding state can be assured. By adjusting the seat at the predetermined height in a non-driving mode, the seat can be rotated horizontally so that it can be used as a chair. Thus, new attractiveness of a product can be obtained.

Further, the seat holding mechanism has a quick release mechanism for quickly releasing holding of the seat at the seat post. This quick release mechanism is capable of both fixing the seat at the seat post so as not to be rotatable by fitting a bolt of the quick release mechanism into a horizontal groove formed in the seat post at a seat height in a driving mode, and also holding the seat at the seat post so as to be rotatable by fitting the bolt into an annular groove formed in the periphery of the seat post at the predetermined height.

By the quick release mechanism, operation of changing the position in the vertical direction of the seat is facilitated, and the seat can be held rotatably or fixed with the simple structure.

In addition, the seat holding mechanism has detecting means for detecting the predetermined height of the seat, and control means for controlling the vehicle so that the vehicle cannot be driven in response to a detection signal generated when the detecting means detects the predetermined height.

Therefore, in a state where the seat can be used as a chair, the driving of the vehicle can be prevented.

The two-wheel vehicle having the seat holding structure described above, is provided with a vehicle body that is foldable. Thus, the folded two-wheel vehicle can be easily mounted on a four-wheel vehicle.

After the two-wheel vehicle is mounted on the four-wheel vehicle, by attaching the seat to the seat post so as to be rotatable in the horizontal direction, the seat can be used as a chair in the four-wheel vehicle. Thus, the added value of the onboard two-wheel vehicle can be increased.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 7(*a*) and 7(*b*) are action diagrams (of the latter half) for explaining the action of loading/unloading of the two-wheel vehicle according to the invention and the configuration for the action;

FIGS. 9(a) and 9(b) are action diagrams (of the first half) for explaining another action of loading/unloading of the two-wheel vehicle according to the invention and the configuration for the action;

DETAILED DESCRIPTION OF THE PREFERRED EMBODIMENTS

Figure 1:
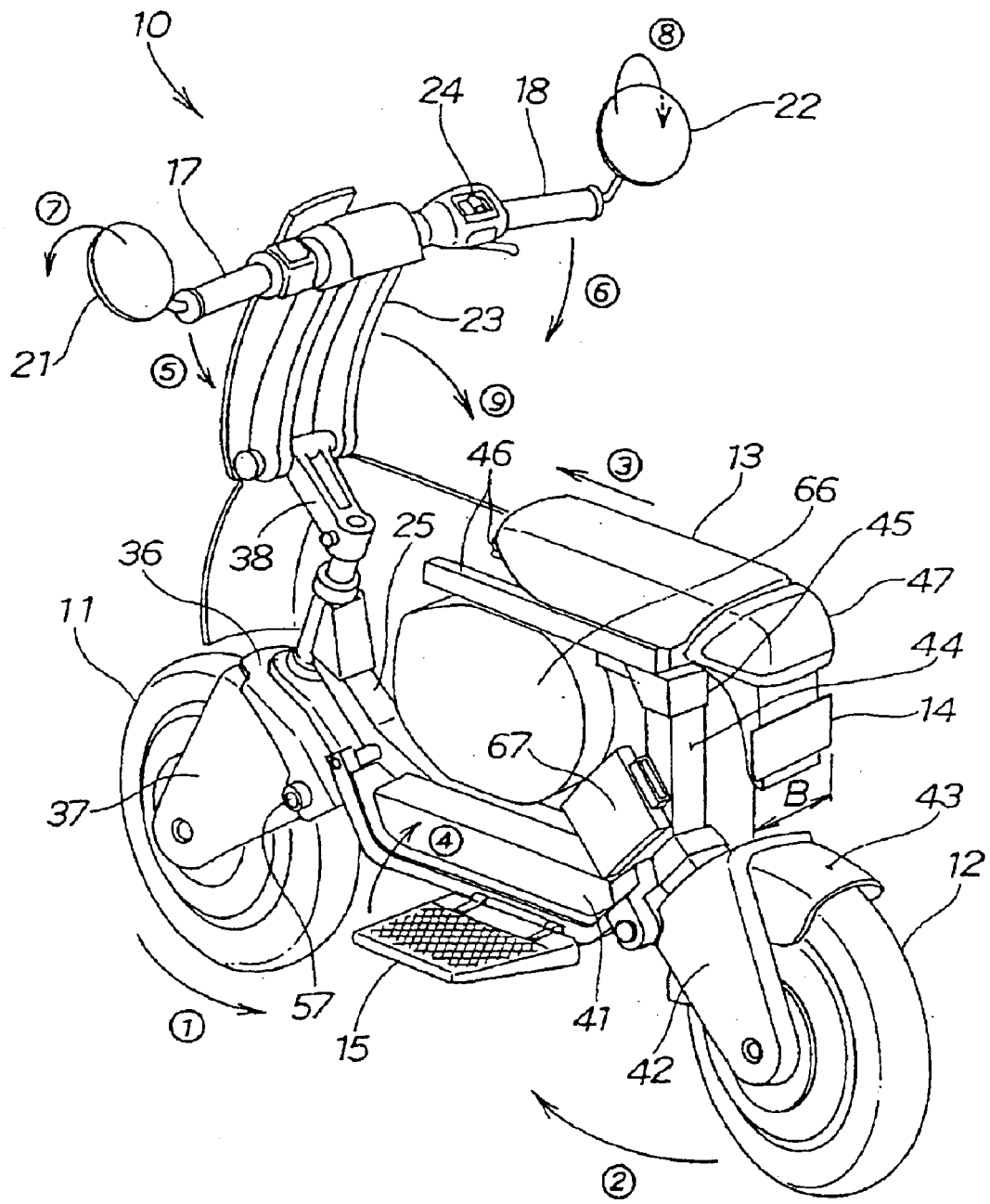
FIG. 1 is a perspective view of a foldable two-wheel vehicle according to the invention.

FIG. 1 is a perspective view of a foldable two-wheel vehicle according to the invention. A foldable two-wheel vehicle 10 (hereinbelow referred to as "two-wheel vehicle 10") is a foldable vehicle whose outside dimension can be reduced by folding a part of the vehicle and can be mounted on, for example, a four-wheel vehicle.

In the two-wheel vehicle 10, a front wheel 11 and a rear wheel 12 can be moved, that is, folded in the directions of the arrows ① and ②, a seat 13 is moved forward (the direction of the arrow ③), projected portions such as steps 15 and 16 (the step 16 on the depth side is not shown) on which the driver put his/her feet, handlebars 17 and 18, and rear-view mirrors 21 and 22 are folded in the directions of the arrows ④ to ⑧, respectively, so as to be within the width B of a license number plate 14 (hereinbelow, simply described as "number plate 14") attached to the rear part, and a handle post 23 for supporting the handlebars 17 and 18 can be folded toward the rear portion of the vehicle (direction of the arrow ⑨).

A motor operating switch 24 (folding switch) is provided for the handlebar 18 to operate an electric motor, which will be described hereinlater, provided in the rear wheel 12 at low speed to fold the front and rear wheels 11 and 12 or to unfold the front and rear wheels 11 and 12 to the original positions in a driving mode from the folded state (hereinbelow, the operation will be expressed as "unfolding of the front and rear wheels 11 and 12"). When a not-shown movable portion of the motor operating switch 24 is moved toward the side written as "fold", the front and rear wheels 11 and 12 can be folded. When the movable portion is moved to the side written as "unfold", the front and rear wheels 11 and 12 can be unfolded.

Figure 2:
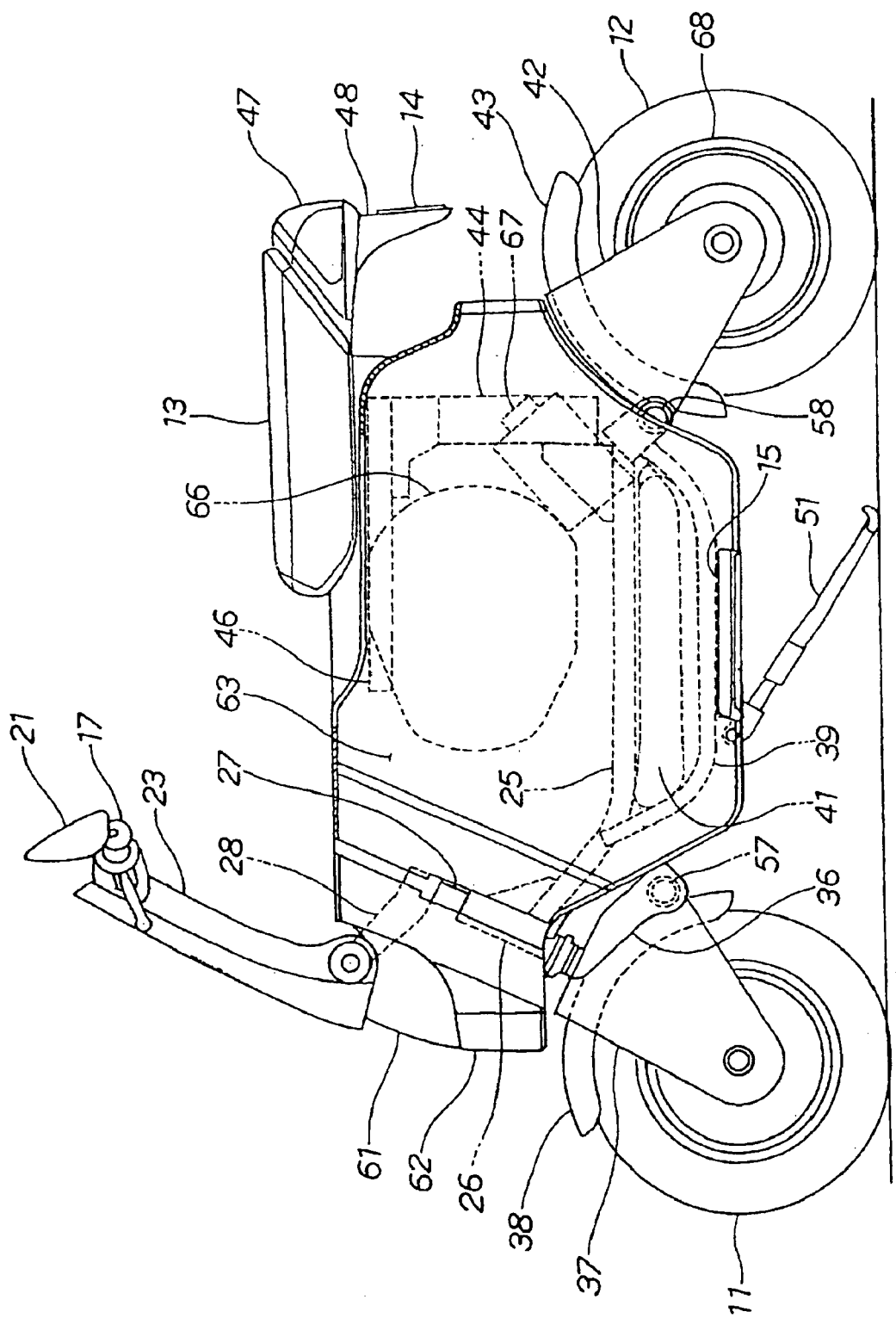
FIG. 2 is a side view of the two-wheel vehicle according to the invention.

FIG. 2 is a side view of the two-wheel vehicle according to the invention. In the two-wheel vehicle 10, a head pipe 26 is attached to the front end of a body frame 25, a handle shaft 27 is rotatably attached to the head pipe 26, an upper arm 28 is attached to the upper end of the handle shaft 27, and the handle post 23 is attached to the upper arm 28 so as to be swingable in the longitudinal direction of the body. A pair of right and left handlebars 17 and 18 (the handlebar 18 on the depth side also serves as an accelerator, refer to FIG. 1) is attached on the handle post 23 so as to be foldable to the inside in the lateral direction, and the rear-view mirrors 21 and 22 (the rear-view mirror 22 on the depth side is not shown) are attached to the tips of the handlebars 17 and 18, respectively, so as to be turnable in the front/rear directions with respect to the axes of the handlebars as a center. A lower arm 36 is attached to the lower end of the handle shaft 27, a front swing arm 37 for holding the front wheel 11 from the left side is swingably attached to the rear part of the lower arm 36, the front wheel 11 is rotatably attached to the end of the front swing arm 37, and the upper portion of the front wheel 11 is covered with a front fender 38 attached to the swing arm 37.

In the two-wheel vehicle 10, a pair of right and left under frames 39 are attached to the lower portion of the body frame 25, a pair of right and left batteries 41 are attached on the under frames 39, a rear swing arm 42 as a rear wheel supporting member is swingably attached to the rear part of the body frame 25, the rear wheel 12 is rotatably attached to the tip of the rear swing arm 42, and the upper portion of the rear wheel 12 is covered with a rear fender 43. A seat post 44 is vertically provided in the rear part of the body frame 25, a seat frame 45 and a pair of right and left seat rails 46 are attached to the upper end of the seat post 44, and the seat 13 is attached to the seat rails 46 so as to be slidable in the longitudinal direction of the body. A tail lamp 47 is integrally attached to the rear portion of the seat 13, the number plate 14 is attached under the tail lamp 47 via a bracket 48, a stand 51 is attached to the left under frame 39 in the lower part of the body frame 25 so as to be turnable in the vertical direction, and the floor-like steps 15 and 16 (the step 16 on the depth side is not shown) are attached to the lower portions on the right and left sides of the body frame 25 so as to be able to turn upward.

Also shown are a front swing shaft 57 for the front swing arm 37, a rear swing shaft 58 for the rear swing arm 42, a head lamp 61, a front cover 62, express side covers 63, 64 on the right and left sides of the body (the side cover 64 on the depth side is not shown). In a state where the right and left side covers 63 and 64 are attached to each other, an opening is formed between the seat rails 46 and 46 under the seat, and a space is formed between the right and left side covers in the opening, in which a helmet or things are put. A housing net 63 houses small articles, and is provided below the seat rails 46 by being hooked on the seat rails. A control unit 67 is attached to the seat post 44.

The rear wheel 12 is a wheel of a wheel-in motor, such that an electric motor, to be described hereinlater, which is driven by the battery 41 and the control unit 67 is housed in a wheel 68.

The seat 13 is slid from a riding position shown in the drawing to the rear part of the body, thereby opening the housing net 66. From the opening, small articles and the like can be put into the housing net 66.

The folding action of the two-wheel vehicle 10 will be described briefly.

Figure 3:
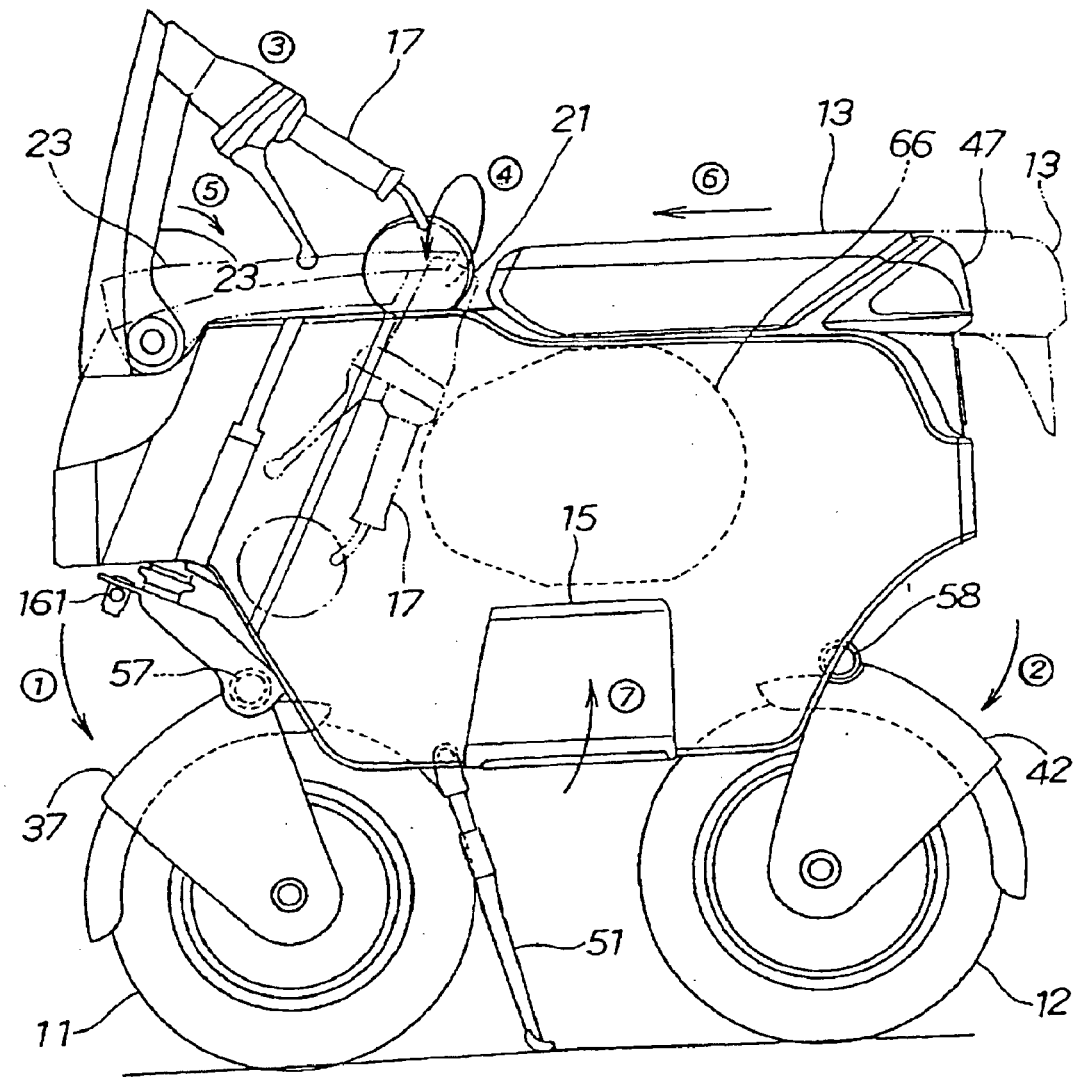
FIG. 3 is an action diagram illustrating folding of the two-wheel vehicle according to the invention.

FIG. 3 is an action diagram illustrating folding of the two-wheel vehicle according to the invention, and will be described in order in correspondence with the arrows ① to ⑦ shown in FIG. 1.

In a state shown in FIG. 2, first, the brake is applied on the front wheel 11 to lock the front wheel 11, and a switch is turned on for making the electric motor in the rear wheel operate. Specifically, the rear wheel 12 is rotated in the same rotating direction (forward rotation) as that in a driving mode. In FIG. 3, by the rotation, the rear wheel 12 approaches the front wheel 11, the front swing arm 37 on the front wheel 11 side and the rear swing arm 42 on the rear wheel 12 side swing in the directions of the arrows ① and ② around the front swing shaft 57 and the rear swing shaft 58 as a center, respectively. When the switch is turned on, the control unit releases the lock mechanism of the front and rear wheels and drives the motor in a procedure which will be described below.

As shown by ③, the handlebars 17 and 18 (the handlebar 18 on the depth side is not shown) are folded to the inside, the rear-view mirrors 21 and 22 (the rearview mirror 22 on the depth side is not shown) are folded as shown by the arrow ④, the handle post 23 is tilted to the rear portion of the body as shown by the arrow ⑤, and the handlebars 17 and 18 and the rear-view mirrors 21 and 22 are housed in the body via the opening. During the operation, the housing net 66 and the handlebars 17 and 18 do not interfere with each other, so that the folding operation can be performed in a state where articles are housed.

As shown by the arrow ⑥, the seat 13 is moved forward.

The steps 15 and 16 (the step 16 on the depth side is not shown) are jumped upward as shown by the arrow ⑦.

The operation of folding the two-wheel vehicle 10 is completed. The folding order is not limited to the above. For example, after moving the seat 13 forward, the handle post 23 may be tilted backward together with the folded handlebars 17 and 18.

By folding the front wheel 11 and the rear wheel 12, the minimum road clearance of the body becomes higher than that in the driving mode shown in FIG. 2. Consequently, the stand 51 is swung from the position shown in FIG. 2 to a downward position and fixed.

In a state where the two-wheel vehicle 10 is folded, the two-wheel vehicle 10 has an almost rectangular parallelepiped shape which is shallow in the width direction, and has a width almost equal to the width of 170 mm of the number plate of a motor-bike. Thus, the two-wheel vehicle 10 can be easily housed in a member of a four-wheel vehicle, particularly, an outer panel, so that both reinforcement of the four-wheel vehicle and mounting of the two-wheel vehicle can be achieved.

Figure 4:
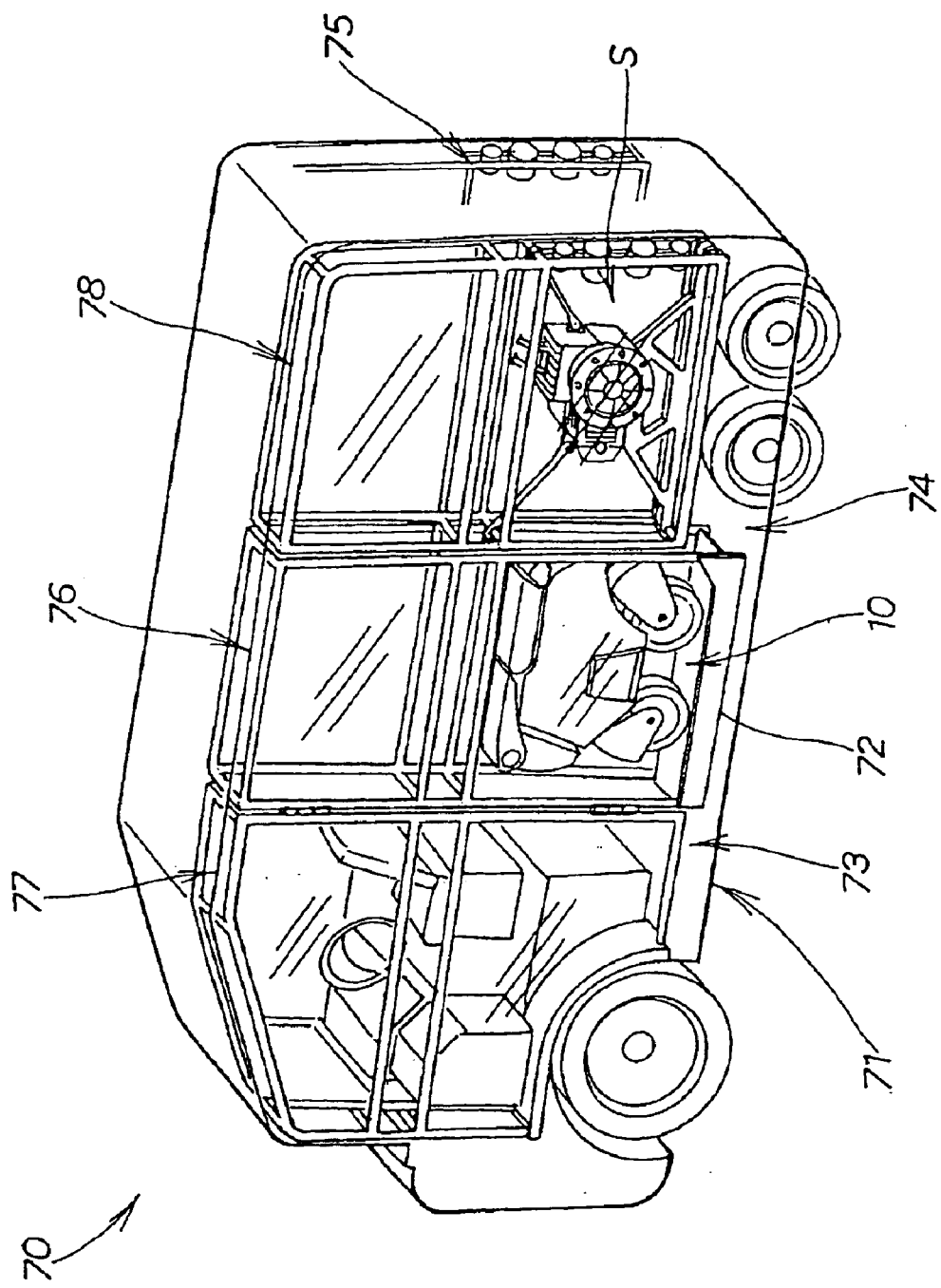
FIG. 4 is a perspective view showing the two-wheel vehicle according to the invention mounted on a four-wheel vehicle.

FIG. 4 is a perspective view showing a state where the two-wheel vehicle according to the invention is mounted on a four-wheel vehicle. It shows a state where the two-wheel vehicle 10 is housed in a door 72 attached to a side body 71 as a component of the body of a four-wheel vehicle 70.

The parts of the two-wheel vehicle 10 are folded so that the vehicle width is within the width of the number plate as described above, so that the width of a space for housing the two-wheel vehicle 10 can be reduced and the door 72 can be made thin. Therefore, the space in the compartment of the four-wheel vehicle 70 can be sufficiently assured.

The four-wheel vehicle 70 has outer panels 76, 77, and 78 made of transparent or semi-transparent outer-panel material (such as glass) in the door 72 having pipe members forming the outline as a body constructing member and side walls 73 and 74 as body constructing members. Consequently, the two-wheel vehicle 10 mounted on the four-wheel vehicle 70 can be seen from the outside. The design has a feature that it is known at a glance that the folded two-wheel vehicle 10 is mounted on the four-wheel vehicle 70. The attractiveness of the product can be improved and there is no worry that the user forgets to unload the two-wheel vehicle 10.

The four-wheel vehicle 70 also has an in-vehicle generator 301 disposed in a lower space S of the side wall 74. The in-vehicle generator 301 is a water-cooled four-cycle engine integrated multi-pole alternator having therein a starter. The details will be described hereinlater.

Figure 5:
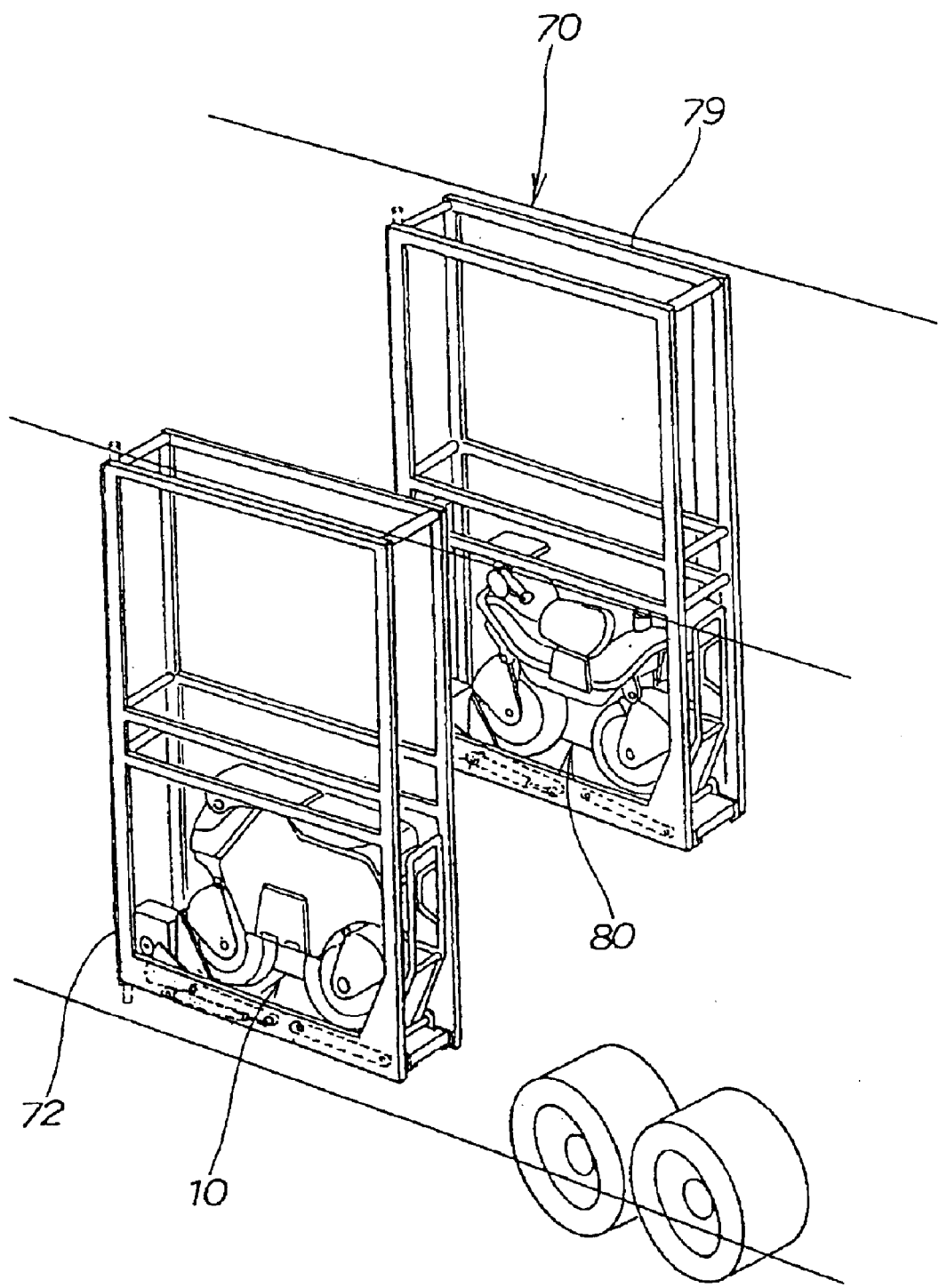
FIG. 5 is a perspective view showing two kinds of two-wheel vehicles according to the invention mounted on a four-wheel vehicle, FIGS. 6(*a*) and 6(*b*) are action diagrams (of the first half) for explaining the action of loading/unloading of the two-wheel vehicle according to the invention and the configuration for the action.

FIG. 5 is a perspective view showing two kinds of two-wheel vehicles mounted on a four-wheel vehicle according to the invention, and shows a state where the two-wheel vehicle 10 is housed in the left-side door 72 of the four-wheel vehicle 70, and a foldable two-wheel vehicle 80 (hereinbelow, simply described as "two-wheel vehicle 80") is housed in the right-side door 79. The two-wheel vehicle 80 will be described in detail hereinlater.

In such a manner, in the four-wheel vehicle 10, a plurality of two-wheel vehicles 10 and 80 can be disposed in the doors 72 and 79 or in other body constructing members.

Action of loading/unloading the two-wheel vehicle shown in FIG. 4 to/from a four-wheel vehicle will be described by referring to FIGS. 6 to 8.

Figure 6B:
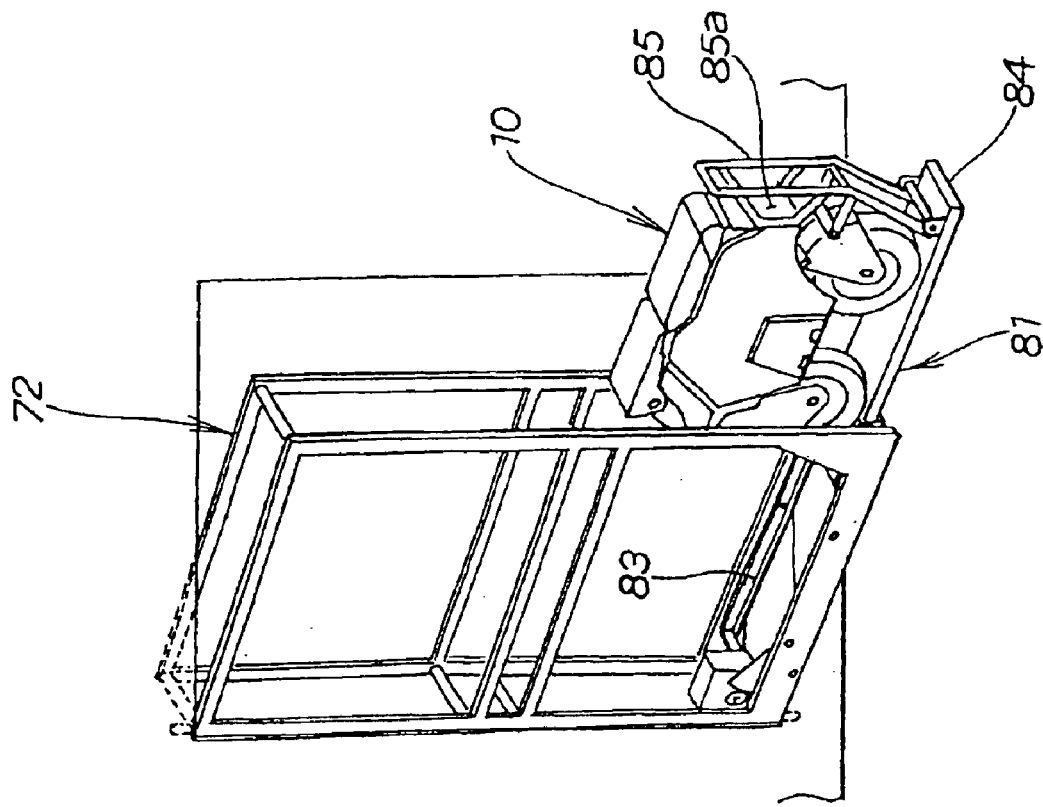
Figure 6A:
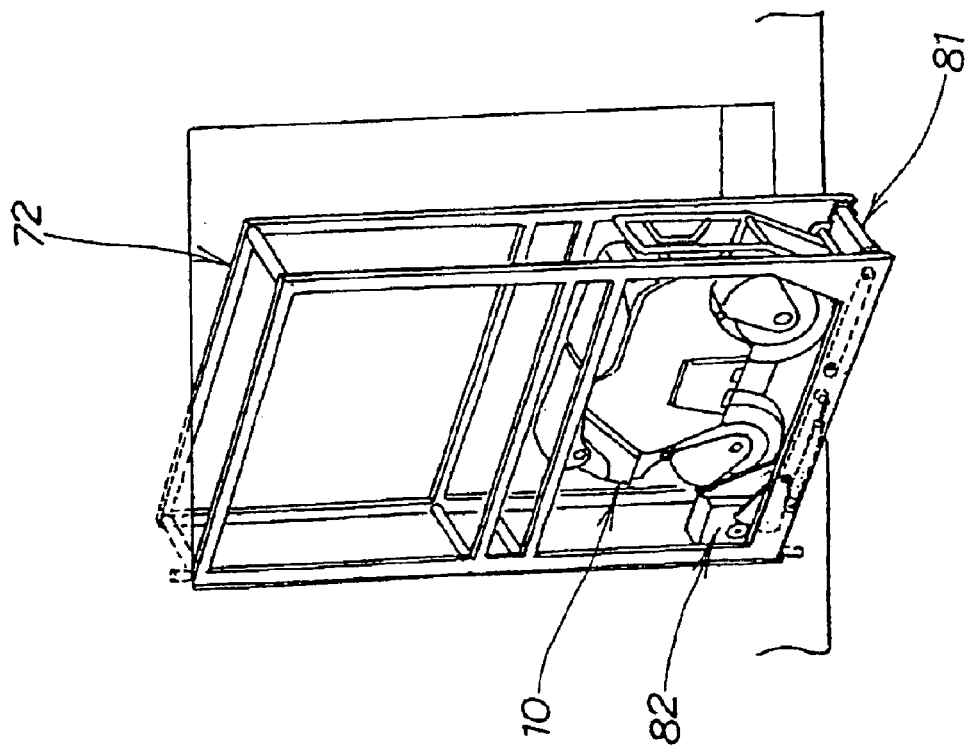

FIGS. 6(a) and 6(b) are action diagrams (of the first half) for explaining the action of loading/unloading the two-wheel vehicle according to the invention, and show the case of unloading the two-wheel vehicle.

In FIG. 6(a), first, the door 72 is opened and fixed in an open position at a predetermined angle (about 85°) by a not-shown door fixing mechanism so as not to be moved.

The door 72 has a sliding device 81 for allowing the two-wheel vehicle 10 to slide horizontally and a lifting device 82 for lifting the two-wheel vehicle 10.

In FIG. 6(b), the slide lock of the sliding device 81 is unlocked, and the two-wheel vehicle 10 is pulled out by the sliding device 81 from the inside of the door 72 by pulling of a pressing member which will be described hereinlater.

The sliding device 81 has a rail member 83 provided in the lower part of the door 72, a slide plate 84 which is slidably attached to the rail member 83 and on which the two-wheel vehicle 10 is placed, and a pressing member 85 detachably attached on the end of the slide plate 84, for pressing the rear part of the two-wheel vehicle 10. The pressing member 85 has a magnet 85a attracted by a metal member (which can be the number plate 14) or a magnet provided for the two-wheel vehicle 10.

FIGS. 7(a) and 7(b) are action diagrams (of the latter half) for explaining the action of loading/unloading the two-wheel vehicle according to the invention and the configuration for the action, and show the case of unloading the two-wheel vehicle.

In FIG. 7(a), the lifting device 82 provided for the door 72 is operated by a switch provided around a meter of the four-wheel vehicle (or the switch may be provided on the inside of the door) to move the rail member 83 down, thereby moving the two-wheel vehicle 10 placed on the slide plate 84 down, and the pressing member 85 (refer to FIG. 6(b)) is detached from the slide plate 84.

The lifting device 82 has parallel links 87 consisting of links 86 ... (" ... " indicates plurality, which will be used hereinbelow in the same way) attached to the rail member 83, a driving device 88 for driving the parallel links 87, and a gas damper spring 91 extending between the lower end of the door 72 and the rail member 83 to lessen the downward force acting on the parallel links 87. A stopper member 92 is attached to the front part of the slide plate 84 to stop the front wheel 11 of the two-wheel vehicle 10 so that the front wheel 11 does not move forward.

A magnet 10 is provided on the two-wheel vehicle 10 side, by which the pressing member 85 is attracted. The magnet 10(a) permits the loading and unloading to be performed more easily.

In FIG. 7(b), the stand (not shown) of the two-wheel vehicle 10 is set, and the two-wheel vehicle 10 is pulled down from the slide plate 84 and is let stand by itself. It completes the work of unloading the two-wheel vehicle 10 from the four-wheel vehicle 70.

To load the two-wheel vehicle 10 to the four-wheel vehicle 70, it is sufficient to reverse the above-described procedure.

As described above, by providing the door 72 with the sliding device 81 and the lifting device 82, the work of loading/unloading the two-wheel vehicle 10 to/from the four-wheel vehicle 70 can be performed easily and promptly.

Figure 8:
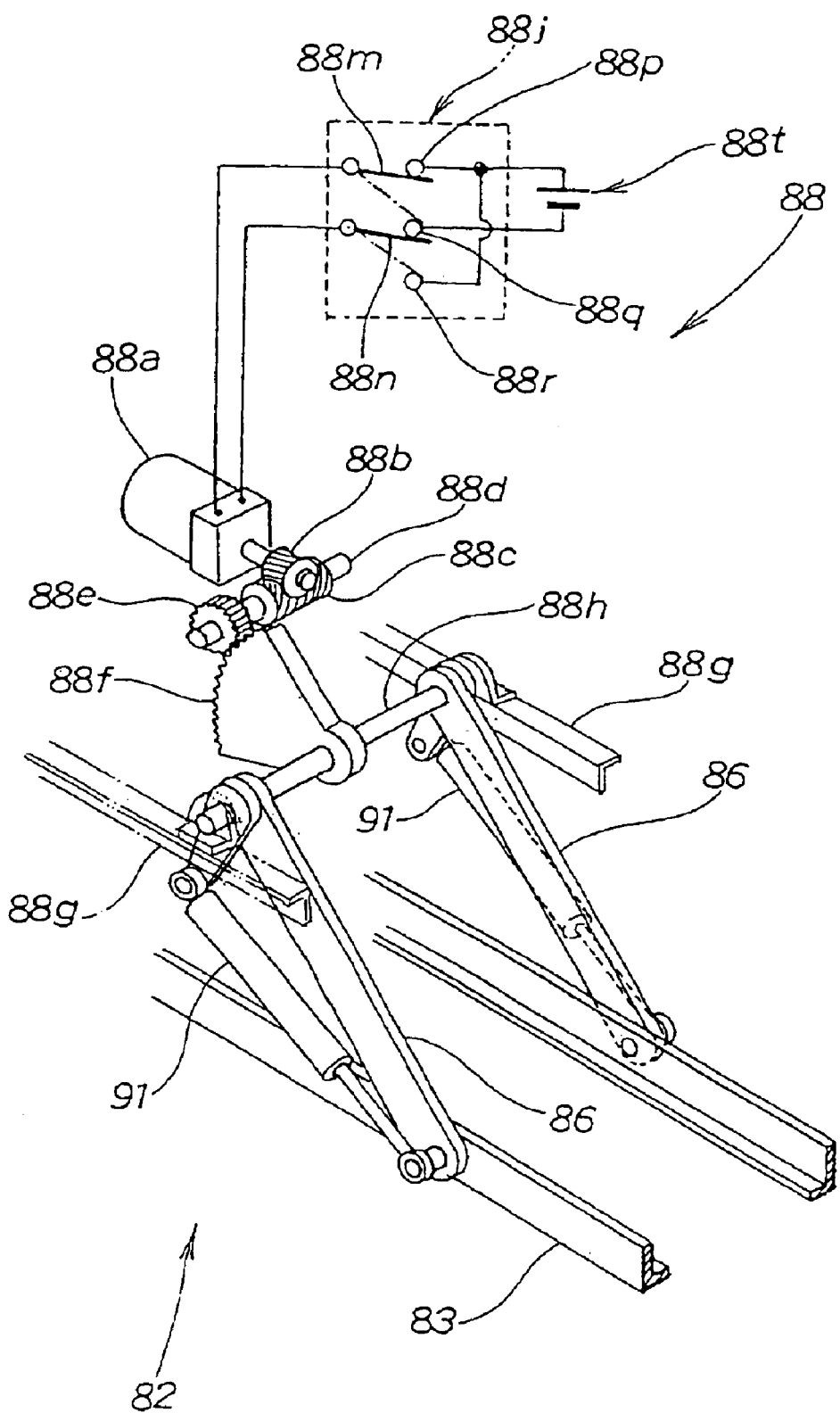
FIG. 8 is a perspective view showing a lifting device provided for a door of the four-wheel vehicle according to the invention.

FIG. 8 is a perspective view showing the lifting device provided for a door of the four-wheel vehicle according to the invention. The driving device 88 of the lifting device 82 includes an electric motor 88a as a power source; a first worm gear pair 88b coupled to the output shaft of the electric motor 88a; a second worm gear pair 88c engaged with the first worm gear pair 88b; a first shaft 88d integrally attached to the second worm gear pair 88c and whose both ends are rotatably attached in the door 72; a drive gear 88e attached to the first shaft 88d; a driven gear 88f having a fan shape engaged with the drive gear 88e; a second shaft 88h which is attached to the driven gear 88*f* and to which links 86 and 86 are integrally attached. Both ends of the driven gear 88*f* are rotatably attached to frames 88*g* and 88*g* in the door 72; and a lifting/descending change-over switch 88*j* (provided near the meter panel of the four-wheel vehicle or on the inside of the door) for switching the rotational direction of the electric motor 88*a*, that is, switching between lifting and descending of the rail member 83. Also shown are movable contacts 88*m* and 88*n*, fixed contacts 88*p*, 88*q*, and 88*r*, and battery 88*t*. Since the first and second gears take the form of worm gear pairs, even if a current is not passed to the electric motor, the position of the lifting device 82 can be held.

For example, if the rail member 83 moves down by passage of current from the battery 88*t* to the electric motor 88*a* when the movable contact 88*m* is connected to the fixed contact 88*p* and the movable contact 88*n* is connected to the fixed contact 88*q*, the rail member 83 moves up by passage of current from the battery 88*t* to the electric motor 88*a* when the movable contact 88*m* is connected to the fixed contact 88*q* and the movable contact 88*n* is connected to the fixed contact 88*r*.

FIGS. 9(*a*) and 9(*b*) are action diagrams (of the first half) for explaining another action of loading/unloading of the two-wheel vehicle according to the invention and the configuration for the action, and show the case of loading the two-wheel vehicle.

In FIG. 9(*a*), a door 94 of the four-wheel vehicle is opened, and a rail member 95 is pulled out from the door 94 and extended between the door 94 and the ground.

As described above, the door 94 has the rail member 95 which can be pulled out and extended between the ground and the door 94 at the time of loading/unloading of the two-wheel vehicle 10.

In FIG. 9(*b*), the two-wheel vehicle 10 is put on a trolley 96, and the trolley 96 is lifted along the rail member 95 in the direction of the arrow. It is also possible to preset the trolley 96 on the rail member 95 and put the two-wheel vehicle 10 on the rail member 95.

The trolley 96 has a placement part 97 on which the two-wheel vehicle 10 is placed, a rear stopper 98 provided in the rear portion of the placement part 97 in order to stop the rear wheel 12 of the two-wheel vehicle 10, a handle 101 upright from a side portion at the rear end of the placement part 97, and a plurality of rollers (not shown) provided on the under face of the placement part 97 so as to roll on the rail member 95.

Figure 10B:
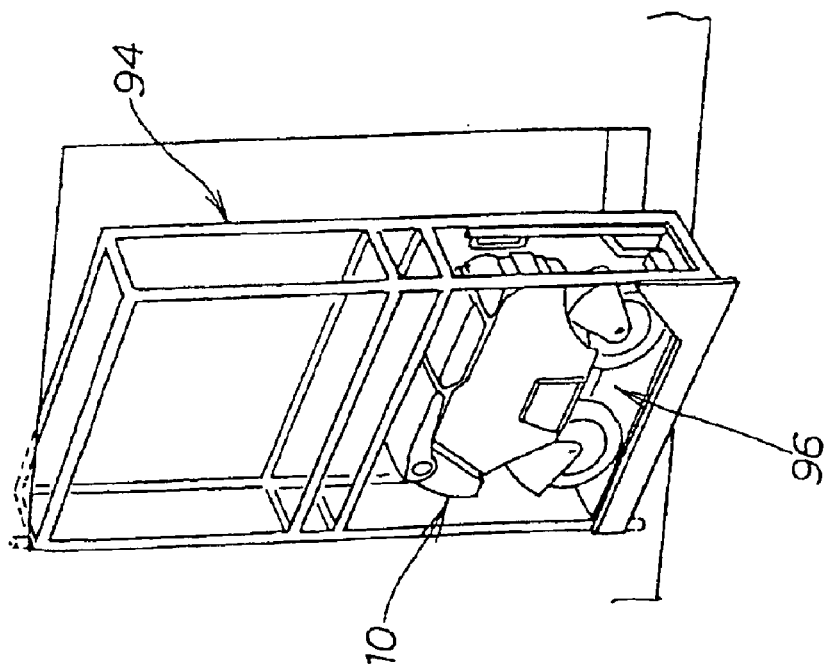
FIGS. 10(a) and 10(b) are action diagrams (of the first half) for explaining another action of loading/unloading of the two-wheel vehicle according to the invention and the configuration for the action.
Figure 10A:
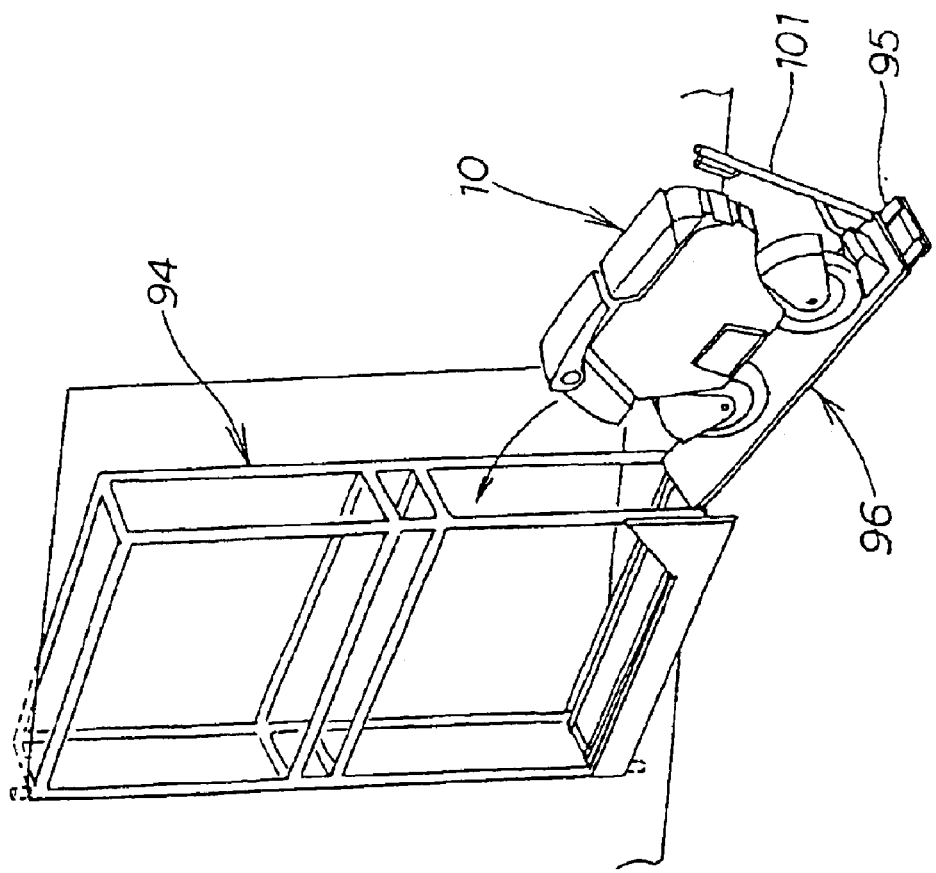

FIGS. 10(*a*) and 10(*b*) are action diagrams (of the latter half) for explaining another action of loading/unloading the two-wheel vehicle according to the invention and the configuration for the action, and show the case of loading the two-wheel vehicle.

In FIG. 10(*a*), the user grips the handle 101 to push the trolley 96 up onto the rail member 95 and push the two-wheel vehicle 10 together with the trolley 96 into the door 94 as shown by the arrow.

FIG. 10(*b*) shows a state where the two-wheel vehicle 10 placed on the trolley 96 is housed in the door 94. At this time, the two-wheel vehicle 10 is fixed by a not-illustrated locking mechanism so that the trolley 96 and two-wheel vehicle 10 do not move in the door 94. This completes the work of loading the two-wheel vehicle 10 into the four-wheel vehicle 70.

Although the two-wheel vehicle is mounted in the left-side door in the embodiment, the invention is not limited to this configuration. Obviously, the two-wheel vehicle can be similarly housed in the right-side door and a rear-side door, and the door may open to the outside or inside of the compartment. In the case where the door opens to the inside of the compartment, the two-wheel vehicle is once put into the compartment by using a ladder rail and housed into the door, so that the lifting mechanism in the door becomes unnecessary, resulting a light door.

As described above by referring to FIGS. 1 and 4, first, the two-wheel vehicle 10 can be folded within the width B of the number plate 14 and can be housed in any of the door 72, side walls 73 and 74, and rear wall 75 of the four-wheel vehicle 70.

Since the width of the two-wheel vehicle 10 is equal to or within the width B of the number plate, the housing space of the two-wheel vehicle 10 mounted in the four-wheel vehicle 70 can be reduced. The compartment space in the four-wheel vehicle 70 can be therefore sufficiently assured, and the work of mounting the two-wheel vehicle 10 onto the four-wheel vehicle 70 can be performed easily.

Second, as described by referring to FIGS. 1 and 3, the two-wheel vehicle 10 is folded almost in a rectangular parallelepiped by attaching the handle post 23 to the front part of the body so as to be foldable in the longitudinal direction of the body, attaching the handlebars 17 and 18 to the handle post 23 so as to be foldable in the vehicle width direction, attaching the steps 15 and 16 in the lower part on the sides of the body so as to be foldable in the vehicle width direction, attaching the front swing arm 37 for supporting the front wheel 11 to the body so as to be swingable to the rear part of the body, and attaching the rear swing arm 42 for supporting the rear wheel 12 to the body so as to be swingable to the front part of the body.

By folding the handle post 23, handlebars 17 and 18, steps 15 and 16, and front and rear wheels 11 and 12 to make the two-wheel vehicle 10 have a substantially rectangular parallelepiped shape, the housing space of the two-wheel vehicle 10 provided on the four-wheel vehicle 70 (refer to FIG. 4) side may also have an rectangular parallelepiped shape, so that the flexibility in designing of the housing space can be increased.

Figure 37:
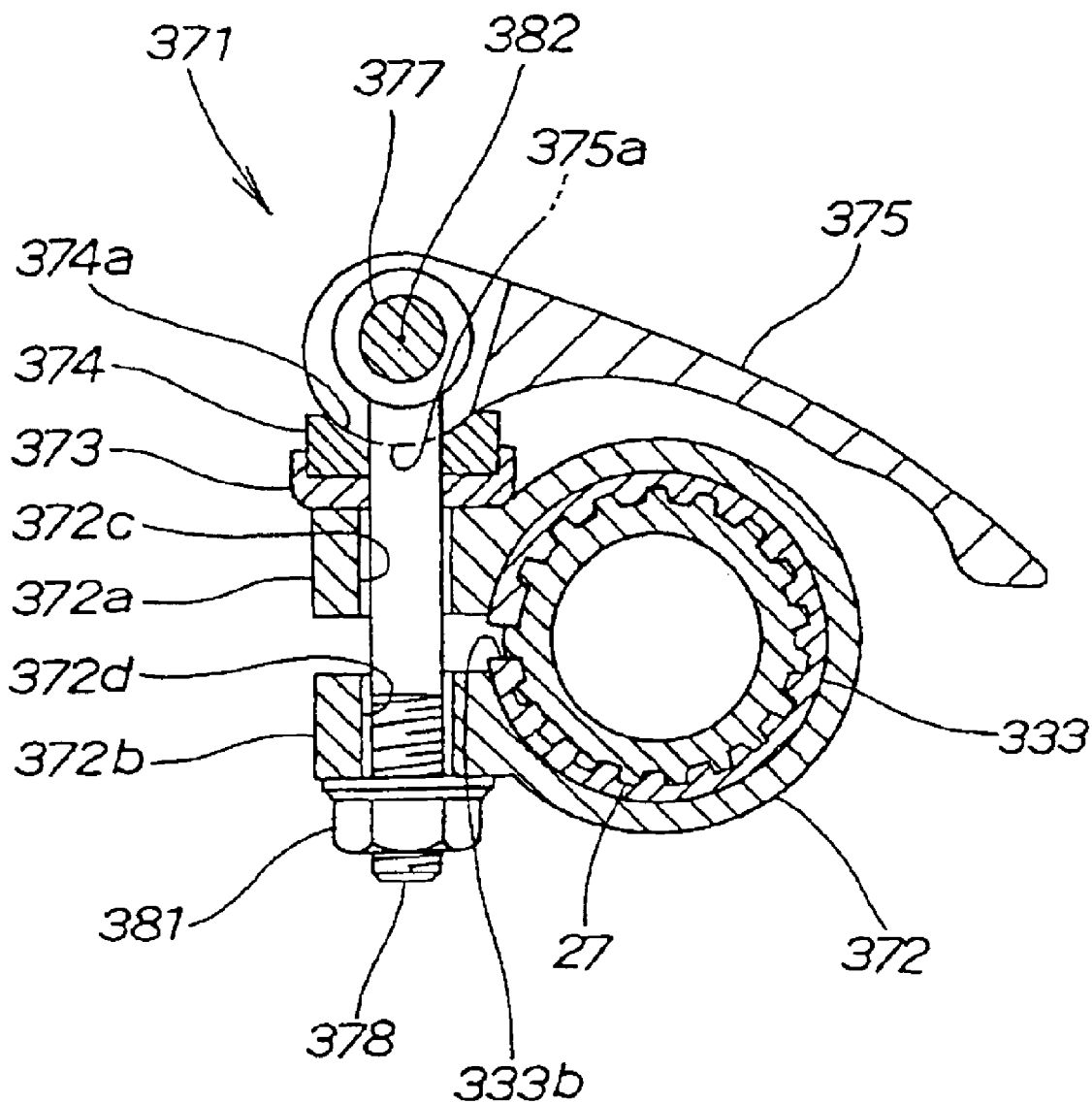
FIG. 37 is a cross section taken along line 37—37 of FIG. 36.

Third, in FIG. 1 and FIG. 37, the rear-view mirrors 21 and 22 are provided at the ends of the handlebars 17 and 18, and the rear-view mirrors 21 and 22 are turnably attached to the handlebars 17 and 18 so that the interval of them becomes almost equal to the spacing in the vehicle width direction of the handlebars 17 and 18 when the handlebars 17 and 18 are folded.

By attaching the rear-view mirrors 21 and 22 provided at the ends of the handlebars 17 and 18 so as to be turnable around the handlebars 17 and 18, the portions of the handlebars 17 and 18 can be folded more compactly.

Fourth, as described in FIG. 4, as the body constructing members of the four-wheel vehicle 70, the side walls 73, 74, and rear wall 75 are used.

By using the side walls 73 and 74 and the rear wall 75 of the four-wheel vehicle 70 as the body constructing members each for housing the two-wheel vehicle 10, the two-wheel vehicle 10 can be used as a member for reinforcing any of the side walls 73 and 74 and rear wall 75. By housing the two-wheel vehicle 10 having a narrow width in the side wall 73 or 74 or the rear wall 75, for example, as compared with the case of housing the two-wheel vehicle 10 in a part of the compartment, a larger compartment space can be obtained. Thus, the compartment space can be more effectively used.

Fifth, as shown in FIG. 4, at least one of the transparent outer panels 76, 77, and 78 is used for corresponding one of the door 72, side walls 73 and 74, and rear wall 75 of the four-wheel vehicle 70.

With the configuration, the two-wheel vehicle 10 mounted on the four-wheel vehicle 70 can be seen from the outside. The design has a feature that it is known at a glance that the folded two-wheel vehicle 10 is mounted on the four-wheel vehicle 70, so that the attractiveness of the product can be improved.

Sixth, as described by referring to FIGS. 4 to 7, the door 72 is used as the body constructing member of the four-wheel vehicle 70.

For example, by opening the door 72 and housing the two-wheel vehicle 10 to the inside from an end of the door 72, the work of loading the two-wheel vehicle 10 can be easily performed.

Seventh, as described by referring to FIGS. 9 and 10, the door 94 is provided with the rail member 95 which can be pulled out and extended between the ground and the door 94 at the time of loading the two-wheel vehicle 10.

By making the two-wheel vehicle 10 move on the rail member 95, the two-wheel vehicle 10 can be easily loaded.

Figure 11:
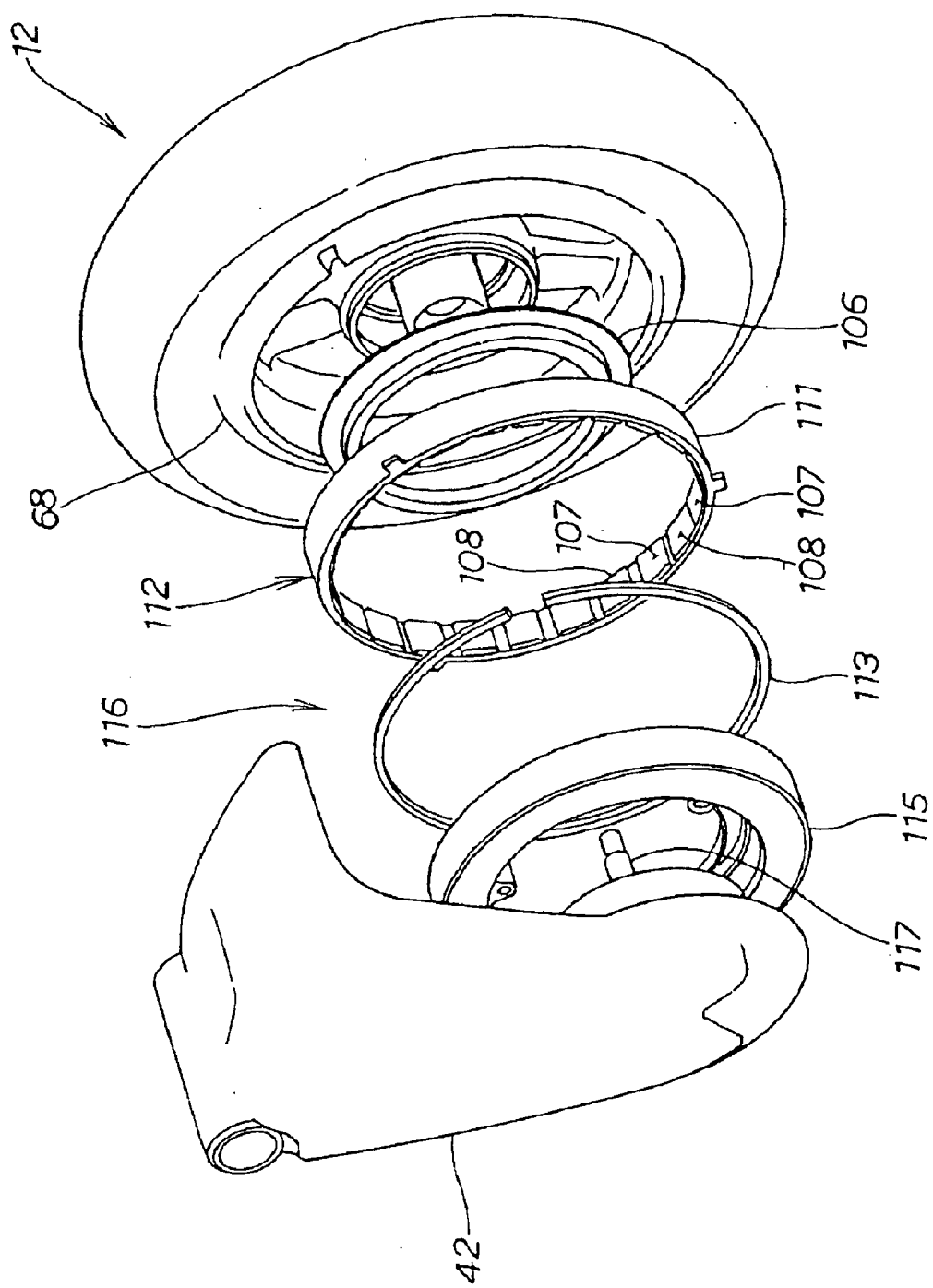
FIG. 11 is an exploded perspective view showing a wheel structure of the two-wheel vehicle according to the invention.

FIG. 11 is an exploded perspective view showing a wheel structure of the two-wheel vehicle according to the invention and shows the wheel 68 of the rear wheel 12.

The wheel 68 of the rear wheel 12 has a magnet ring 106 for a sensor, which is detected by a not-illustrated rotation sensor provided on the rear swing arm 42 side, a rotary magnet member 12 obtained by alternately arranging a plurality of permanent magnets 107 and 108 on the inside of a magnetic ring 111, and a fixing ring 113 for fixing the rotary magnet member 112 to the inside of the wheel 68. The rear swing arm 42 has a stator 115 for integrally supporting a stator coil.

The magnet ring 106 for a sensor is used to detect the rotational speed of the wheel 68.

The rotary magnet member 112 and stator 115 are members as components of a three-phase brushless electric motor 116. Also shown is axle 117 of the rear wheel 12.

Figure 12:
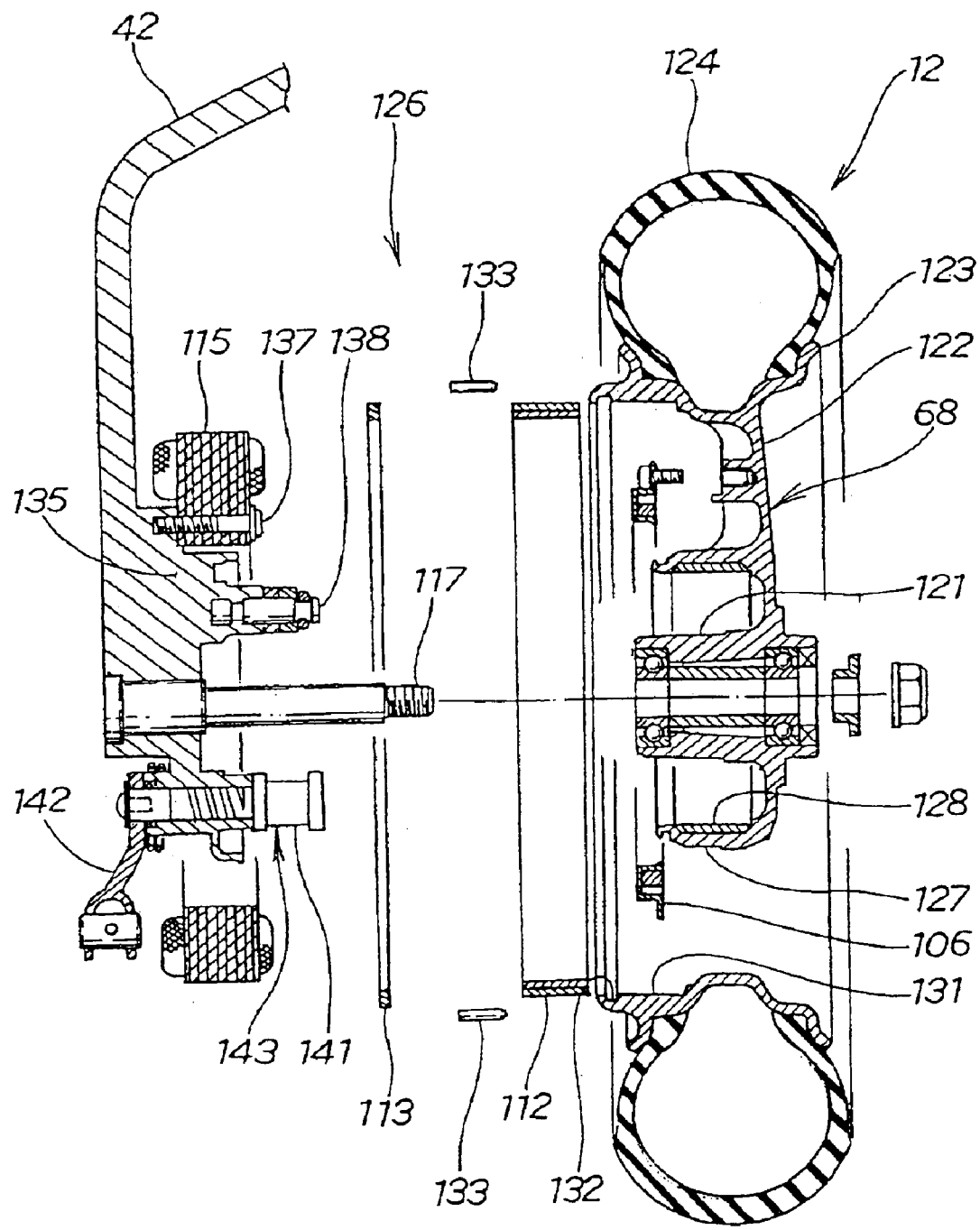
FIG. 12 is a cross section (exploded view) showing the wheel structure of the two-wheel vehicle according to the invention.

FIG. 12 is a cross section (exploded view) showing the wheel structure of the two-wheel vehicle according to the invention. The wheel 68 includes a hub 121 for receiving the axle 117, a disc 122 extending radially to the outside from the hub 121, and a rim 123 provided around the disc 122. The wheel 68 is a member in which a tire 124 is attached to the rim 123.

The disc 122 is a portion in which a drum 127 as a component of a drum brake 126 is integrally formed on the side facing the rear swing arm 42. A liner 128 is made of cast iron and is insert-molded on the inside of the drum 127 to increase wear resistance at the time when a brake shoe comes into contact (to be described hereinlater). A magnet member fitting portion 131 is provided in the inner face of the rim 123, to which the rotary magnet member 112 is fit. Fixing rings 113 is fit into an annular groove 132. Three positioning pins 133 are disposed every 120° to position the rotating direction of the rotary magnet member 112.

The rear swing arm 42 has a projection 135 around the axle 117. The stator 115 is attached to the projection 135 by bolts 137 . . . and the projection 135 serves as a brake panel (a component of the drum brake 126).

Specifically, the projection 135 is a member to which brake shoe shafts 138 and 138 (one of which is not shown) and a camshaft 143 are attached. The brake shoe shafts 138 and 138 serve as swing shafts of a brake shoe (not shown) coming into contact with the inner face of the iron cast liner 128 of the drum 127. At one end of the camshaft 143, a cam 141 for moving the brake shoe toward the drum side is formed. To the other end of the camshaft 143, an arm member 142 which swings in association with the braking operation is integrally attached.

Figure 13:
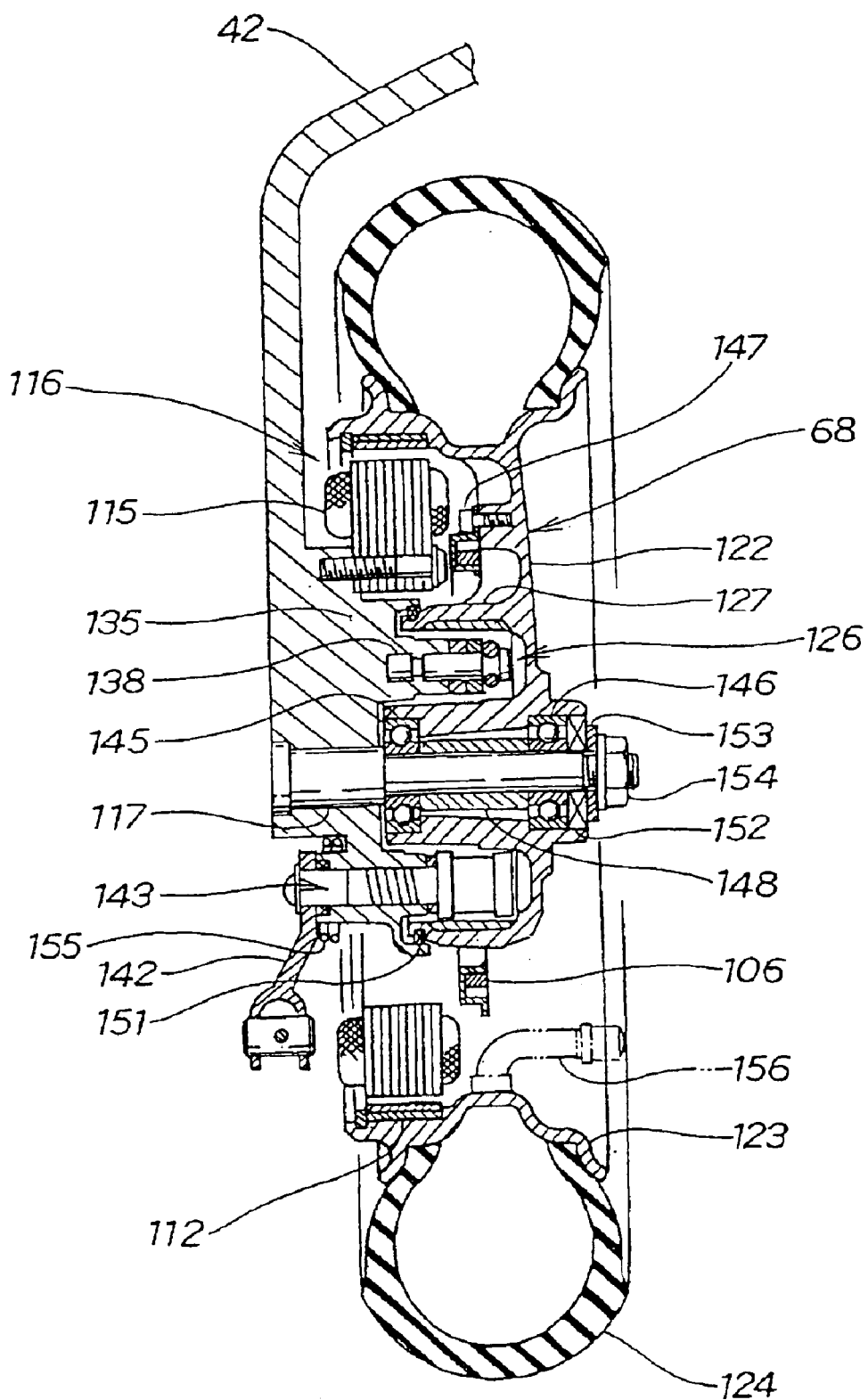
FIG. 13 is a cross section showing the wheel structure of the two-wheel vehicle according to the invention.

FIG. 13 is a cross section showing the wheel structure of the two-wheel vehicle according to the invention and shows a state in which the axle 117, the stator 115 of the electric motor 116, brake shoe shafts 138 and 138 (one of which is not shown) of the drum brake 126, and the camshaft 143 are attached to the projection 135 of the rear swing arm 42, the wheel 68 is rotatably attached to the axle 117 via bearings 145 and 146, the drum 127 of the drum brake 126 is integrally formed in the disc 122 of the wheel 68, the ring 106 for a sensor is attached to the disc 122 by using bolts 147 . . . , and the rotary magnet member 112 is attached to the inner face of the rim 123, 148 denotes a collar, 151 and 152 denote dust seals, 153 indicates a washer, 154 indicates a nut, 155 indicates a return spring of the arm member 142, and 156 expresses an air valve of the tire.

Since the wheel 68 has therein the electric motor 116 for driving the wheel 68 and the drum brake 126 for braking the wheel 68 is disposed on the inside in the radial direction of the electric motor 116, the electric motor 116 and the drum brake 126 can be disposed concentrically. The width of the wheel 68 can be therefore reduced, so that the small and compact wheel 68 can be obtained. Moreover, the drum brake is not influenced by the heat of the motor, and the brake performance can be maintained.

Such a wheel structure may be employed for the front wheel 11 (refer to FIG. 2).

The electric motor 116 and drum brake 126 are provided on the same side of the disc 122 of the wheel 68, so that the performance of assembling the electric motor 116 and drum brake 126 to the wheel 68 and the performance of maintenance on the electric motor 116 and drum brake 126 can be improved.

Further, since the rear swing arm 42 as a rear wheel supporting member for rotatably supporting the wheel 68 also serves as the brake panel of the drum brake 126 and as a member to which the stator 115 of the electric motor 126 is attached, as compared with the case of specially providing an attaching member of the stator and the brake panel, the number of parts can be decreased. In addition, at the time of manufacture, the parts (such as the brake shoe shaft 138, brake shoe, camshaft 143, and arm member 142) of the drum brake 126 and the stator 115 can be sub-assembled to the rear swing arm 42. Separately, the magnetic ring 106 for a sensor and the rotary magnet member 112 can be sub-assembled to the wheel 68. By attaching the sub-assembled wheel 68 to the sub-assembled rear swing arm 42, the productivity can be increased.

By providing the wheel 68 with the rotary magnet member 112, for example, as compared with the case where the stator is provided on the wheel side, a slip ring mechanism or the like for passing current to the stator 115 becomes unnecessary and the structure is simplified. By constructing the rotary magnet member 112 by the magnetic ring 111 and the permanent magnets 107 . . . and 108 . . . fixed to the magnetic ring 111, the magnetic ring 111 to which the permanent magnets 107 . . . and 108 . . . are preliminarily fixed can be attached to the wheel 68. The assembly performance can be improved as compared with, for example, the case where the permanent magnets are directly attached to the wheel.

Figure 14:
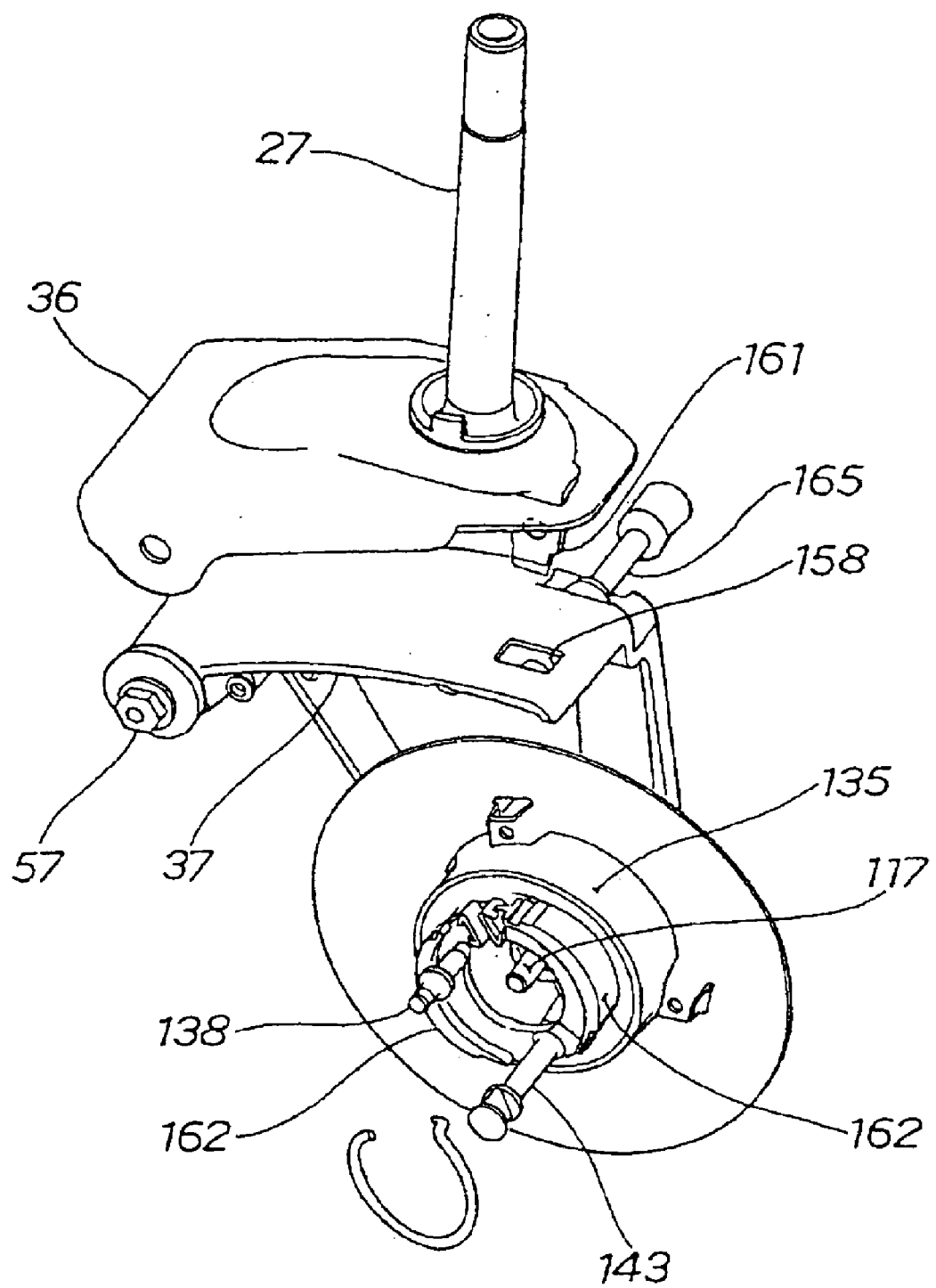
FIG. 14 is a perspective view of a main portion on the front wheel side of the two-wheel vehicle according to the invention.

FIG. 14 is a perspective view of a main portion on the front wheel side of the two-wheel vehicle according to the invention, and shows a state where the lower arm 36 is attached to the lower portion of the handle shaft 27, the front swing arm 37 is attached to the lower arm 36 via the front swing shaft 57, a window 158 is provided in the upper part of the front swing arm 37, and a projection piece 161 to be inserted into the window 158 is provided on the under face of the lower arm 36. Brake shoes 162, 162 are swingably attached to the brake shoe shaft 138 via the camshaft 143.

Figure 15:
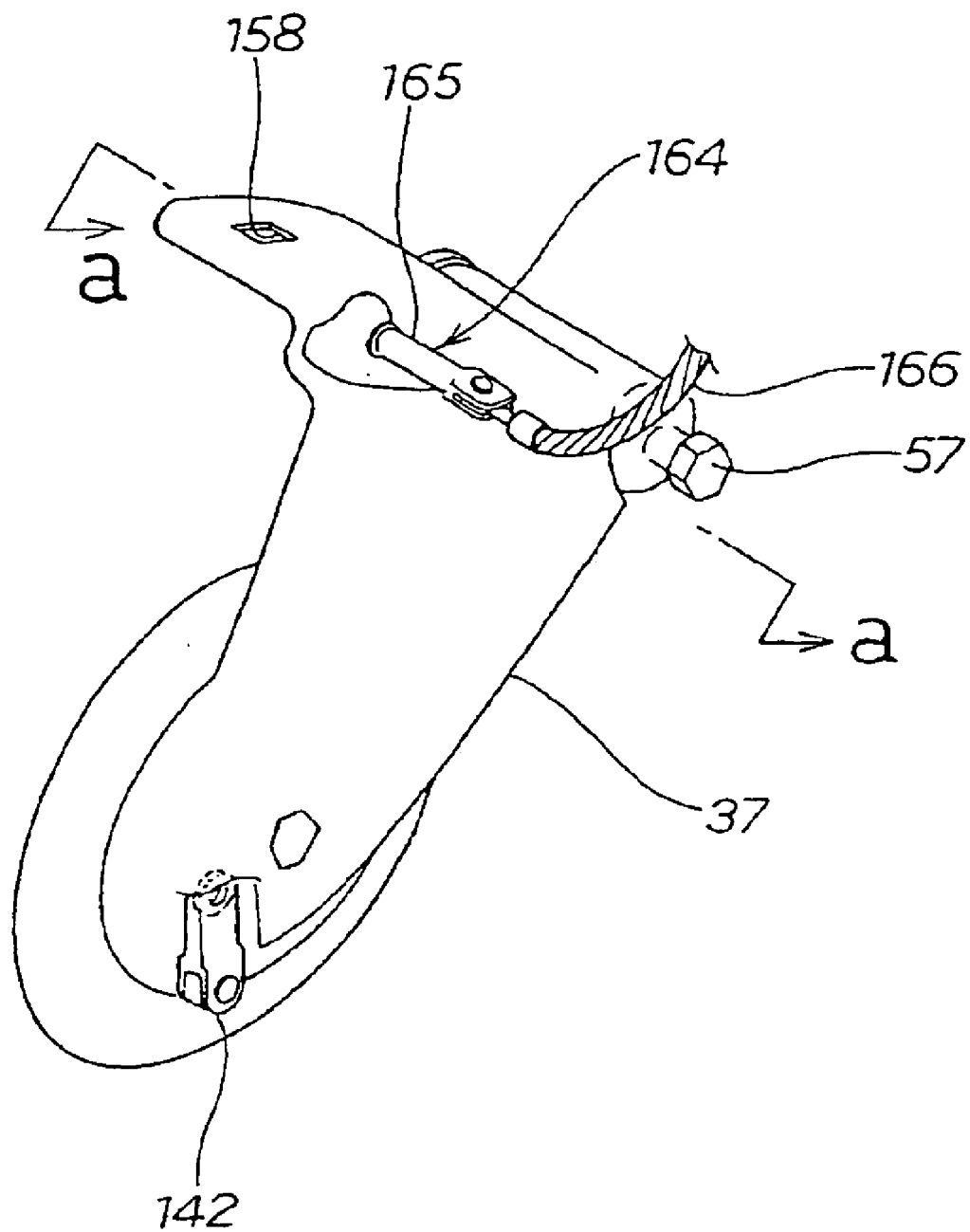
FIG. 15 is a perspective view for explaining a front swing arm of the two-wheel vehicle according to the invention.

FIG. 15 is a perspective view for explaining a front swing arm of the two-wheel vehicle according to the invention, and shows that a swing arm locking mechanism 164 for locking swing of the front swing arm 37 is provided in the upper part of the front swing arm 37.

The swing arm locking mechanism 164 has an arm lock pin 165 and a cable 166 coupled to the end of the arm lock pin 165.

Figures 16A, 16B:
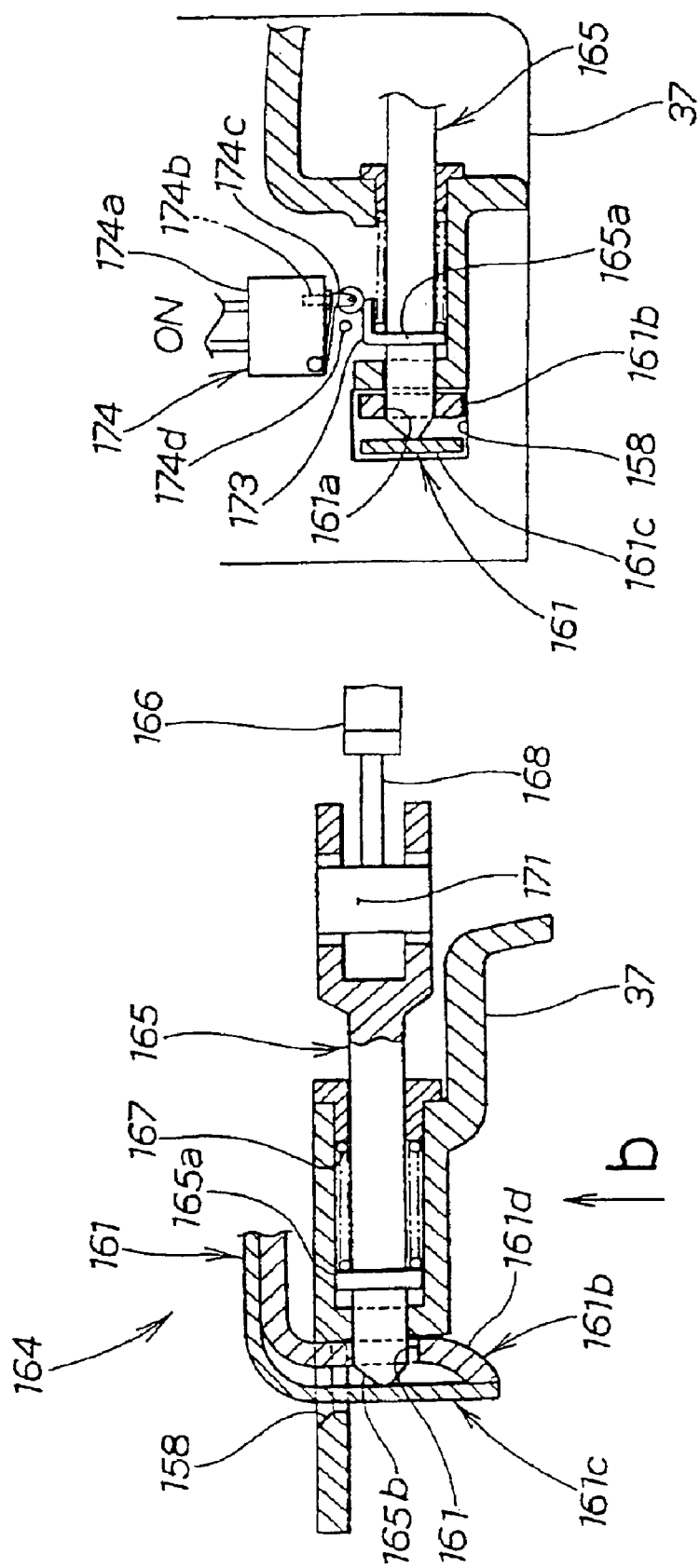
FIGS. 16(a) and 16(b) are cross sections for explaining a swing arm lock mechanism of a front swing arm according to the invention.

FIGS. 16(a) and 16(b) are cross sections for explaining the swing arm locking mechanism of the front swing arm according to the invention. FIG. 16(a) is a cross section taken along line a—a of FIG. 13, and FIG. 16(b) is a view seen from the arrow "b" in FIG. 16(a).

In FIG. 16(a), the swing arm locking mechanism 164 includes the arm lock pin 165, cable 166, projection piece 161 which is inserted from the window 158 and to which the tip of the arm lock pin 165 is coupled, and a spring 167 for pushing the arm lock pin 165 to the tip side. A wire 168 is movably inserted in the cable 166, and a wire tip member 171 is attached to the tip of the of the wire 168, thereby coupling the wire 168 to the arm lock pin 165.

The projection piece 161 is a member obtained by overlapping, with a gap, a pin penetrating member 161b having a through hole 161a through which the arm lock pin 165 is inserted, and a stopper member 161c for regulating the tip position of the arm lock pin 165. 161d denotes a curved portion formed at the tip of the pin penetrating member 161b.

The arm lock pin 165 has a flange portion 165a provided in an intermediate portion and a tapered portion 165b formed at the tip.

In FIG. 16(b), 173 denotes a detection piece provided integrally with the arm lock pin 165a, and a locked state detection switch 174 is turned on/off by movement of the detection piece 173 in association with axial movement of the arm lock pin 165.

The locked state detection switch 174 has a switch body 174a, a rod 174b which goes in/out from the switch body 174a and is pushed by resilience of a spring (not shown) from the inside to the outside, and an arm 174c with a roller which comes into contact with the tip of the rod 174b. By pushing the rod 174b from the outside to the inside, the locked state detection switch 174 is turned on. By making the rod 174b project from the inside to the outside, the locked state detection switch 174 is turned off. 174d denotes a stopper pin serving as a stopper of the arm 174c with a roller.

In a state where the arm lock pin 165 is inserted in the through hole 161a of the projection piece 161 as shown in the diagram, that is, in the locked state, the detection piece 173 pushes the rod 174b via the arm 174c with a roller, so that the locked state detection switch 174 is turned on.

Figure 17:
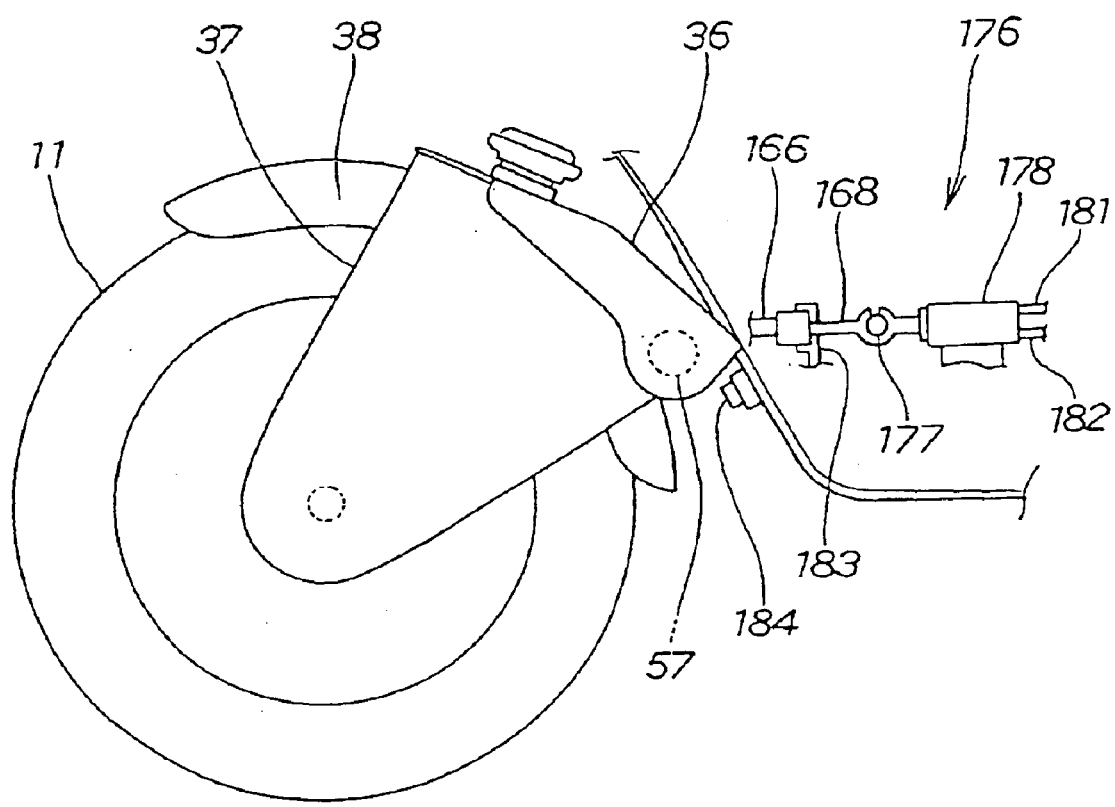
FIG. 17 is a side view of a main portion showing the front part of the two-wheel vehicle according to the invention.

FIG. 17 is a side view of a main portion showing the front portion of the two-wheel vehicle according to the invention. A swing arm unlocking mechanism 176 of the front swing arm 37 will be described.

The swing arm unlocking mechanism 176 allows the front swing arm 37 shown in FIG. 16 to swing to the rear part of the body around the lower arm 36 by canceling the connection between the projection piece 161 and the arm lock pin 165 shown in FIGS. 16(a) and 16(b). FIG. 17 shows a state where a wire tip member 177 is attached to the tip of the wire 168 of the cable 166 to thereby connect the wire tip member 177 to a solenoid-type actuator 178. Conductors 182, 182 pass current to the actuator 178, a tip attaching member 183 is provided on the vehicle body side in order to attach the tip of the cable 166, and a front wheel folding state detecting switch 184 detects contact of the front fender 38 or swing arm 37 when the front swing arm 37 swings the most (that is, on completion of folding).

Figure 18:
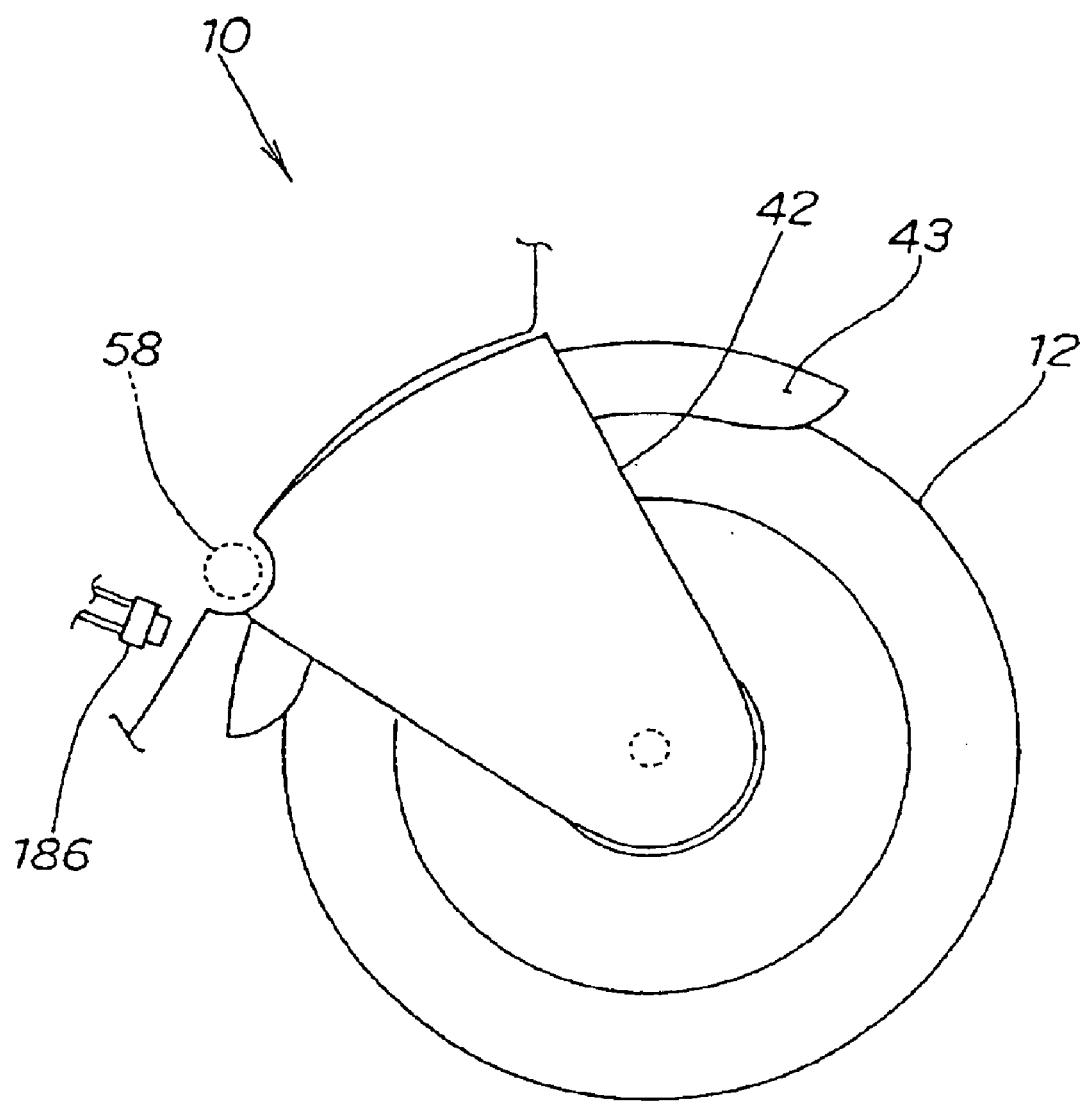
FIG. 18 is a side view of a main portion showing the rear part of the two-wheel vehicle according to the invention.

FIG. 18 is a side view of a main portion showing the rear portion of the two-wheel vehicle according to the invention and shows the rear swing arm 42 and the rear wheel 12.

On the body side of the two-wheel vehicle 10, a rear wheel folding state detecting switch 186 for detecting contact of the rear fender 43 or swing arm 42 when the rear swing arm 42 swings the most (that is, on completion of folding) is provided near the rear swing shaft 58. The rear wheel 12 side also has mechanisms similar to the swing arm locking mechanism 164 (refer to FIG. 15) provided on the front wheel 11 (refer to FIG. 17) side and the swing arm unlocking mechanism 176 (refer to FIG. 17).

The action of folding the above-mentioned front and rear wheels 11 and 12 will now be described.

Figure 19:
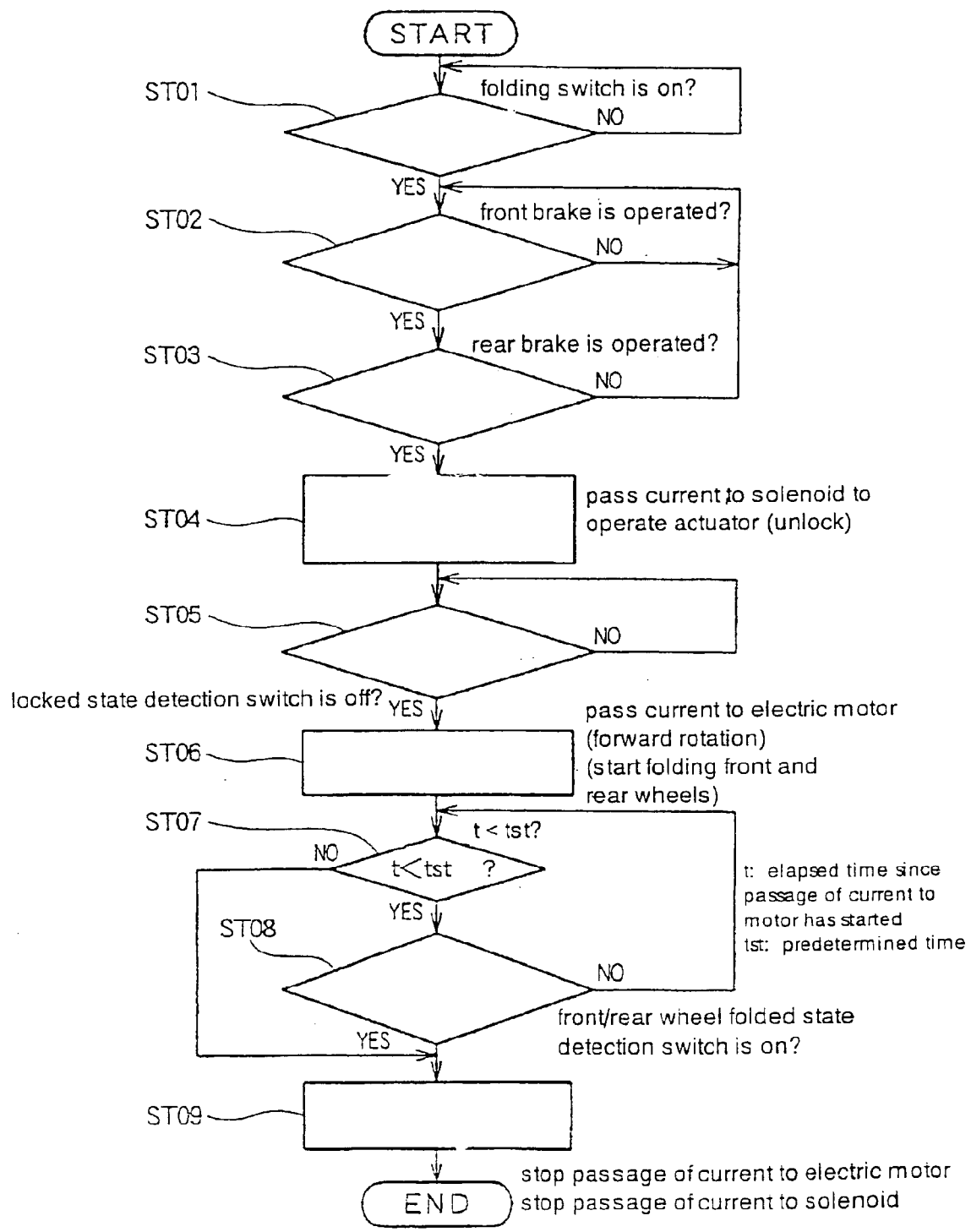
FIG. 19 is a flowchart for explaining a method of folding front and rear wheels of the two-wheel vehicle.

FIG. 19 is a flowchart for explaining the method of folding the front and rear wheels of the two-wheel vehicle according to the invention. STxx denotes a step number.

ST01 . . . Whether a folding switch (which is, in this case, the motor operating switch since the motor operating switch is used by being switched to the "fold" side) provided for a handlebar is ON or not is determined.

When the folding switch is OFF (NO), ST01 is executed again.

When the folding switch is ON (YES), the program advances to ST02.

ST02 . . . Whether the front brake is operated by gripping of the front brake lever or not is determined.

When the front brake is not operated (NO), ST02 is executed again.

When the front brake is operated (YES), the program advances to ST03.

ST03 . . . Whether the rear brake is operated without the gripping of the rear brake lever or not is determined.

When the rear brake is operated (YES), ST02 is executed again.

When the rear brake is not operated (NO), the program advances to ST04.

ST04 . . . Current is passed to the solenoid to operate the actuator to thereby unlock the front swing arm and rear swing arm.

ST05 . . . Whether or not the locked state detection switch for the lock pin which locks the front and rear swing arms is OFF (that is, whether or not the front and rear swing arms are locked) is determined.

When the locked state detection switch is ON (NO) (that is, when the locked state is detected), ST05 is executed again.

When the locked state detection switch is off (YES) (that is, when the unlocked state is detected), the program advances to ST06.

ST06 . . . Current is passed to the electric motor to rotate the rear wheel forward, thereby starting folding of the front and rear wheels.

ST07 . . . Whether elapsed time t since the passage of current to the electric motor has started is shorter than predetermined time tst or not is determined.

In the case where t≧tst (NO), the program advances to ST09. If the folding is not completed after elapse of time which is sufficient for normal folding operation, it is determined that something is wrong and the passage of current is interrupted to protect the motor.

In the case where t<tst (YES), the program advances to ST08.

ST08 . . . Whether the front/rear wheel folded state detection switch is ON or not, that is, whether both front and rear wheels are completely folded or not is determined.

If the front/rear wheel folded state detection switch is OFF (NO), ST07 is executed again.

If the front/rear wheel folded state detection switch is ON (YES), the program advances to ST09.

ST09 . . . Passage of current to the electric motor and the solenoid is stopped.

The action of folding the front and rear wheels will now be described in accordance with the flow shown in the flowchart of FIG. 19.

First, in FIG. 1, the motor operating switch 24 provided for the right-side handlebar 18 is switched to the "fold" side.

By gripping of the front brake lever (not shown) provided for the right-side handlebar 18, the front brake is operated and the front lever is locked by a brake lock lever which will be described hereinlater. If the rear brake is operated without the gripping of the rear brake lever (not shown) provided for the left-side handlebar 17, the operation of the front brake is detected by the front brake operating state detection switch (not shown). A state where the rear brake is not operated is detected by a rear brake operating state detection switch (not shown). A controller (not shown) passes current to the solenoid shown in FIG. 17 to operate the actuator 178.

Figure 20B:
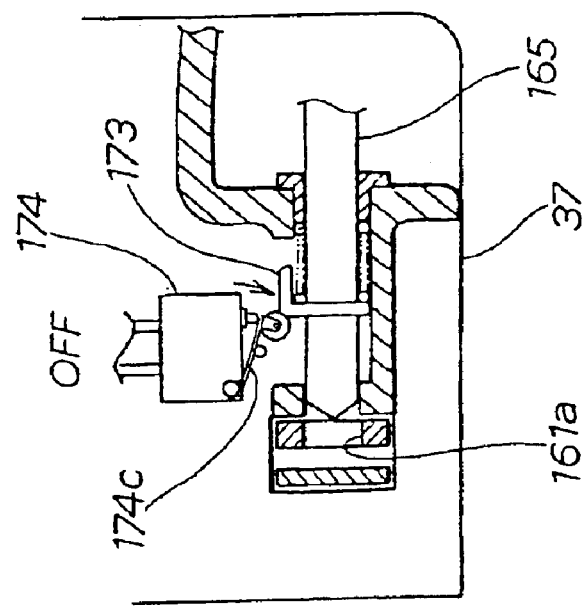
FIGS. 20(a) and 20(b) are action diagrams illustrating the action of a swing arm unlocking mechanism according to the invention.
Figure 20A:
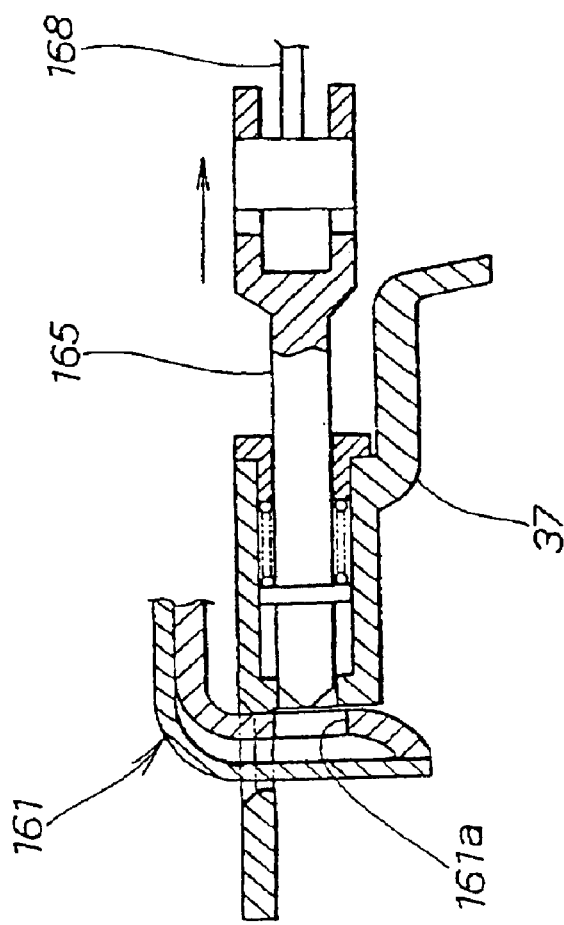

FIGS. 20(a) and 20(b) are action diagrams illustrating the action of the swing arm unlocking mechanism according to the invention.

When the actuator 178 (refer to FIG. 17) is operated, in FIG. 20(a), the arm lock pin 165 is pulled via the wire 168 and moved in the direction of the arrow. Consequently, the tip of the arm lock pin 165 goes out from the through hole 161a of the projection piece 161, thereby unlocking the front swing arm 37.

In FIG. 20(b), when the arm lock pin 165 goes out from the through hole 161a, the roller of the arm 174c with the roller of the lock state detection switch 174 goes away from the detection piece 173, so that the lock state detection switch 174 is turned off.

Figure 21B:
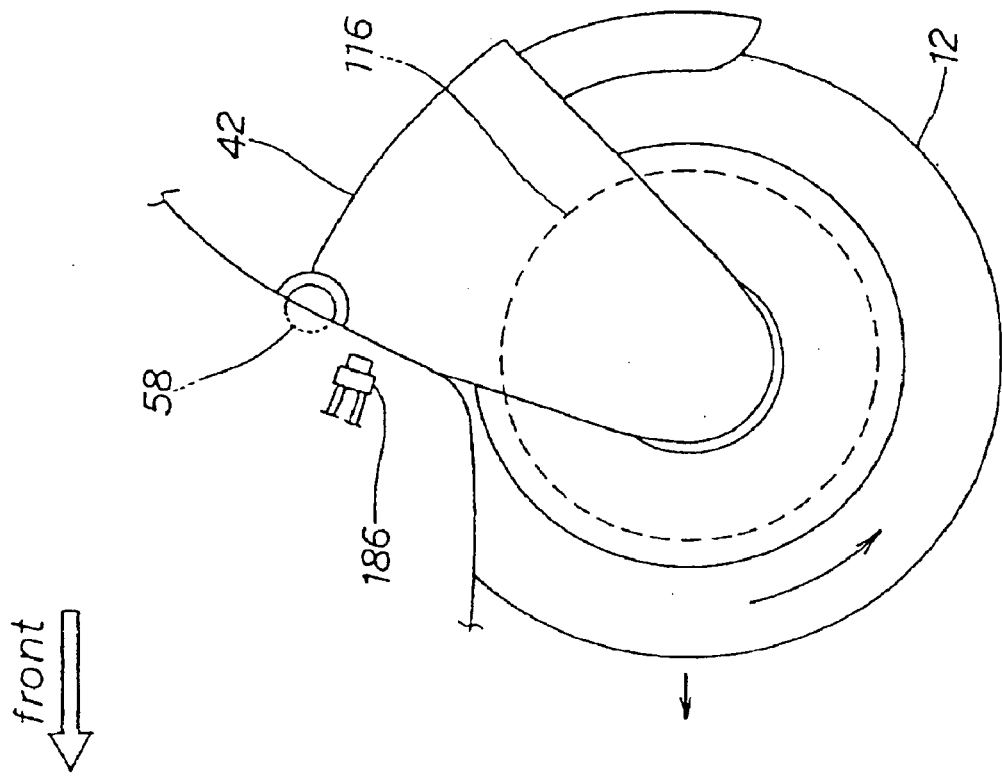
FIGS. 21(a) and 21(b) are action diagrams illustrating the action of folding the front and rear wheels according to the invention.
Figure 21A:
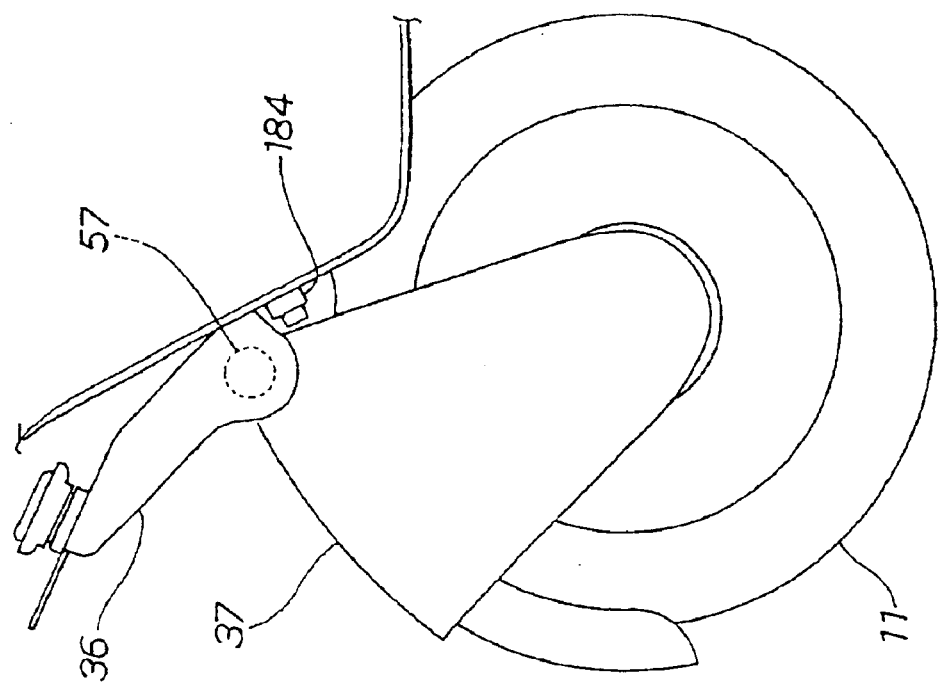

FIGS. 21(a) and 21(b) are action diagrams illustrating the front/rear wheel folding action according to the invention.

In FIGS. 21(a) and 21(b), when the lock state detection switch 174 (refer to FIG. 16(b)) is turned off, the controller starts passing current to the electric motor 116 and drives the rear wheel 12 at low speed by the electric motor 116. At this time, the rotating direction of the electric motor 116, that is, the rear wheel 12 is a forward rotating direction (rotating direction in the driving mode, that is, the direction of the arrow).

By the operation, the rear wheel 12 moves to the front part of the body (the direction "front" of the open arrow is the direction to the front part of the body). At this time, the front wheel 11 is in a braked state and does not move forward of the vehicle, so that the distance between the front wheel 11 and the rear wheel 12 is shortened. The front swing arm 37 and the rear swing arm 42 which are not locked by the body are tilted around the front swing shaft 57 and the rear swing shaft 58, respectively, as a center, and a folded state is gradually obtained.

Either the predetermined time has elapsed since the passage of current to the electric motor 116 has started or both of the front wheel folded state detection switch 184 and rear wheel folded state detection switch 186 are turned on, the controller stops passing current to the electric motor 116. It completes the folding of the front and rear wheels 11 and 12.

The action of unfolding the folded front and rear wheels 11 and 12 will now be described.

Figure 22:
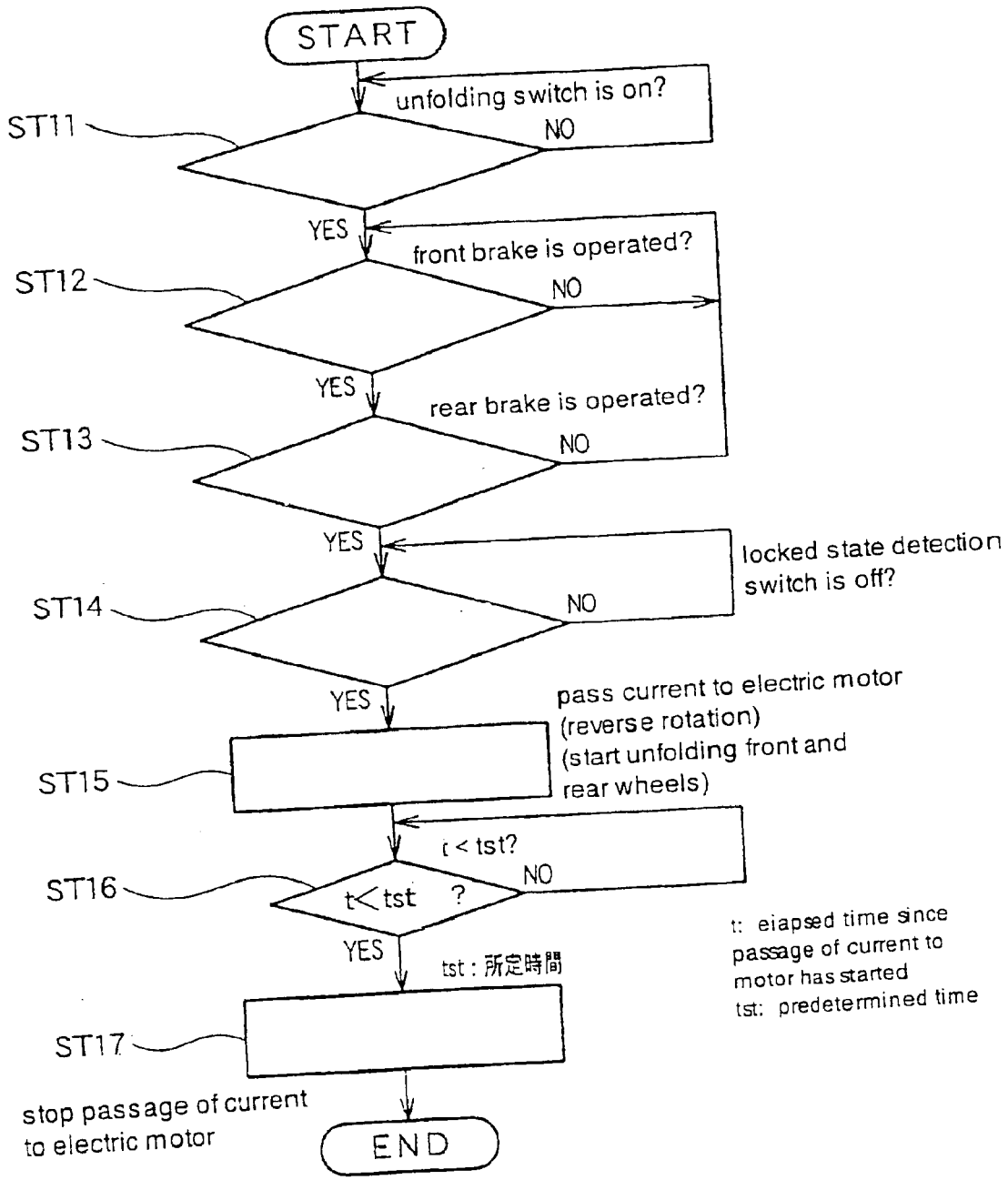
FIG. 22 is a flowchart for explaining a method of unfolding the front and rear wheels of the two-wheel vehicle according to the invention.

FIG. 22 is a flowchart for explaining the method of unfolding the front and rear wheels of the two-wheel vehicle according to the invention. STxx denotes a step number.

ST11 . . . Whether an unfolding switch (which is, in this case, the motor operating switch since the motor operating switch is used by being switched to the "unfold" side) provided for the handlebar is ON or not is determined.

When the unfolding switch is OFF (NO), ST11 is executed again.

When the unfolding switch is ON (YES), the program advances to ST12.

ST12 . . . Whether the front brake is operated by gripping of the front brake lever or not is determined.

When the front brake is not operated (NO), ST12 is executed again.

When the front brake is operated (YES), the program advances to ST13.

ST13 . . . Whether or not the rear brake is operated without gripping of the rear brake lever is determined.

If the rear brake is operated (YES), ST12 is executed again.

If the rear brake is not operated (NO), the program advances to ST14.

ST14 . . . Whether the locked state detection switches on the front swing arm side and the rear swing arm side are OFF or not is determined.

If the locked state detection switches are ON (NO), ST14 is executed again.

If the lock detection switch is OFF (YES), the program advances to ST15.

ST15 . . . Current is passed to the electric motor to rotate the rear wheel reverse, thereby starting unfolding of the front and rear wheels.

ST16 . . . Whether elapsed time t since the passage of current to the electric motor has started is shorter than predetermined time tst or not is determined.

If t≧tst (NO), ST16 is executed again.

If t<tst (YES), the program advances to step ST17.

ST17 . . . Passage of current to the electric motor is stopped.

The state of ST14 will be described by the following drawings.

Figure 23B:
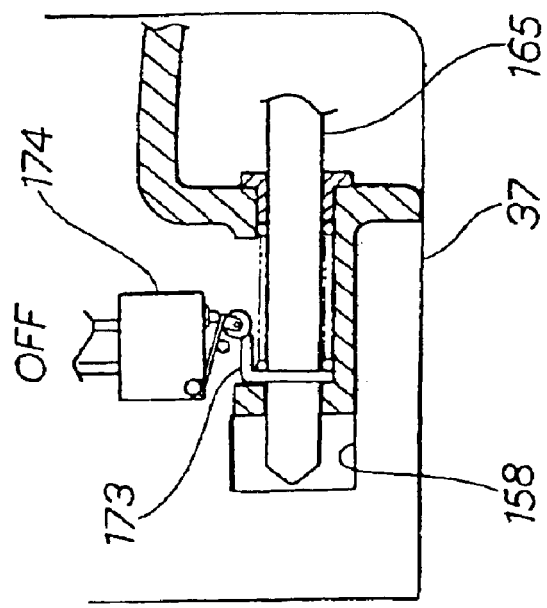
FIGS. 23(a) and 23(b) are action diagrams illustrating a state of a locking state detection switch according to the invention.
Figure 23A:
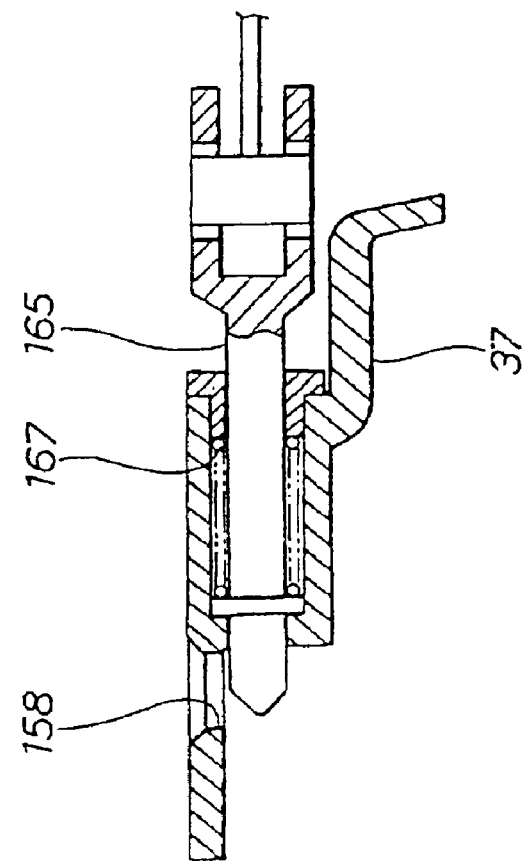

FIGS. 23(a) and 23(b) are action diagrams illustrating the state of the locked state detection switch according to the invention.

In FIG. 23(a), in a state where the front and rear wheels are folded, the projection piece 161 (refer to FIG. 20(a)) is projected from the window 158. Consequently, there is nothing to regulate the tip position of the arm lock pin 165, and the arm lock pin 165 is in a state where it is moved to the left end of the drawing by resilience of the spring 167.

FIG. 23(b), when the arm lock pin 165 moves to the most left side, the roller of the locked state detection switch 174 goes away from the detection piece 173, so that the locked state detection switch 174 is turned off.

On the basis of the off state, the controller starts passing current to the electric motor 116 in FIGS. 21(a) and 21(b), so that the front and rear wheels 11 and 12 are unfolded.

The state just before the unfolding of the front and rear wheels 11 and 12 is completed will now be described.

Figure 24A:
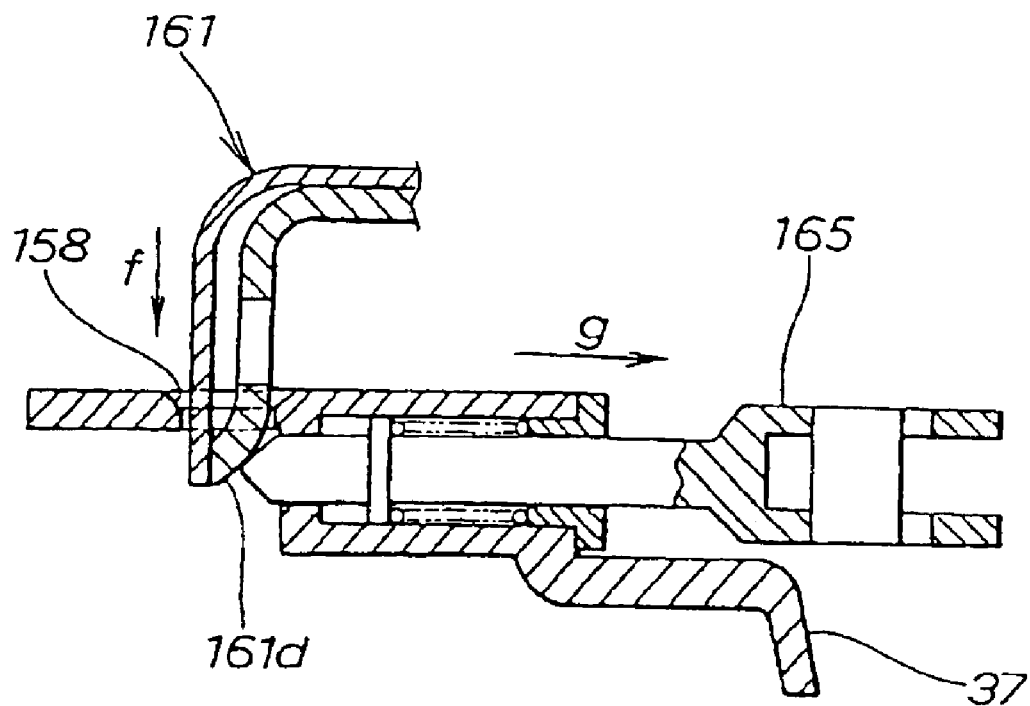
FIGS. 24(a) and 24(b) are action diagrams illustrating the action of the swing arm locking mechanism according to the invention.
Figure 24B:
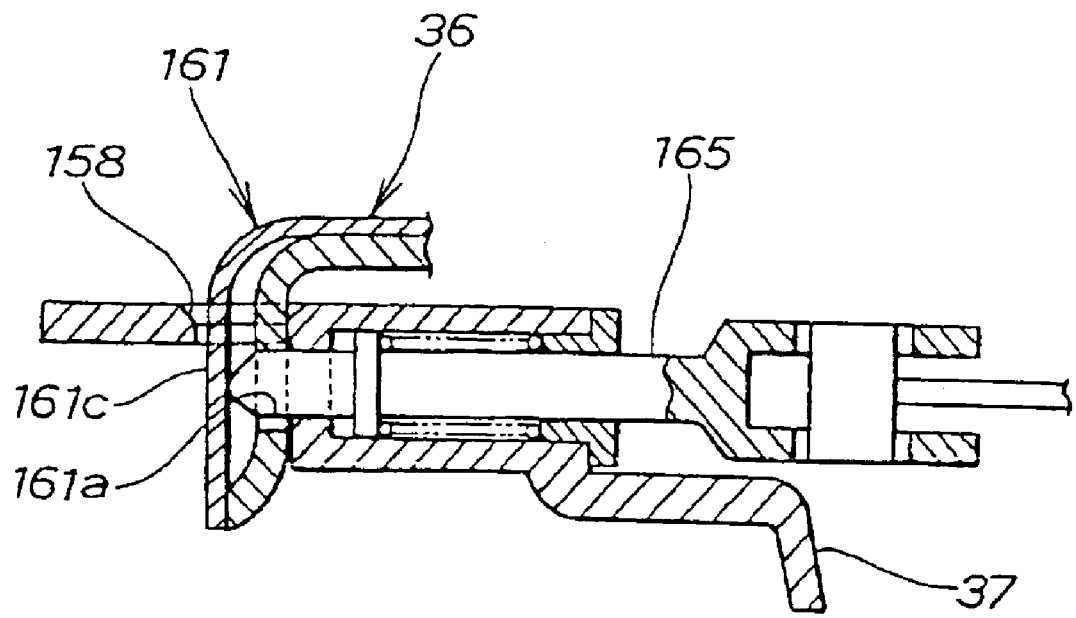

FIGS. 24(a) and 24(b) are action diagrams illustrating the action of the swing arm locking mechanism according to the invention.

FIG. 24(a) shows a state where the unfolding of the front and rear wheels 11 and 12 (refer to FIGS. 21(a) and 21(b)) progresses, the projection piece 161 enters the window 158 as shown by the arrow "f", and the curved portion 161d of the projection piece 161 pushes back the arm lock pin 165 in the direction of the arrow "g".

FIG. 24(b) shows a state where the projection piece 161 goes to the inner side through the window 158 further from the state of FIG. 24(a), and the tip of the arm lock pin 165 passes through the through hole 161a in the projection piece 161 and comes into contact with the stopper member 161c, that is, the state where the front swing arm 37 is locked by the lower arm 36.

In this state, the locked state detection switch 174 shown in FIG. 23(b) is turned on in a manner similar to the state shown in FIG. 16(b) and, on the basis of the ON state, stops the passage of current to the electric motor 116 (refer to FIG. 21(b)) together with the process of ST16 of FIG. 22.

Figure 25:
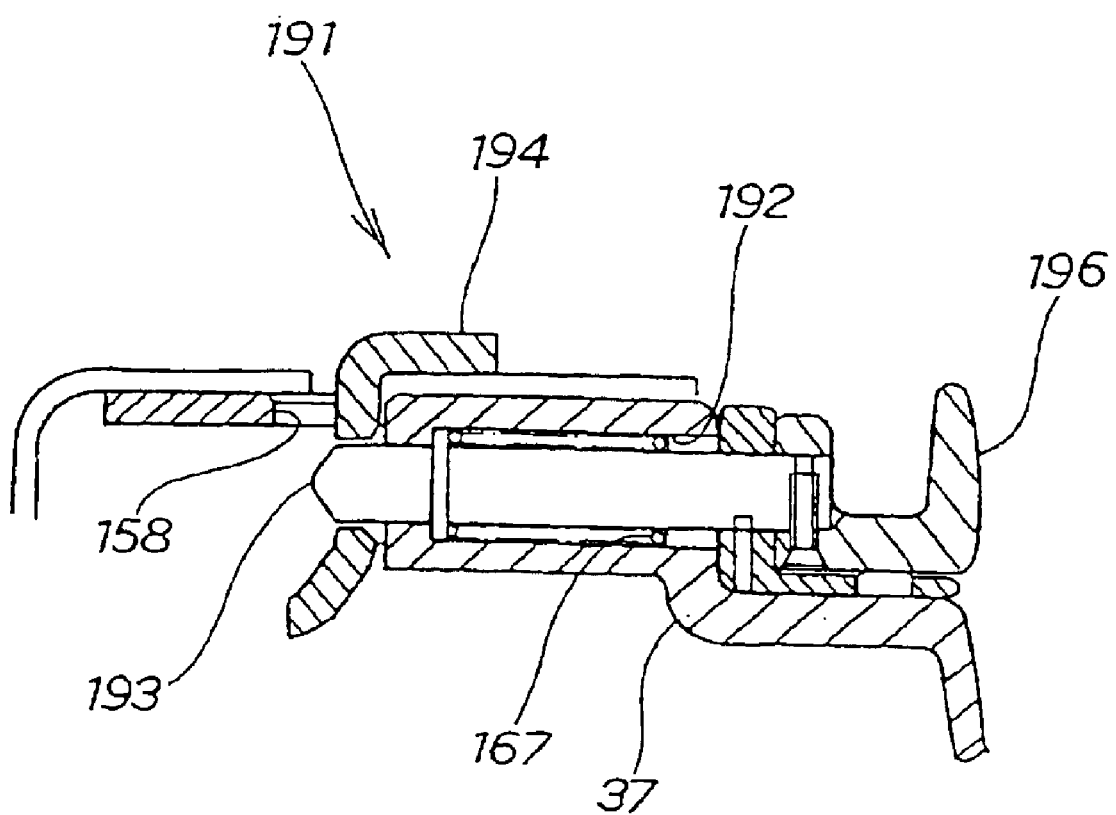
FIG. 25 is a cross section showing another embodiment of the swing arm locking mechanism according to the invention.

FIG. 25 is a cross section showing another embodiment of the swing arm locking mechanism of the front or rear wheel according to the invention.

A swing arm locking mechanism 191 includes an arm lock pin 193 inserted in a pin hole 192 provided in the front swing arm 37, a projection piece 194 inserted through the window 158 and coupled to the tip of the arm lock pin 193, and the spring 167 for pushing the arm lock pin 193 toward the tip side.

The arm lock pin 193 has, at its end, a handle 196 to be manually pulled. With the configuration, the front and rear swing arms are simply manually unlocked and the folding operation can be also performed manually, so that a cheap, light system can be realized.

Figure 26:
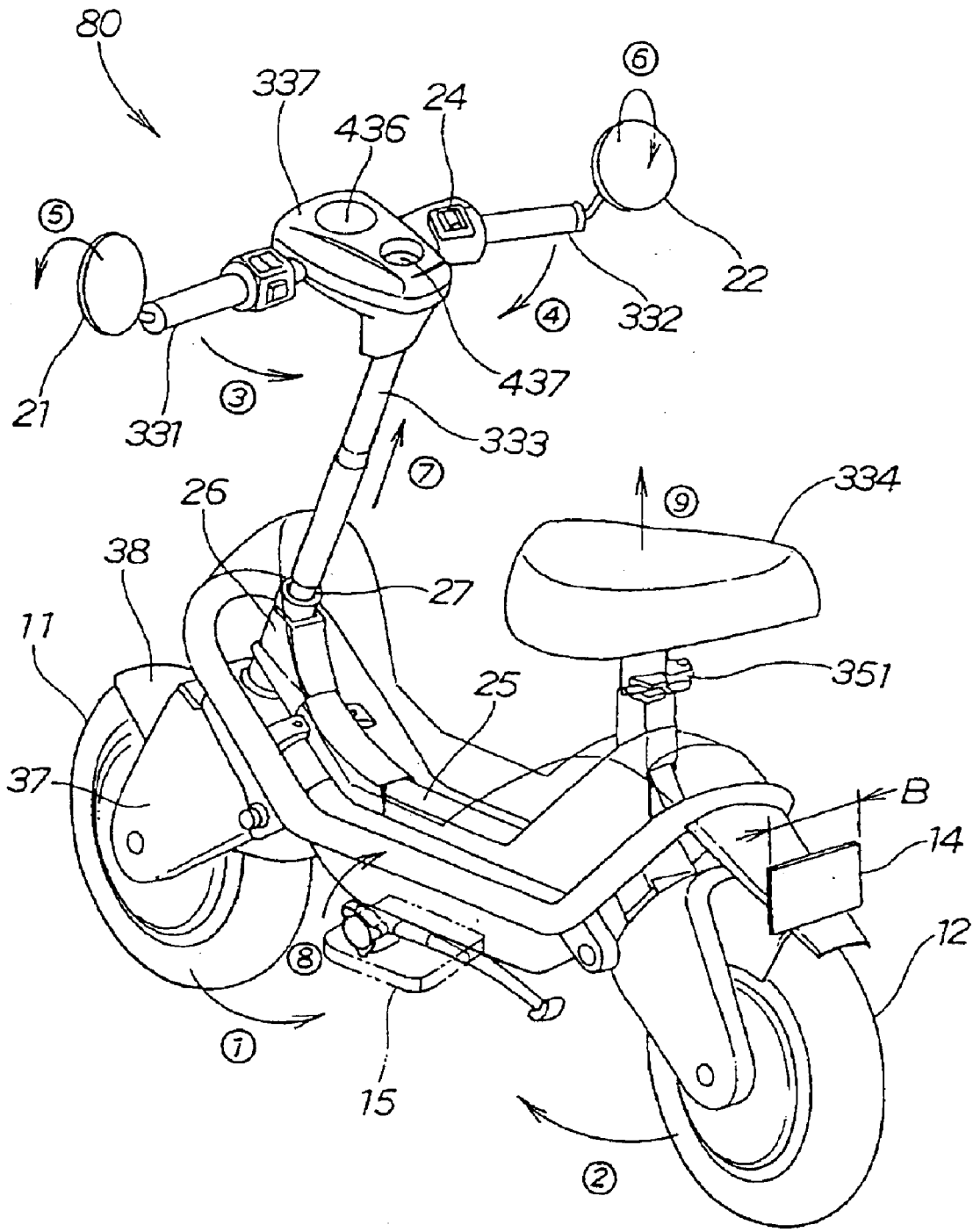
FIG. 26 is a perspective view for explaining another embodiment of a foldable two-wheel vehicle according to the invention.

FIG. 26 is a perspective view illustrating another embodiment of the foldable two-wheel vehicle according to the invention. The same components as those in the foldable vehicle 10 shown in FIG. 1 are designated by the same reference numerals and their detailed description will not be repeated.

The foldable two-wheel vehicle 80 (hereinbelow described as "two-wheel vehicle 80") is a foldable vehicle whose outside dimension is reduced by folding or detaching some parts and can be loaded on, for example, a four-wheel vehicle.

In the two-wheel vehicle 80, the front and rear wheels 11 and 12 are moved or folded in the directions of the arrows ① and ②, handlebars 331 and 332 (also serving as accelerator grips) and the rear-view mirrors 21 and 22 are folded to the inside in the vehicle width direction as shown by the arrows ③ to ⑥, respectively, so as to be within the width B (170 mm in full size) of the number plate 14 attached to the rear part, a handle post 333 is detached from the handle shaft 27 in the direction of the arrow ⑦ and disposed in the front part of the body, the floor-like steps 15 and 16 (the step 16 on the depth side is not shown) are folded to the inside in the vehicle width direction as shown by the arrow ⑧ (for the step 15) so as to be within the width B, and a seat 334 can be detached in the direction of the arrow ⑨ and disposed in the center of the body. Alternately, the two-wheel vehicle 80 can be loaded to a four-wheel vehicle without detaching the handle post.

Figure 27:
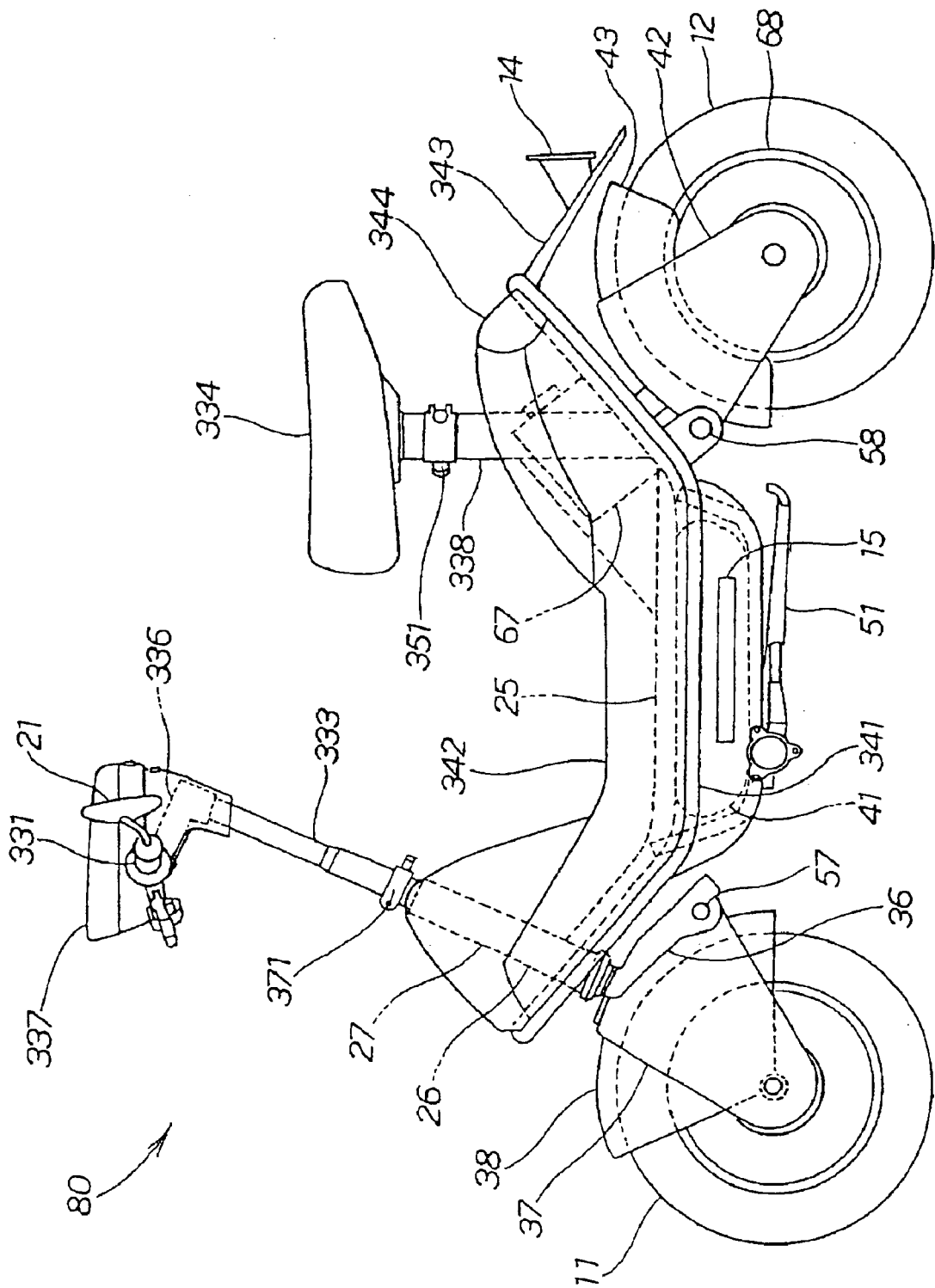
FIG. 27 is a side view showing another embodiment of the two-wheel vehicle according to the invention.

FIG. 27 is a side view showing another embodiment of the two-wheel vehicle according to the invention. In the two-wheel vehicle 80, the head pipe 26 is attached to the front end of the body frame 25, the handle shaft 27 is rotatably attached to the head pipe 26, the handle post 333 is attached to the upper end of the handle shaft 27 by a quick release mechanism 371 to be described hereinlater which is provided at the lower end of the handle post, and a handle arm 336 is attached to the upper part of the handle post 333. A pair of right and left handlebars 332 and 331 (handlebar 332 on the depth side is not shown) is foldably attached to the handle arm 336, a meter unit 336 is also attached to the handle arm 336, and the rear-view mirrors 21 and 22 (rear-view mirror 22 on the depth side is not shown) are attached to the tips of the handlebars 331 and 332, respectively, so as to be turnable in the longitudinal direction of the body around the axes of the handlebars 331 and 332, respectively, as a center. A seat post 338 is attached to the rear portion of the body frame 25, and a seat 334 is attached to the upper part of the seat post 338 so as to be fixed or rotatable in the horizontal direction. The meter unit 337 will be described in detail hereinlater. The structure of supporting the front and rear wheels 11 and 12 is the same as that of the two-wheel vehicle 10 (refer to FIG. 2).

A pipe frame 341 is attached to the outside of the body frame 25, a body cover 342 covers the pipe frame 341, a bracket 343 is foldably attached to the rear part of the pipe frame 342 so as to attach the number plate 14. Also shown is a tail lamp 344.

The action of folding the above-mentioned two-wheel vehicle 80 will now be briefly described.

Figure 28:
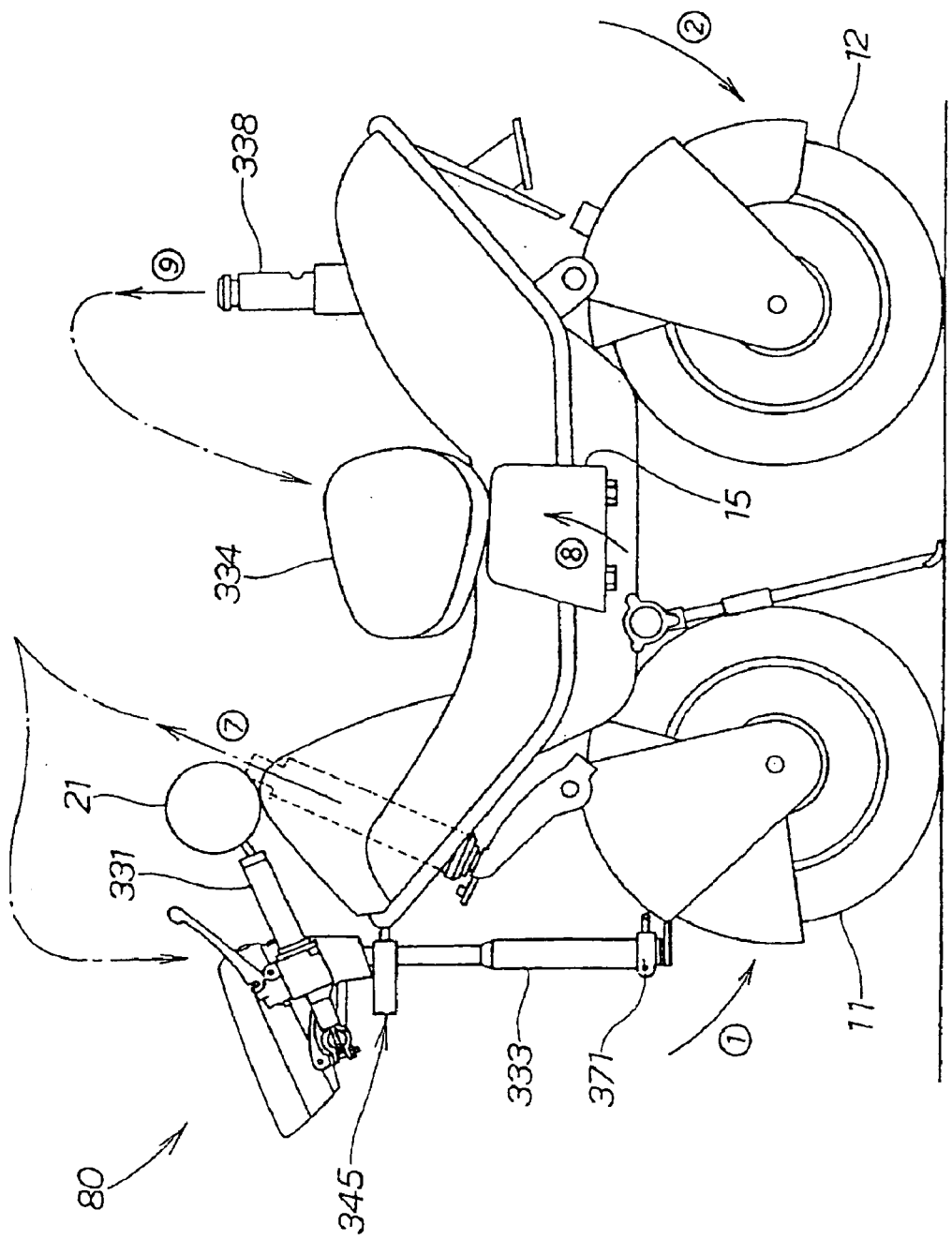
FIG. 28 is an action diagram illustrating folding of another embodiment of the two-wheel vehicle according to the invention.

FIG. 28 is an action diagram illustrating folding action of another embodiment of the two-wheel vehicle according to the invention and will be described in order in correspondence with the arrows ① to ⑨ shown in FIG. 27.

First, in a manner similar to the case of the two-wheel vehicle 10 (refer to FIG. 2), the front and rear wheels 11 and 12 are folded as shown by the arrows ① and ②.

In FIG. 26, the handlebars 331 and 332 are turned axially so as to be unlocked from the handle arm 336 (refer to FIG. 28) side, pulled from the handle arm 336 side, and folded to the inside in the vehicle width direction. The rear-view mirrors 21 and 22 are turned around the axes of the handlebars 331 and 332 so that the interval between the handlebars 331 and 332 is almost equal to the interval between the folded right and left handlebars 332 and 331.

Referring again to FIG. 29, the quick release mechanism 371 is operated to detach the handle post 333 from the handle shaft 27 in the direction of the arrow ⑦, and the handle post 333 is put vertically in a handle stand 345 provided in the front part of the body as shown in the drawing (the operation 3) may not be performed at the time of loading to a four-wheel vehicle).

The right and left steps 16 and 15 (step 16 is not shown) are kicked up and folded as shown by the arrow ⑧ (for the step 15).

The seat 334 is detached upward from the seat post 338 as shown by the arrow ⑨ and placed in the center portion of the body. In a state where the two-wheel vehicle 80 is folded, the two-wheel vehicle 80 has an almost rectangular parallelepiped which is flat in the width direction.

Figure 29B:
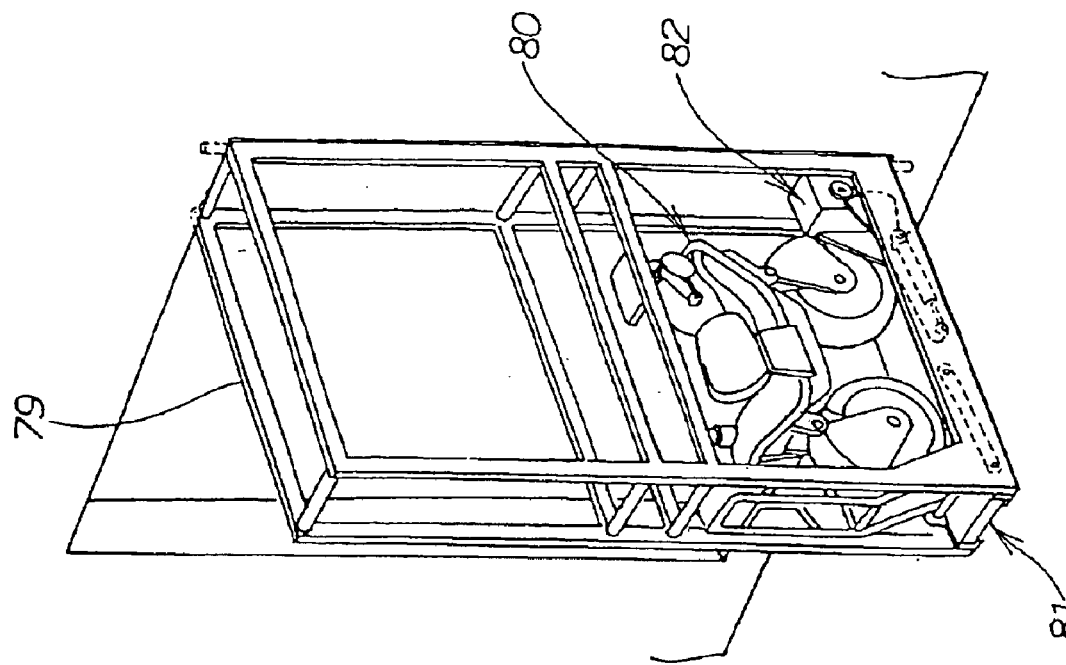
FIGS. 29(a) and 29(b) are action diagrams (of the first half) for explaining the action of loading/unloading of another embodiment of the two-wheel vehicle according to the invention and the configuration for the action.
Figure 29A:
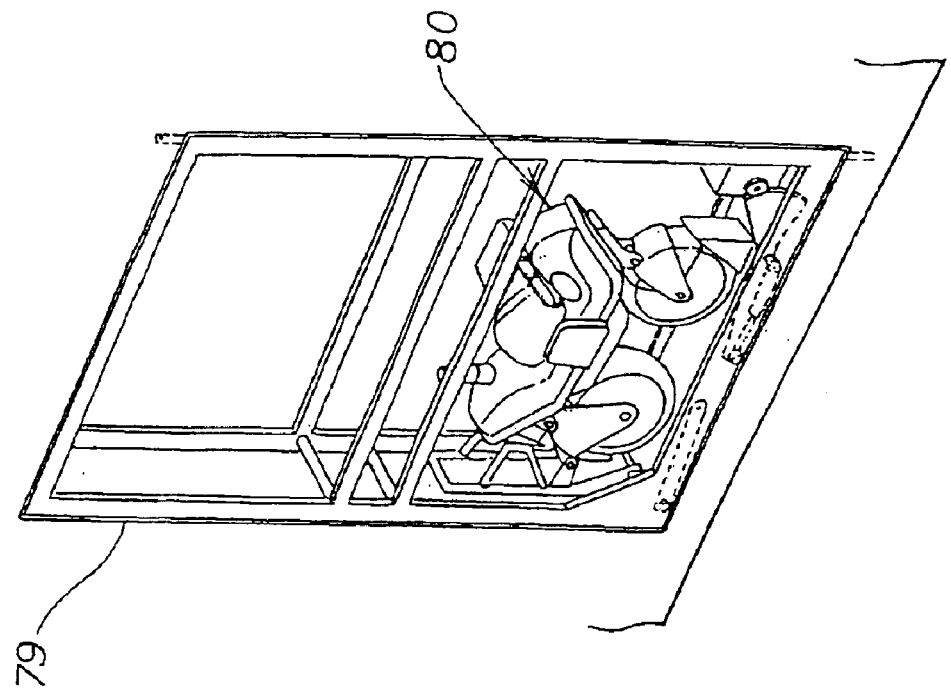

FIGS. 29(a) and 29(b) are action diagrams (of the first half) for explaining the loading/unloading action of another embodiment of the two-wheel vehicle according to the invention and the configuration for the action and show the case of unloading the two-wheel vehicle.

FIG. 29(a) shows a state where the two-wheel vehicle 80 is housed in the door 79.

In FIG. 29(b), first, the door 79 is opened and fixed in an open position by a predetermined angle by a not-shown door fixing mechanism so as not to be moved. The door 79 has the sliding device 81 and lifting device 82.

Figure 30B:
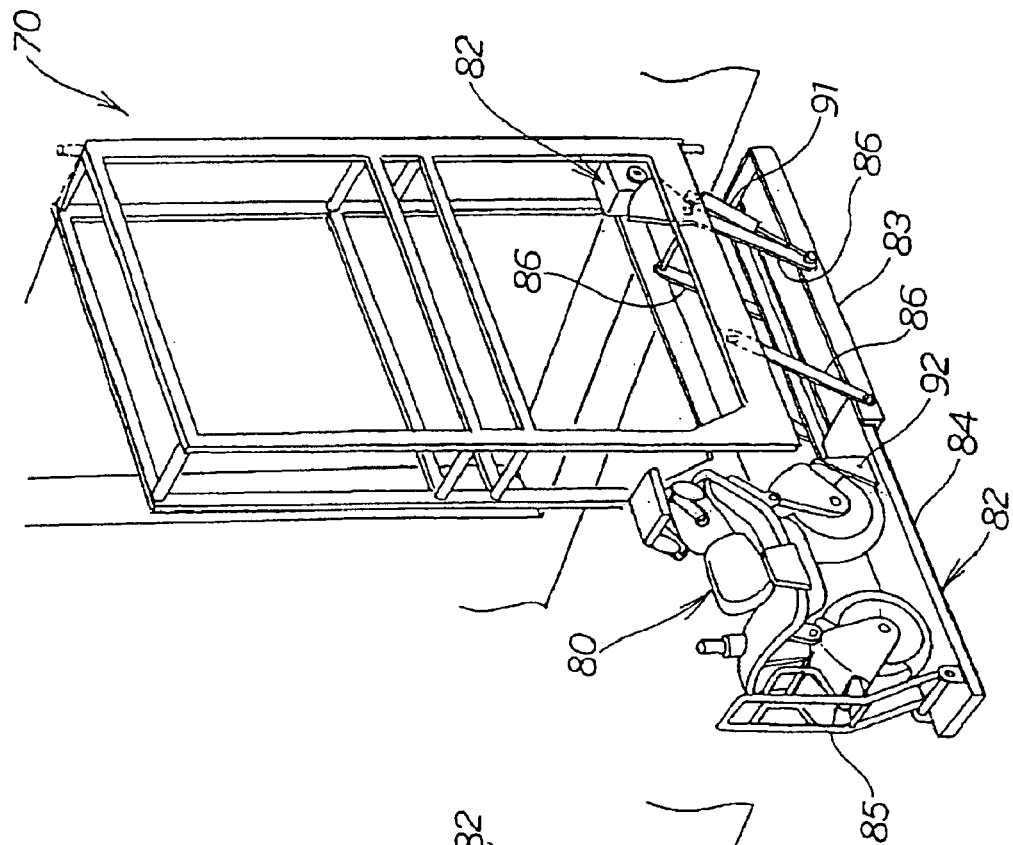
FIGS. 30(a) and 30(b) are action diagrams (of the latter half) for explaining the action of loading/unloading of another embodiment of the two-wheel vehicle according to the invention and the configuration for the action.
Figure 30A:
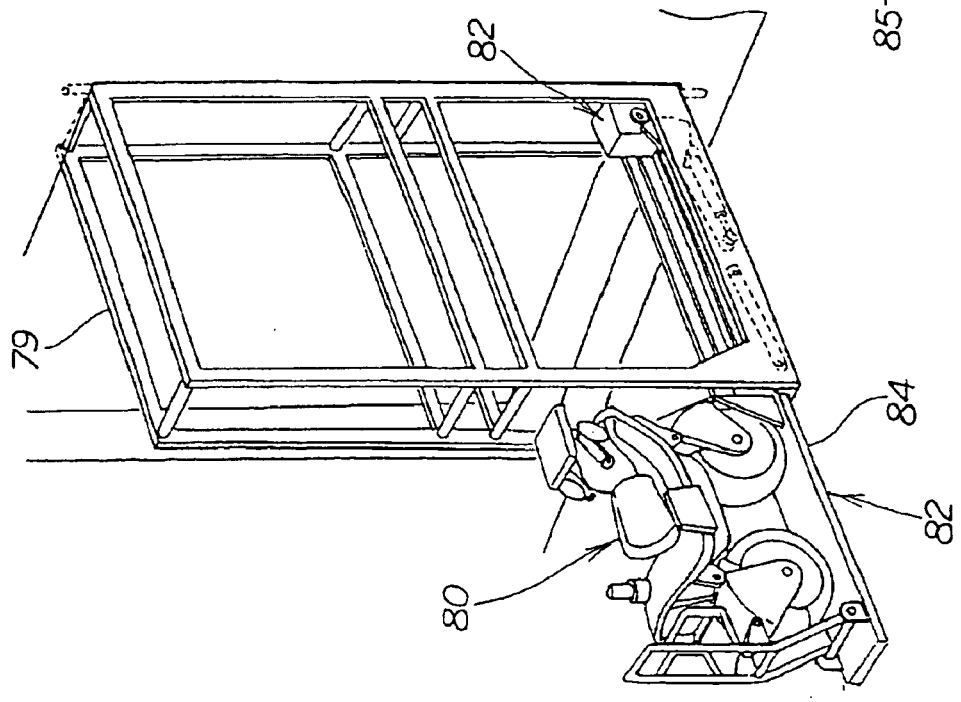

FIGS. 30(a) and 30(b) are action diagrams (of the latter half) for explaining the loading/unloading action in another embodiment of the two-wheel vehicle according to the invention and a configuration for the action and show the case of unloading the two-wheel vehicle.

In FIG. 30(a), the slide lock of the sliding device 81 is canceled and the two-wheel vehicle 80 on the slide plate 84 is pulled from the inside to the outside of the door 79 by the sliding device 81.

In FIG. 30(b), the lifting device 82 is operated to move the rail member 83 downward, thereby moving the two-wheel vehicle 80 on the slide plate 84 down, and the pressing member 85 is detached from the slide plate 84. The stand (not shown) of the two-wheel vehicle 80 is kicked up and the two-wheel vehicle 80 is unloaded from the slide plate 84. It completes the work of unloading the two-wheel vehicle 80 from the four-wheel vehicle 70.

To load the two-wheel vehicle 80 to the four-wheel vehicle 70, it is sufficient to simply reverse the above procedure.

Figure 31:
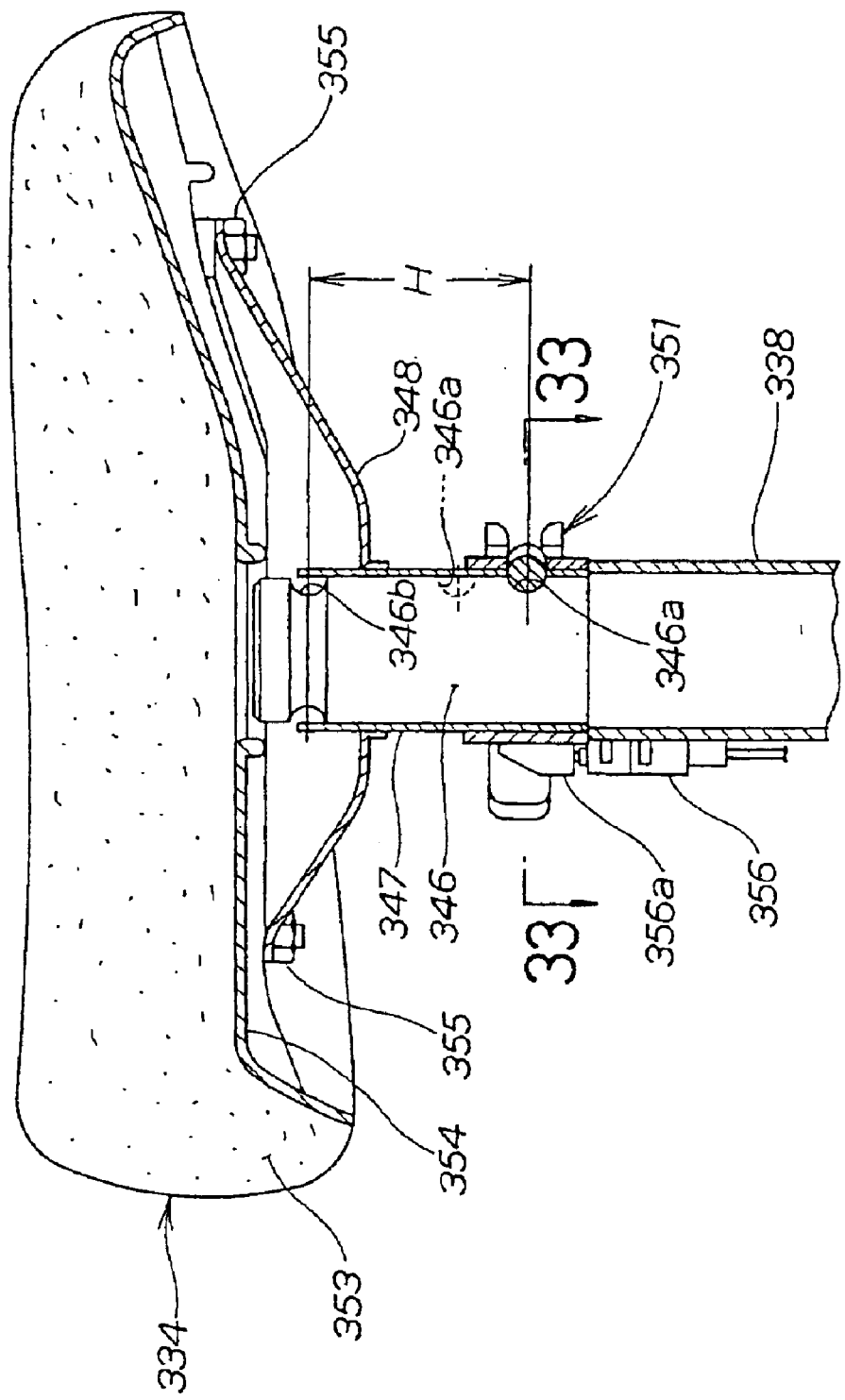
FIG. 31 is a cross section of a seat and an upper portion of a seat post of another embodiment of the two-wheel vehicle according to the invention.

FIG. 31 is a cross section of the seat and the upper part of the seat post of another embodiment of the two-wheel vehicle according to the invention and shows the following state. A cylindrical seat supporting member 346 having an outside diameter slightly smaller than the outside diameter of the seat post 338 is provided in the upper part of the seat post 338, a pipe member 347 provided integrally with the seat is fit into the seat supporting member 346, the seat 334 is attached to the pipe member 347 via the plate member 348, and a seat holding mechanism 351 with a quick release mechanism is attached to the periphery of the lower part of the pipe member 347. Also shown are a seat cushion 353, a base plate 354, and nuts 355, 355 for attaching the seat 334 to the plate member 348.

The seat supporting member 346 has a horizontal groove 346(a) horizontally formed straight in its lower part, and an annular groove 346(b) formed in its upper part around the whole periphery. Alternately, a plurality of horizontal grooves 346(a) may be provided on the upper and lower sides of the above horizontal groove 346(a) to make the height of the seat adjustable.

A seat movement detection switch 356 as detecting means is attached to the upper part of the seat post 338, and the tip of the seat movement detection switch 356 is pressed by a detection piece 356(a) as detection means attached to the pipe member 347 on the seat 334 side. When the seat 334 is moved upward from such a state, the seat movement detection switch 356 is, for example, turned on to generate a signal to a not-illustrated controller. In the case where a plurality of horizontal grooves 346(a) are provided, it is sufficient to provide a stroke member which can be moved only by a stroke amount on either the switch side or the detection piece 356(a) side.

Figure 32:
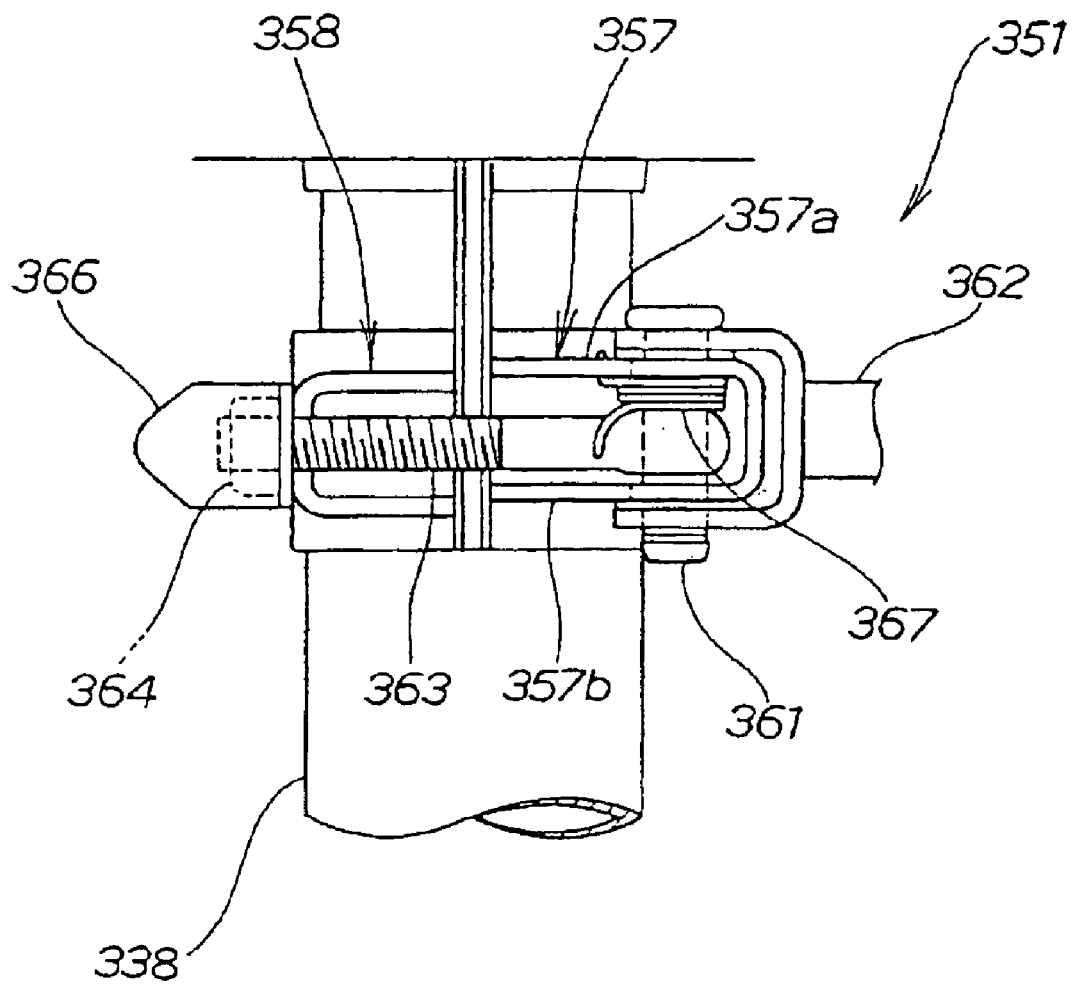
FIG. 32 is a side view of the lower portion of the seat to which a seat holding mechanism according to the invention is attached.

FIG. 32 is a side view of the lower part of the seat to which the seat holding mechanism according to the invention is attached. The seat holding mechanism 351 includes: base members 357 and 358 fixed to the external face of the seat post 338; a pin 361 rotatably penetrating walls 357(a) and 357(b) of the base member 357; a lever 362 integrally attached to both ends of the pin 361; a holding bolt 363 having one end swingably attached to the intermediate portion of the pin 361 and the other end in which a male screw is formed; a nut 364 to be screwed to the male screw of the holding bolt 363; a nut cover 366 covering the nut 364; and a torsion spring 367 for setting the holding bolt 363 near to the axis of the pipe member 347.

Figure 33:
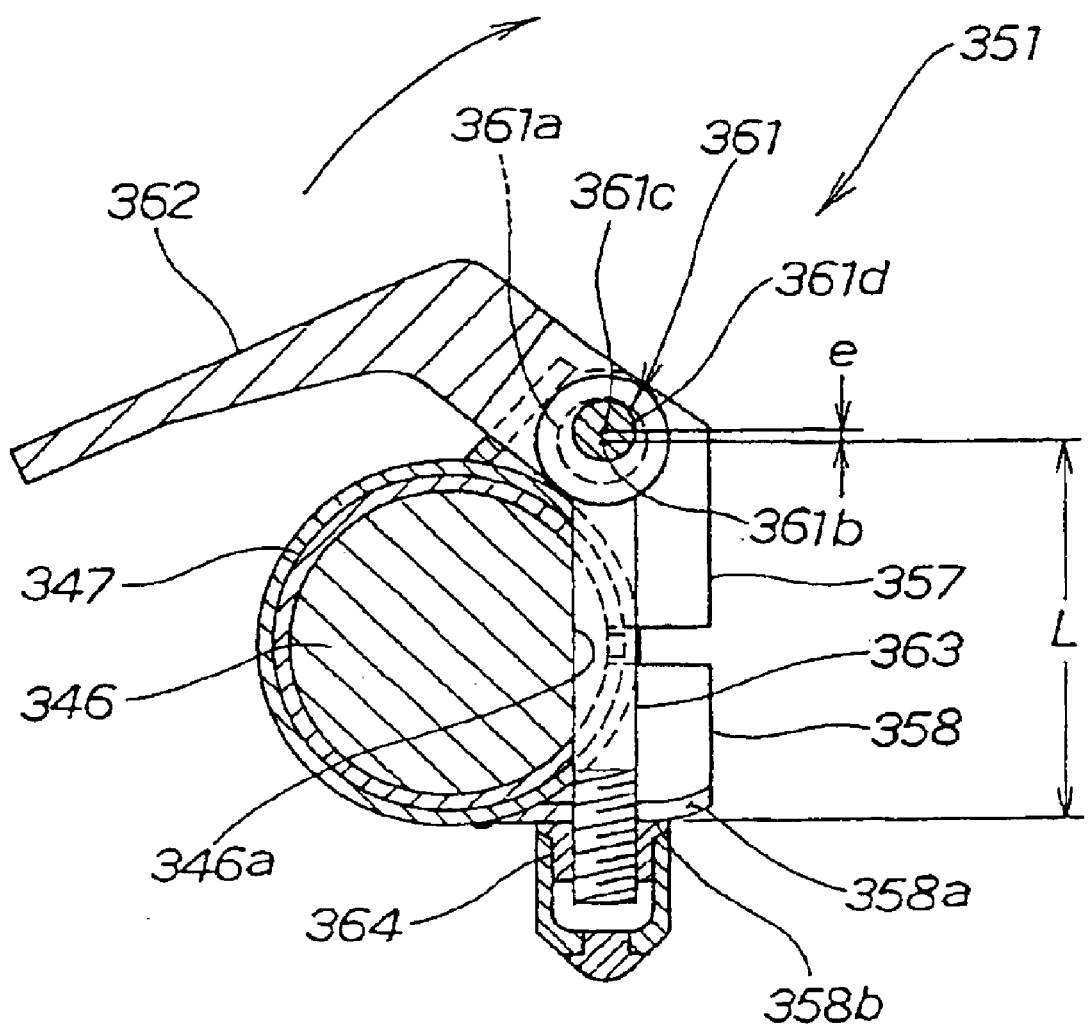
FIG. 33 is a cross section taken along line 33—33 of FIG. 31.

FIG. 33 is a cross section taken along line 33—33 of FIG. 31, and the base member 358 has a notch 358(a) for passing the holding bolt 363.

The pin 361 has a large diameter part 361a rotatably supported by the base member 357 and a small diameter part 361d having an axis 361c decentered from an axis 361b of the large diameter part 361a only by an eccentricity amount "e". To the small diameter part 361d, the holding bolt 363 is rotatably attached. Also shown are a nut contact face 358(b) of the base member 358, which comes into contact with the nut 364.

The horizontal groove 346(a) is a portion in which the holding bolt 363 passes.

When the distance between the axis 361b of the large diameter part 361a of the pin 361 and the nut contact face 358(b) of the base member 358 is L, the distance L is always constant irrespective of the position of the lever 362. When the lever 362 is tilted in the direction of the arrow, the axis 361c of the small diameter part 361d moves downward of the drawing with respect to the axis 361b of the large diameter part 361a, so that tightening of the base members 357 and 358 is gradually reduced via the holding bolt 363 connected to the small diameter part 361d. When the lever 362 is tilted in the direction opposite to the direction of the arrow from that position of the lever 362, the axis 361c of the small diameter part 361d moves to the upper part of the drawing, so that the tightening of the base members 357 and 358 is gradually increased. The tightening force on the base members 357 and 358 can be increased as the nut 364 is fastened to the holding bolt 363, and can be decreased as the nut 364 is loosened.

Generally, the base members 357 and 358 are tightened by the nut 364. However, long time is required and a tool is necessary.

In the invention, the base members 357 and 358 can be quickly tightened or released by the quick release mechanism.

The action of the seat holding mechanism 351 will now be described.

The method of moving the seat 334 upward from the position shown in FIG. 31 only by height H and holding the seat 334 will be described.

Figure 34A:
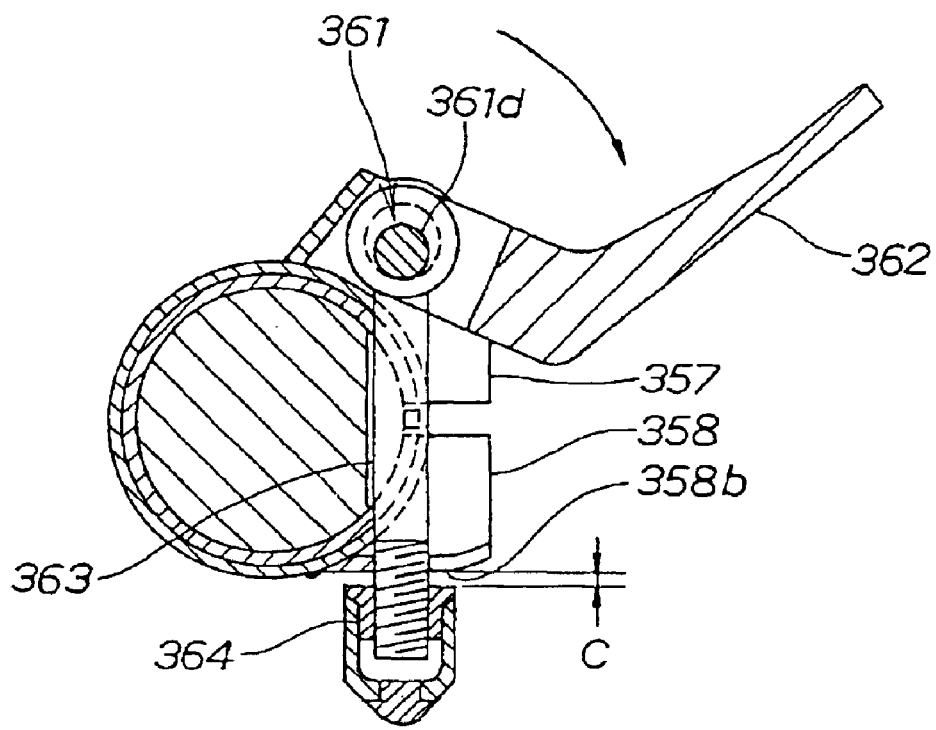
FIGS. 34(a) and 34(b) are first action diagrams illustrating the action of the seat holding structure according to the invention.
Figure 34B:
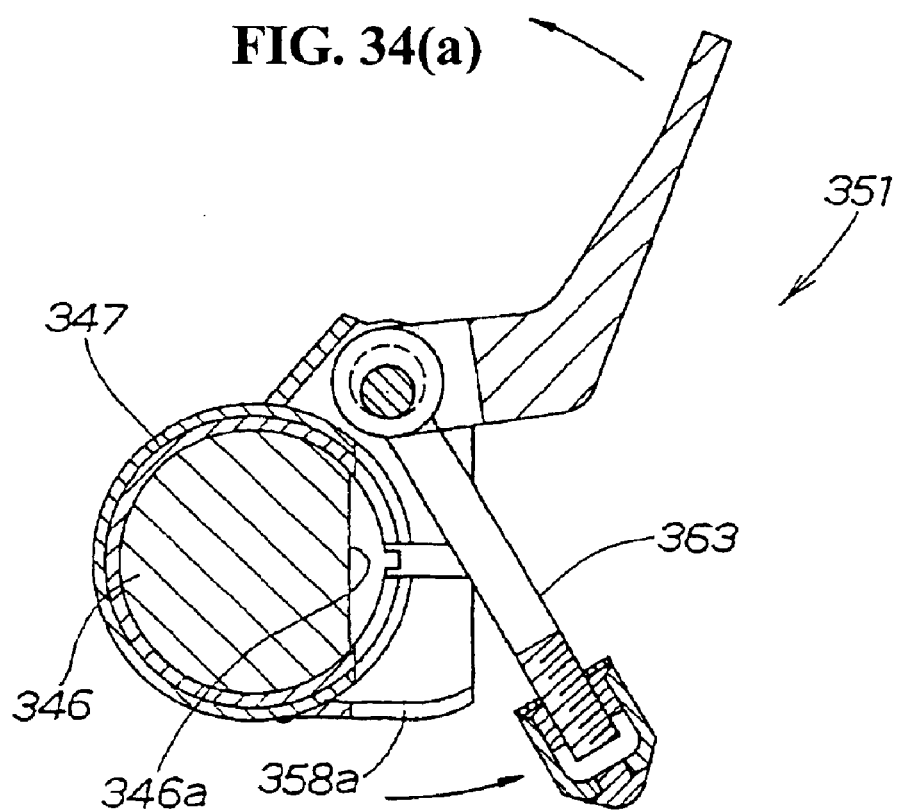

FIGS. 34(a) and 34(b) are first action diagrams illustrating the action of the seat holding structure according to the invention.

First, when the lever 362 in the position shown in FIG. 33 is tilted in the direction of the arrow of FIG. 34(a), the small diameter portion 361d of the pin 361 moves downward in the drawing. As a result, clearance C is created between the nut 364 and the nut contact face 358(b).

In FIG. 34(b), the holding bolt 363 is allowed to swing in the direction of the arrow against the resilient force of the torsion spring 367 (refer to FIG. 32) so as to come off from the horizontal groove 346(a). As a result, the pipe member 347 of the seat 334 (refer to FIG. 31) can be moved upward from the seat supporting member 346.

Figure 35:
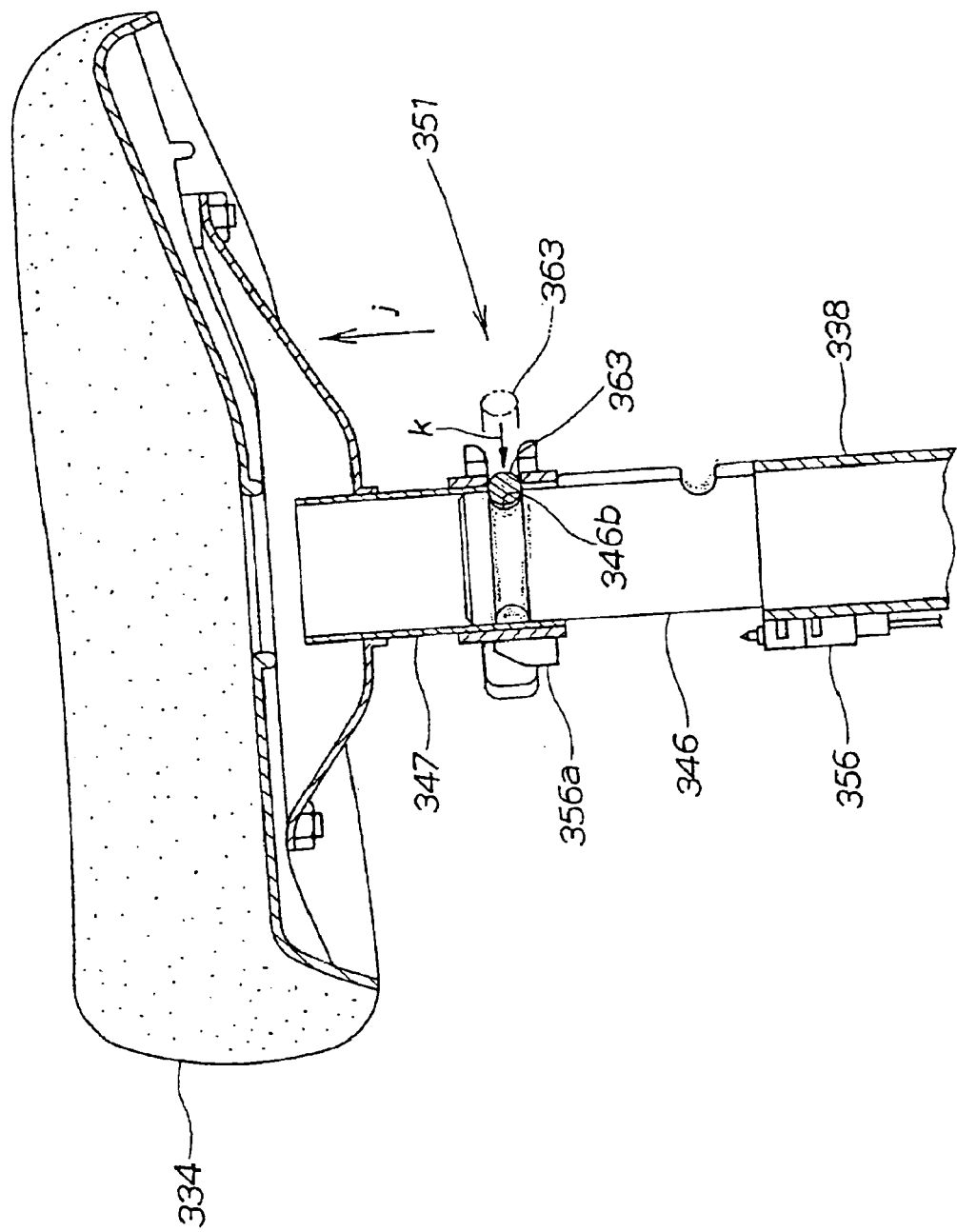
FIG. 35 is a second action diagram illustrating the action of the seat holding structure according to the invention.

FIG. 35 is a second action diagram illustrating the action of the seat holding structure according to the invention.

After the seat 334 is pulled up as shown by the arrow "j", the holding bolt 363 is fit into the annular groove 346(b) as shown by the arrow "k". The lever 362 is tilted in the direction opposite to the direction shown in FIG. 34(a) to move the holding bolt 363 upward in the drawing, thereby tightening the base members 357 and 358. By the operation, the seat 334 can be held by the seat supporting member 346 so as to be rotatable in the horizontal direction. In this case, by loosening the nut 364 from the holding bolt 363, horizontal rotation is more smoothly carried out.

Since the detection piece 356(a) moves apart from the tip of the seat movement detection switch 356 at this time, in response to an ON signal from the seat movement detection switch 356, the not-shown controller controls the two-wheel vehicle 80 (refer to FIG. 27) so as not to be driven. In the embodiment, since the drive source is the electric motor, the motor is controlled not to be operated. In the case where the drive source is an engine, for example, ignition may be controlled not to be performed.

As described above by referring to FIG. 31, according to the invention, first, the seat holding structure of a vehicle, for holding the seat 334 at the seat post 338 and capable of changing the position in the vertical direction of the seat 334 is characterized in that the seat holding mechanism 351 for holding the seat 334 so as to be rotatable in the horizontal direction at a predetermined height is provided on the seat 334 side.

For example, when the seat 334 is adjusted at a predetermined height so as to be rotatable in the horizontal direction, and adjusted at another height and fixed, by fixing the seat 334 in the driving mode, a riding state can be assured. In a non-driving mode, by adjusting the seat at the predetermined height, the seat 334 can be rotated in the horizontal direction and can be used as a chair. Consequently, new product attractiveness can be obtained. In the case of loading the two-wheel vehicle into a four-wheel vehicle, the two-wheel vehicle can be used as a chair which is used together with a shelf or table provided for the four-wheel vehicle, so that quite new value is added.

Second, as shown in FIGS. 31 to 33, the seat holding mechanism 351 is provided with the quick release mechanism for quickly releasing holding of the seat 334 at the seat post 338. At the seat height in the driving mode, by fitting the holding bolt 363 as a component of the quick release mechanism into the horizontal groove 346(a) provided for the seat post 338, the seat 334 is fixed to the seat post 338, thereby providing a riding state. At the predetermined height, by fitting the holding bolt 363 into the annular groove 346(b) formed in the periphery of the seat post 338, the seat 334 is rotatably held at the seat post 338.

By the quick release mechanism, the position in the vertical direction of the seat 334 can be easily changed. In addition, the seat 334 can be rotatably held or fixed with a simple structure.

Third, as shown in FIGS. 32 and 35, the seat holding mechanism 351 is provided with the detection piece 356(a) for detecting the predetermined height of the seat 334, and control means for controlling the vehicle 80 (refer to FIG. 27) so as not to be driven on the basis of the detection signal generated when the detection piece 356(a) detects the predetermined height of the seat 334.

In a state where the seat 334 can be used as a chair, the driving of the vehicle 80 can be inhibited. Thus, the vehicle can be used as a chair without awareness that the chair is the vehicle.

Fourth, as can be seen in FIGS. 5, 28, and 31, in the vehicle 80 having the seat holding structure, the holding of the seat 334 is released by the seat holding mechanism 351 so that the seat 334 can be detached from the seat post 338, and the projected parts of the body are constructed to be foldable. After folding the projected parts, the vehicle 80 is loaded on the four-wheel vehicle 70.

After loading to the four-wheel driving 70, the seat 334 can be attached to the seat post 338 so as to be rotatable in the horizontal direction and the resultant can be used as a chair in the four-wheel vehicle 70. Thus, added value of the in-vehicle two-wheel vehicle can be increased. On the outside of the four-wheel vehicle as well, the two-wheel vehicle can be used as a chair. It is therefore very convenient in occasions such that the user stops the two-wheel vehicle and has conversation with friends.

Figure 36:
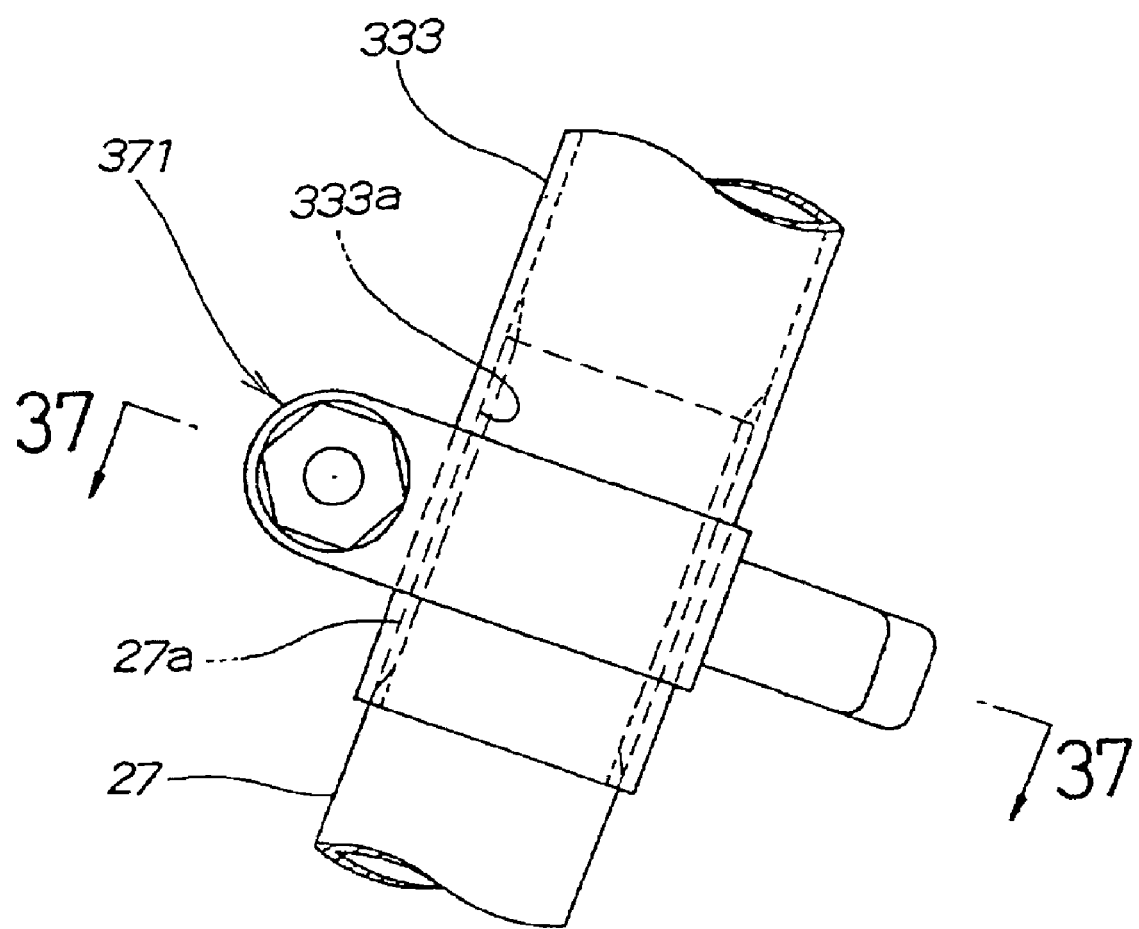
FIG. 36 is a side view of a handle post attaching portion of another embodiment of the two-wheel vehicle according to the invention.

FIG. 36 is a side view of the handle post attaching portion of another embodiment of the two-wheel vehicle according to the invention and shows the following state. A male spline 27(a) is formed in the upper part of the handle shaft 27, a female spline 333a is formed at the lower end of the handle post 333, the male spline 27(a) is fit into the female spline 333a, the handle post 333 and the handle shaft 27 are tightened by the quick release mechanism 371 with the quick release mechanism attached to the lower end of the handle post 333, and the handle post 333 is fixed at the handle shaft 27.

FIG. 37 is a cross section taken along line 37—37 of FIG. 36, and the quick release mechanism 371 includes: a band member 372 attached around the handle post 333; a first receiving member 373 in contact with a side face of one (372a) of ends 372a and 372b of the band member; a second receiving member 374 adjacent to the first receiving member 373; a lever 375 having a swollen curved surface 375a in contact with a recessed curved surface 374a of the second receiving member 374; a holding bolt 378 swingably coupled to the lever 375 by a coupling pin 377 and inserted to through holes 372c and 372d opened in the ends 372a and 372b; and a nut 381 screwed around the end of the holding bolt 378.

The swollen curved surface 375a of the lever 375 is a face which changes in distance from the axis 382 of the coupling pin 377. The drawing shows a state where the distance between the axis 382 to the swollen curved surface 375a is made long, and the handle post 333 and the handle shaft 27 are tightened. Different from the seat, a steering force is applied to the handlebar, so that a spline having a predetermined length is formed axially between the handle post 333 and the handle shaft 27 to regulate the movement in the rotation direction.

The handle post 333 is a member in which a slit 333b for allowing deflection in the circumferential direction is formed.

Figure 38:
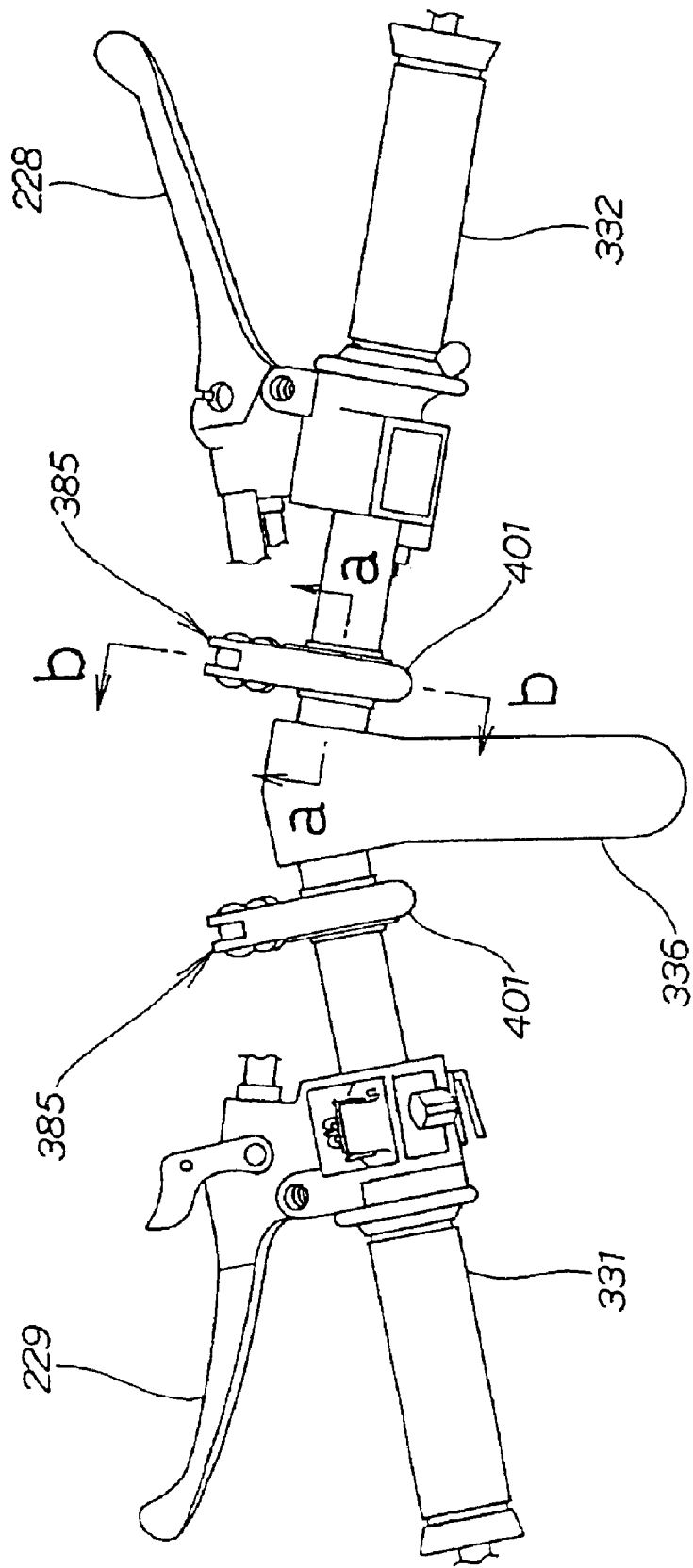
FIG. 38 is a plan view of a handlebar according to the invention.

FIG. 38 is a plan view of the handlebar according to the invention and shows a state where a meter unit which will be described hereinlater is detached. FIG. 38 shows that each of a connecting portion between the handle arm 336 side and the handlebar 331 and a connecting portion between the handle arm 336 side and the handlebar 332 is provided with a quick release mechanism 385 with the quick release mechanism.

As will be described in detail hereinlater, each of the handlebars 331 and 332 can be folded by being released by the quick release mechanism 385.

Figure 39A:
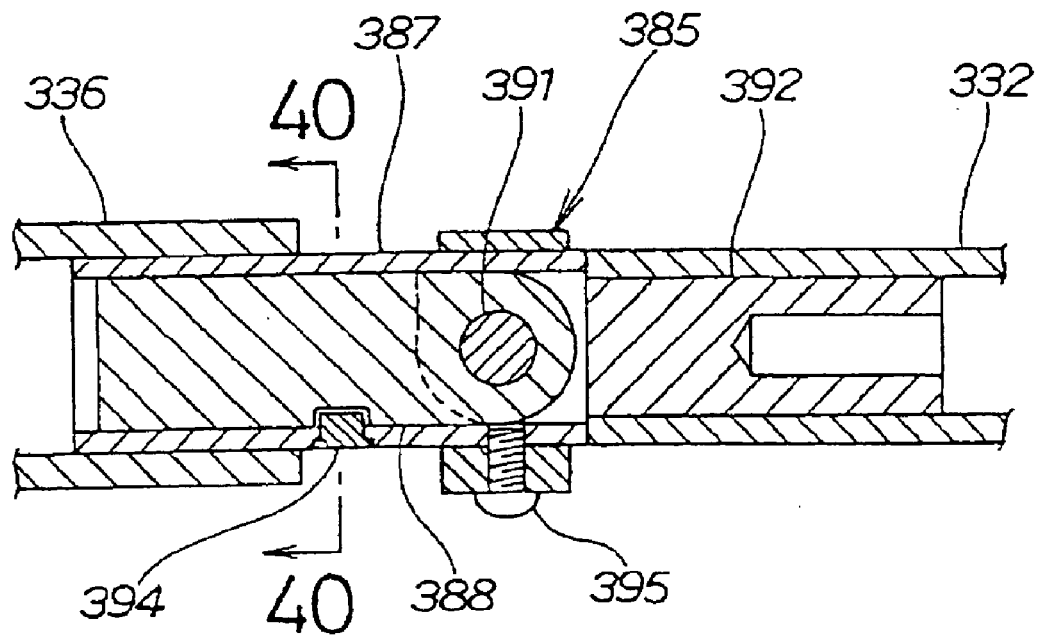
FIGS. 39(a) and 39(b) are cross sections of a handlebar portion according to the invention.
Figure 39B:
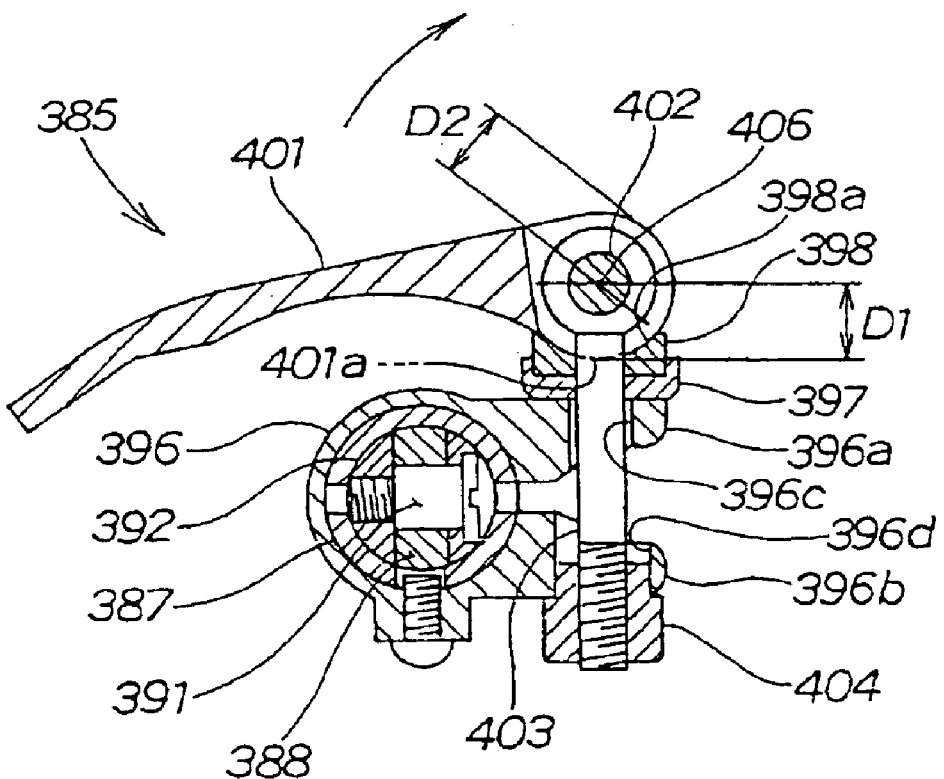

FIGS. 39(a) and 39(b) are cross sections of the handlebar portion according to the invention.

FIG. 39(a) is a cross section taken along line a—a of FIG. 38 and shows a state where a pipe member 387 is attached to the handle arm 336, a slide member 388 is movably inserted in the pipe member 387, a bar 392 is swingably attached to the slide member 388 via a bolt 391 as an axis of folding, and the handlebar 332 is attached to the bar 392. A projection piece 394 is attached to the pipe member 387 so as to be projected toward the slide member 388 side, and a bolt 395 fixes the quick release mechanism 385 to the pipe member 387.

FIG. 39(b) is a cross section taken along line b—b of FIG. 38. The basic structure of the quick release mechanism 385 is the same as that of the quick release mechanism 371 shown in FIG. 37.

Specifically, the quick release mechanism 385 includes: a band member 396 attached around the pipe member 387; a first receiving member 397 in contact with a side face of one (396(a)) of ends 396(a) and 396(b) of the band member 396; a second receiving member 398 adjacent to the first receiving member 397; a lever 401 having a swollen curved surface 401a in contact with a recessed curved surface 398a of the second receiving member 398; a holding bolt 403 swingably coupled to the lever 401 by a coupling pin 402 and inserted to through holes 396c and 396d opened in the ends 396(a) and 396(b); and a nut 404 screwed around the end of the holding bolt 403.

The swollen curved surface 401a of the lever 401 is a face which changes in distance from the axis 406 of the coupling pin 402. Specifically, in the case where the lever 401 is in the position in the drawing, when the distance between the swollen curved surface 401a in contact with the recessed curved surface 398a and the axis 406 is D1 and the distance between the swollen curved surface 401a in contact with the recessed curved surface 398a and the axis 406 in a state where the lever 406 is tilted in the direction of the arrow is D2, D1>D2 is satisfied (when the lever 401 is tilted in the direction of the arrow, the distance D1 gradually decreases and becomes equal to D2).

The bolt 391 is a member for connecting the coupling portion in which the narrowed slide member 388 is inserted to the two-pieces divided type bar 392.

Figure 40:
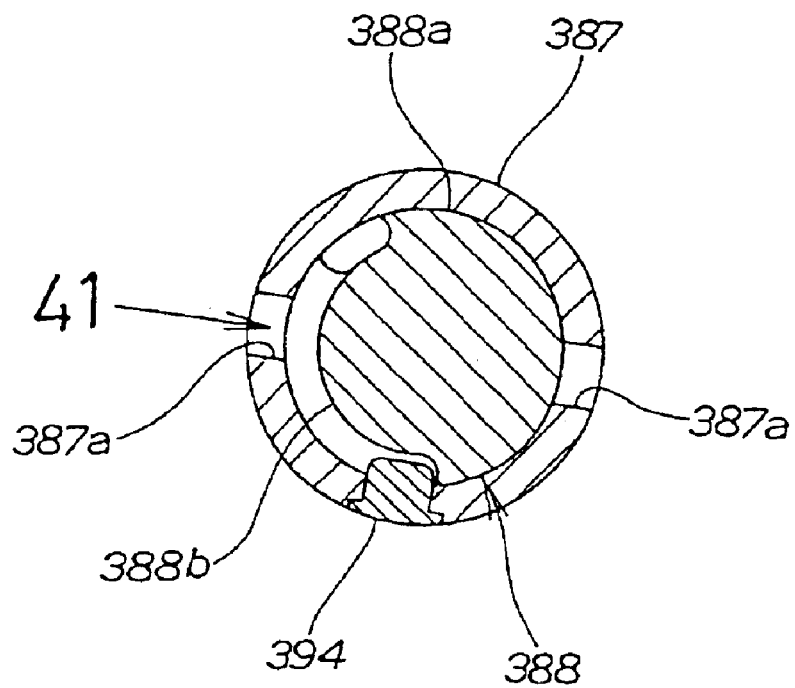
FIG. 40 is a cross section taken along line 40—40 of FIG. 39.

FIG. 40 is a cross section taken along line 40—40 of FIG. 39 and shows that a circumferential groove 388b extending in the circumferential direction is formed in an external face 388a of the slide member 388, and the tip of the projection piece 394 is inserted in the circumferential groove 388b. Also shown are slits 387(a), 387(a) which are formed in the pipe member 387 to allow deflection in the circumferential direction.

Figure 41:
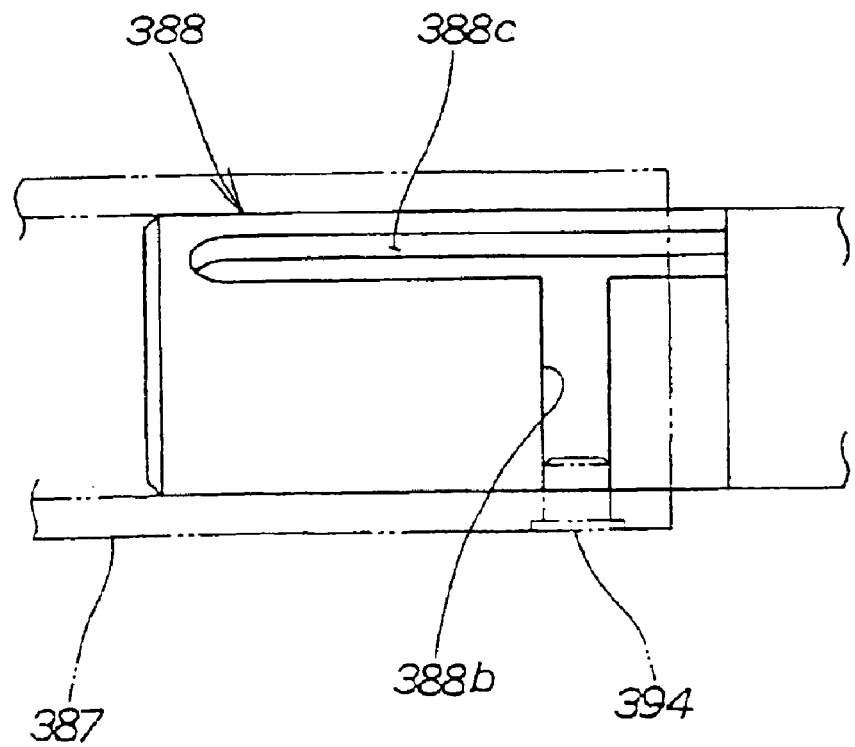
FIG. 41 is a side view of a slide member according to the invention.

FIG. 41 is a side view of the slide member according to the invention, which is seen from the arrow 41 in FIG. 40 (where the pipe member 387 is shown by an imaginary line).

The slide member 388 is a member in which a vertical groove 388c which perpendicularly crosses the circumferential groove 388b is formed.

The action of folding the handlebars 331 and 332 will now be described.

Figure 42:
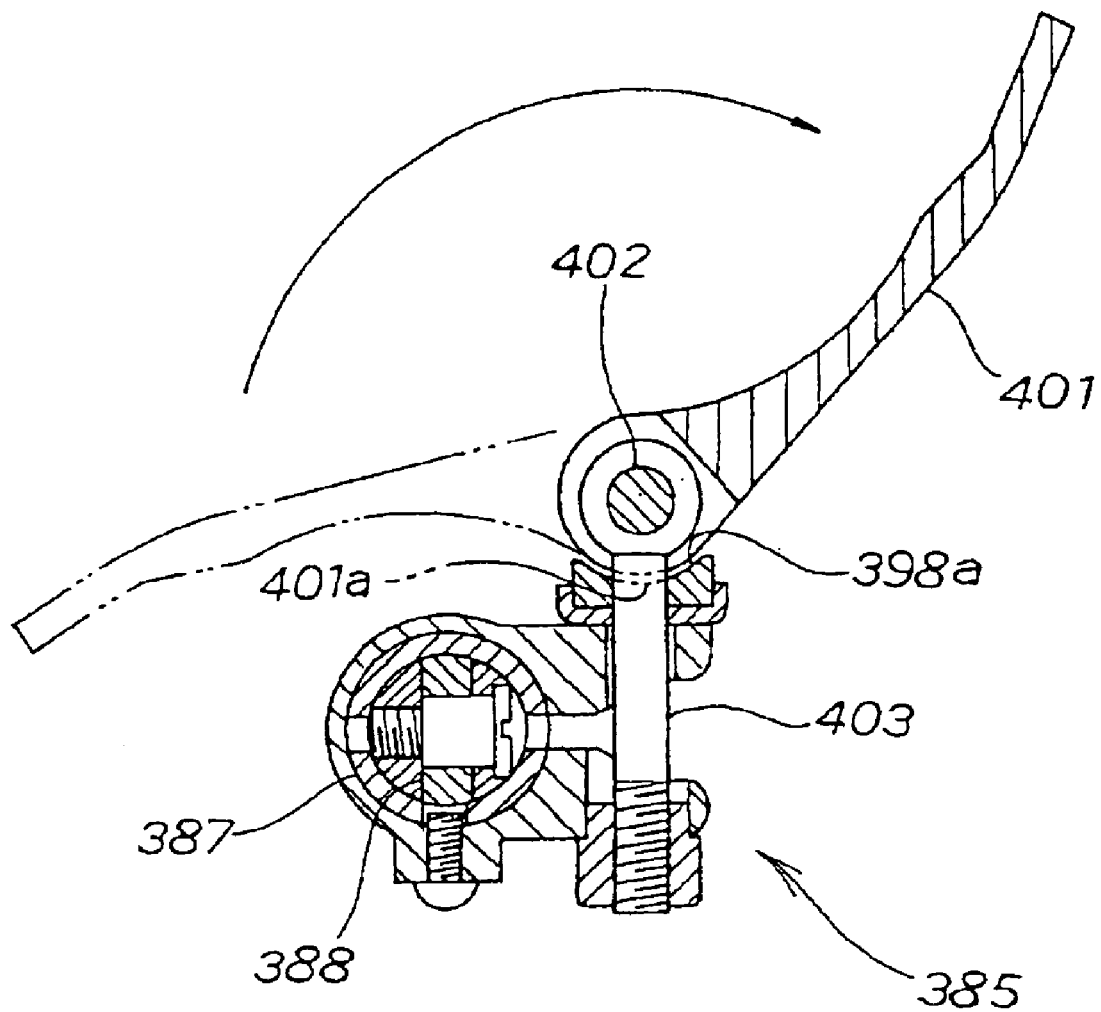
FIG. 42 is a first action diagram illustrating a handle folding action according to the invention.

FIG. 42 is a first action diagram illustrating the handle folding action according to the invention.

First, the lever 401 of the quick release mechanism 385 provided at the root of each of the handlebars 331 and 332 shown in FIG. 38 is tilted in the direction of the arrow shown in FIG. 42. As a result, as described by referring to FIG. 39(b), since the swollen curved surface 401a of the lever 401 is a curved face which changes in distance from the axis 406 of the coupling pin 402, the distance between the swollen curved surface 401a in contact with the recessed curved surface 398a and the axis 406 after the lever 401 is tilted is shorter than that before the lever 401 is tilted. In FIG. 42, a gap is accordingly created between the recessed curved surface 398a and the swollen curved surface 401a when the lever 401 is tilted. The tightening of the pipe member 387 is therefore canceled and the slide member 388 becomes rotatable in the pipe member 387.

Figure 43:
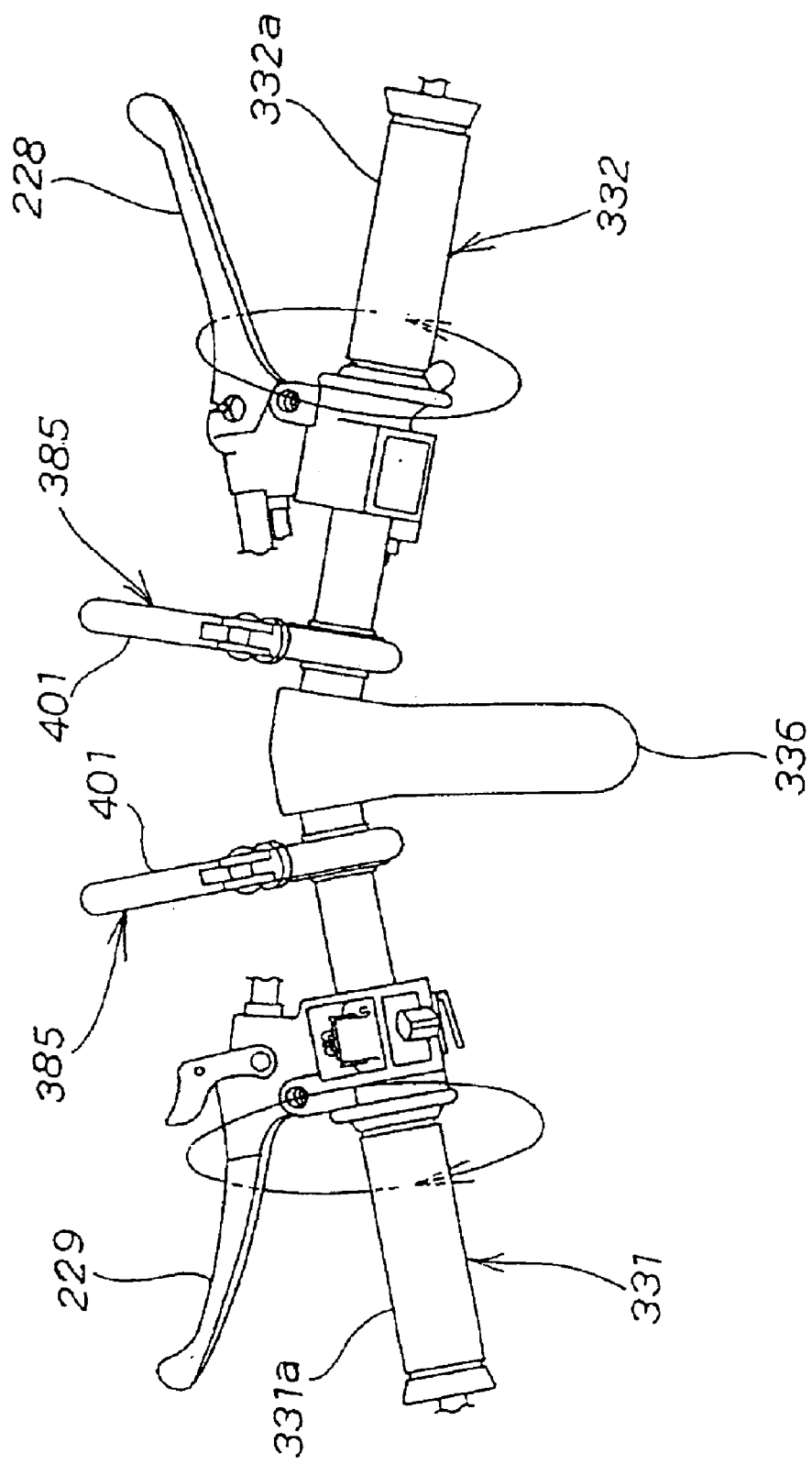
FIG. 43 is a second action diagram illustrating the handle folding action according to the invention.

FIG. 43 is a second action diagram illustrating the handle folding action according to the invention.

After the levers 401 and 401 of the quick release mechanisms 385 and 385 are tilted, the handlebars 331 and 332 are turned in the directions of the arrows. To be specific, the handlebars 331 and 332 are turned so that the rear brake lever 229 and front brake lever 228 move upward from the front side of the left and right grips 332a and 331a.

Figures 44A, 44B:
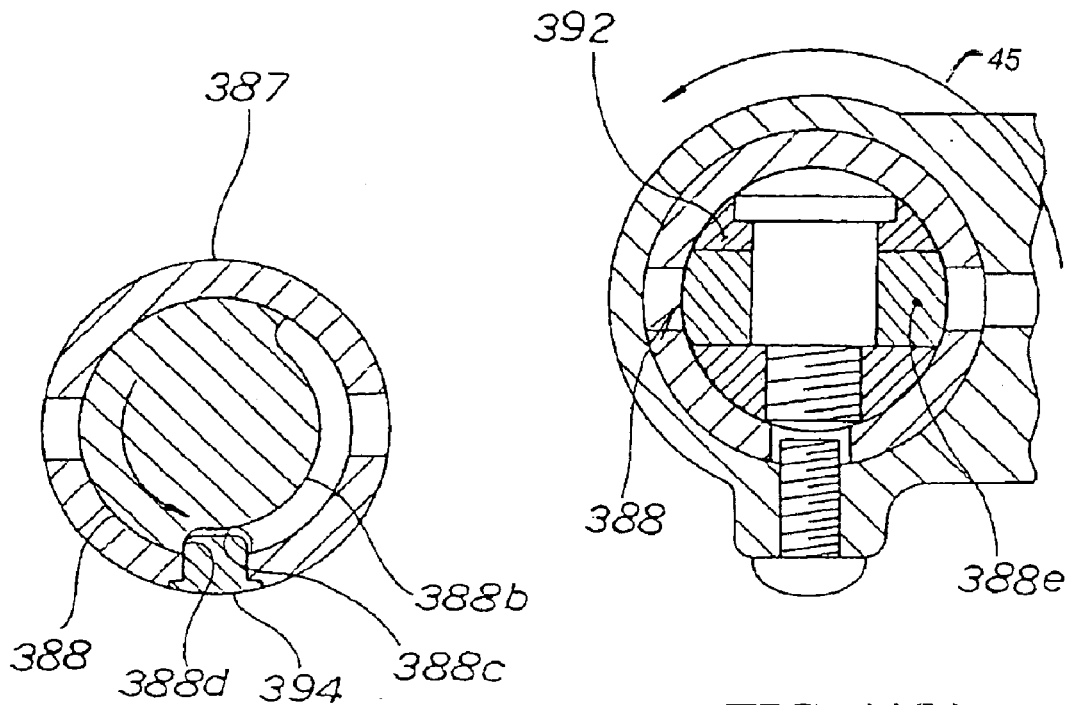
FIGS. 44(a) and 44(b) are third action diagrams illustrating the handle folding action according to the invention.

FIGS. 44(a) and 44(b) are third action diagrams illustrating the handle folding action according to the invention. FIG. 44(a) is a cross section of the same position as that of FIG. 40, and FIG. 44(b) is a cross section of the same position as that of FIG. 39(b). Although the action on the handlebar 332 side will be described, the action is the same on the handlebar 331 side.

In FIG. 44(a), when the handlebar 332 (refer to FIG. 43) turns, the slide member 388 turns in the pipe member 387. At this time, when the projection piece 394 comes into contact with an end 388d of the circumferential groove 388b, the turning of the slide member 388 is stopped. The end 388d also serves as a side wall of the vertical groove 388c.

In FIG. 44(b), by rotating the connecting portion between the slide member 388 and the bar 392, a thin portion 388e of the slide member 388 becomes almost horizontal.

Figure 45A:
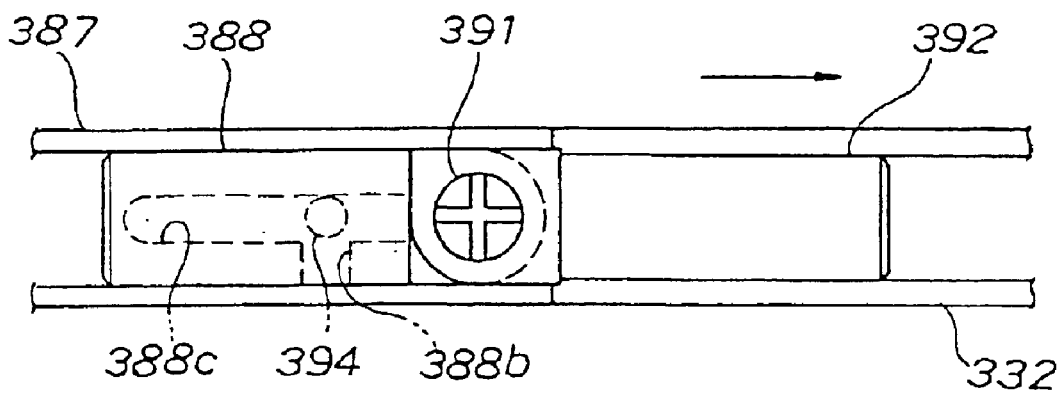
FIGS. 45(a) to 45(c) are fourth action diagrams illustrating the handle folding action according to the invention.
Figure 45B:
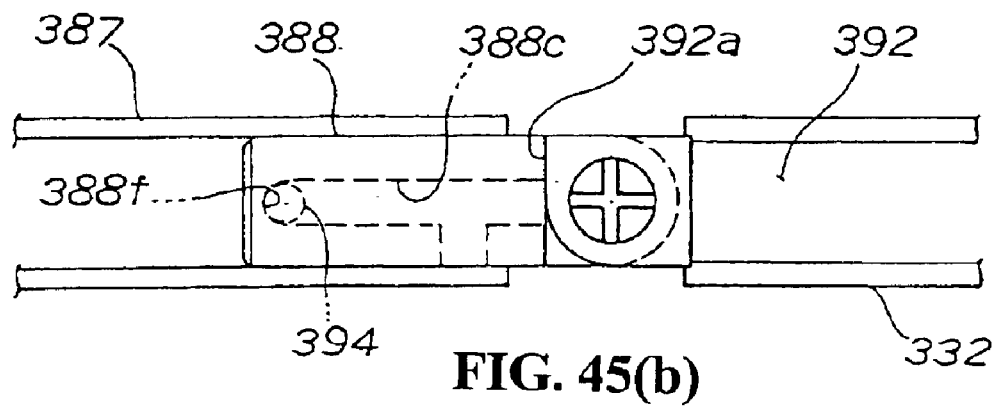
Figure 45C:
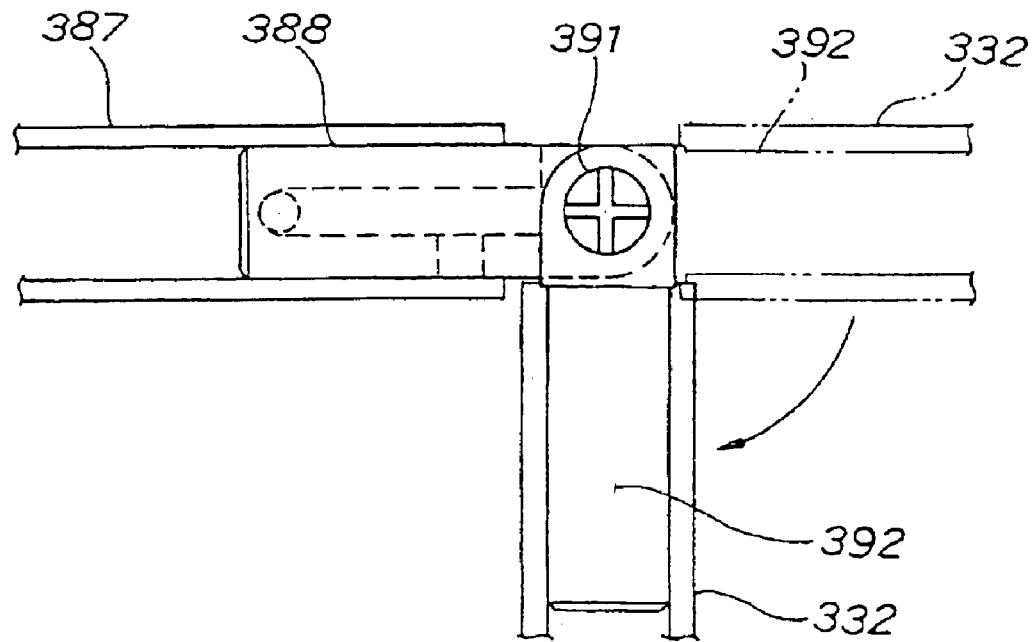

FIGS. 45(a) to 45(c) are fourth action diagrams illustrating the handle folding action according to the invention and are views of the slide member 388, bar 392, bolt 391, and the like seen from the above of the bolt 391 (corresponding to the view seen from the arrow 45 of FIG. 44(b)).

FIG. 45(a) shows a state where the projection piece 394 of FIG. 44(a) comes into contact with the end 388d of the circumferential groove 388b. That is, the projection piece 394 is positioned in the vertical groove 388c. Therefore, the slide member 388 becomes movable in the longitudinal direction in the pipe member 387 and can be pulled out of the body from the pipe member 387 when the user grips of the handlebar 332 side by his/her hand as indicated by the arrow.

FIG. 45(b) shows a state where the connection portion with the bar 392 of the slide member 388 is pulled out from the pipe member 387. When the projection piece 394 comes into contact with an end 388f of the vertical groove 388c, an end 392a of the bar 392 is completely out from the pipe member 387. Therefore, the bar 392 can swing around the slide member 388.

FIG. 45(c) shows a state where the bar 392 and handlebar 332 swing to this side almost to the right angle around the bolt 391 as a rotation axis as shown by the arrow, that is, the bar 392 and handlebar 332 are folded.

Figure 46:
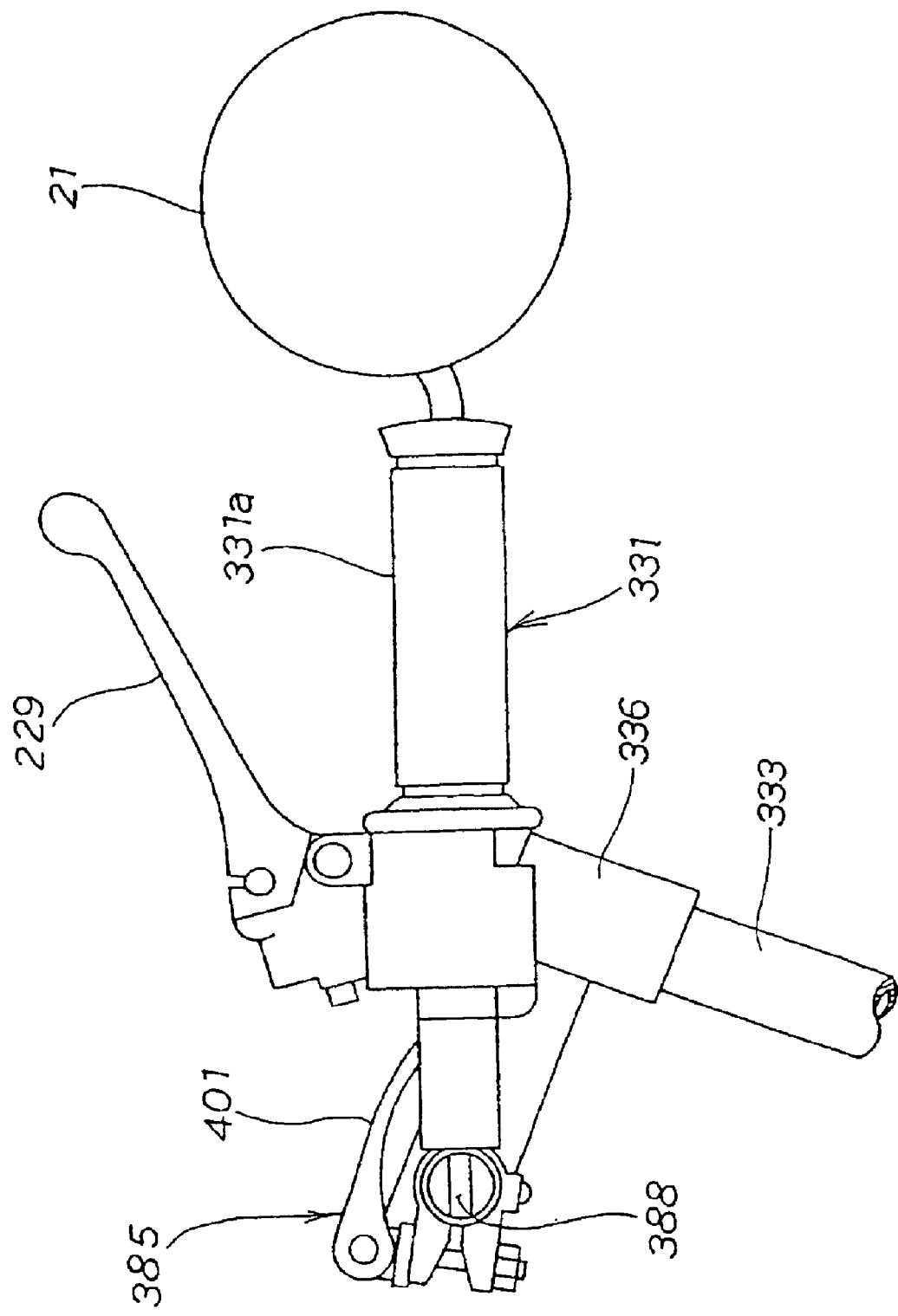
FIG. 46 is a fifth action diagram illustrating the handle folding action according to the invention.

FIG. 46 is a fifth action diagram illustrating the handlebar folding action according to the invention and is a side view of the handlebars 331 and 332 (the handlebar 332 on the depth side is not shown).

When the handlebars 331 and 332 are folded, as shown in the diagram, the rear brake lever 229 and the front brake lever 228 (on the depth side which is not shown) are positioned above the left and right grips 331a and 32a (the grip 332a on the depth side is not shown). After folding the handlebars 331 and 332, the axial portions of the rear-view mirrors 21 and 22 (the rear-view mirror 22 on the depth side is not shown) are also turned so that their reflecting surfaces face the sides of the body as described above. The levers 401 of the two quick release mechanisms 385 are tilted rearward to lock the slide member 388 so as not to rotate and slide. In such a manner, the handlebars 331 and 332 are housed in the width B of the number plate.

Figure 47:
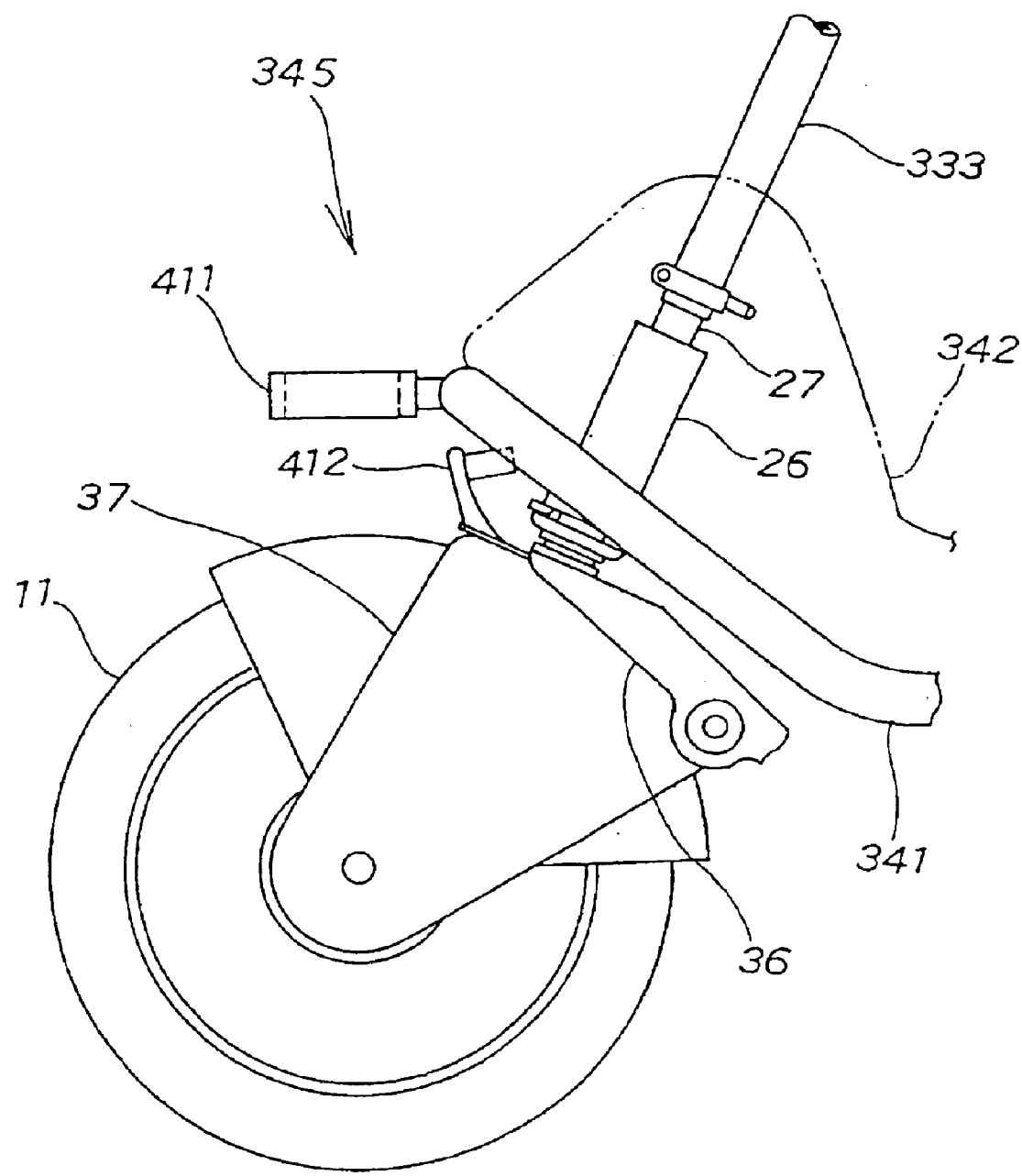
FIG. 47 is a side view of the front portion of the body according to the invention.

FIG. 47 is a side view of the front portion of the body according to the invention, and shows that the handle stand 345 is constructed by a ring part 411 attached to the front portion of the pipe frame 341, and a handle receiving part 412 provided in the upper front portion of the front swing arm 37.

The action of the handle stand 345 will be described.

Figure 48:
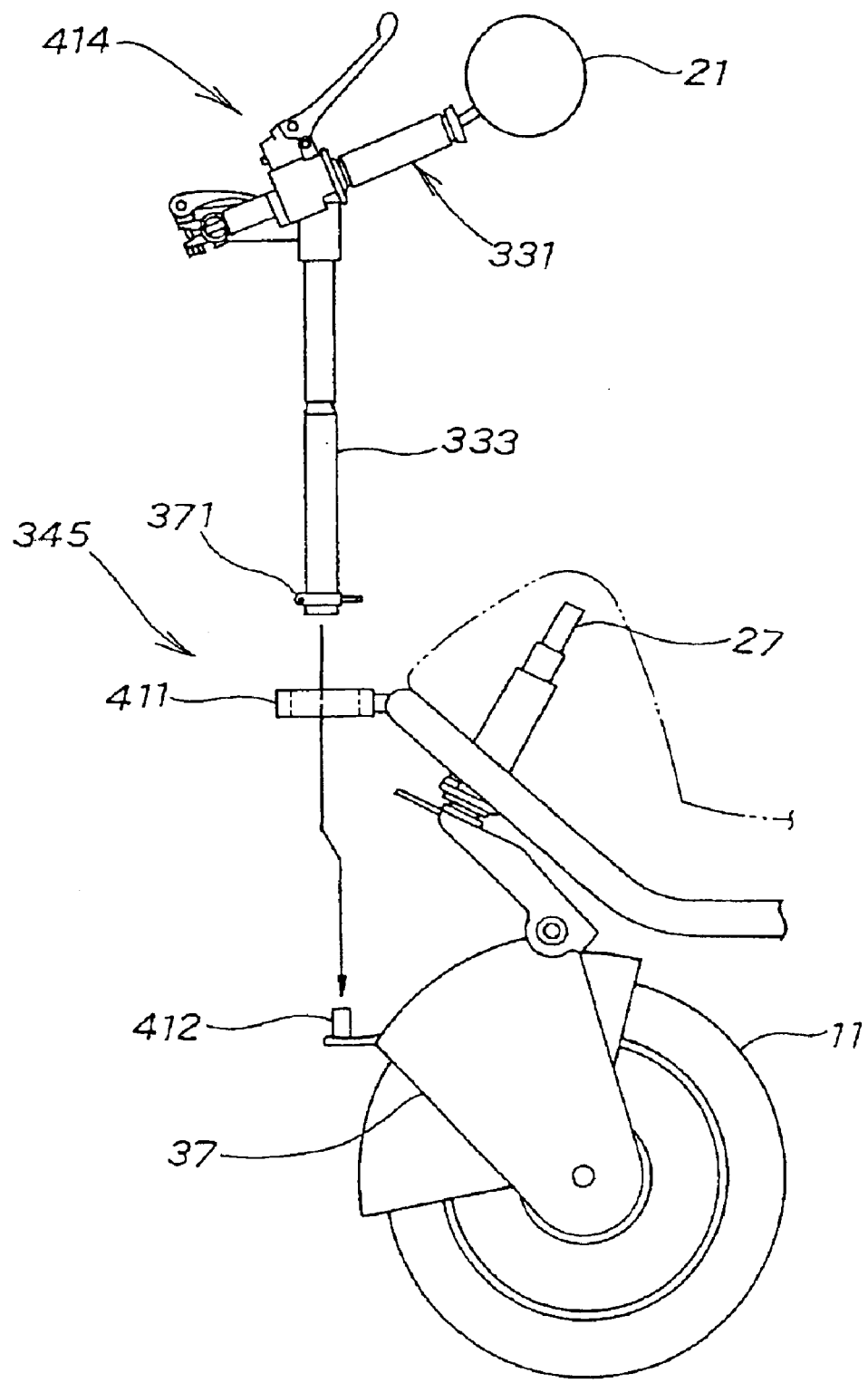
FIG. 48 is an action diagram illustrating the action of a handle stand according to the invention.

FIG. 48 is an action diagram illustrating the action of the handle stand according to the invention.

The handlebars 331 and 332 (the handlebar 332 on the depth side is not shown) and rear-view mirrors 21 and 22 (the rear-view mirror 22 on the depth side is not shown) are folded, a handle assembly 414 detached from the handle shaft 27 by releasing the handle holding mechanism 371 is inserted into the ring part 411 from the lower end side of the handle post 333, and the handle receiving part 412 is fit into the hollow portion at the low end of the handle post 333 and tightened by the quick release mechanism 371, thereby completing attachment of the handle assembly 414 to the handle stand 345.

When the handle receiving part 412 is made of an elastic member such as rubber, an vibration after the folding operation and during carriage is less likely to occur.

Figure 49:
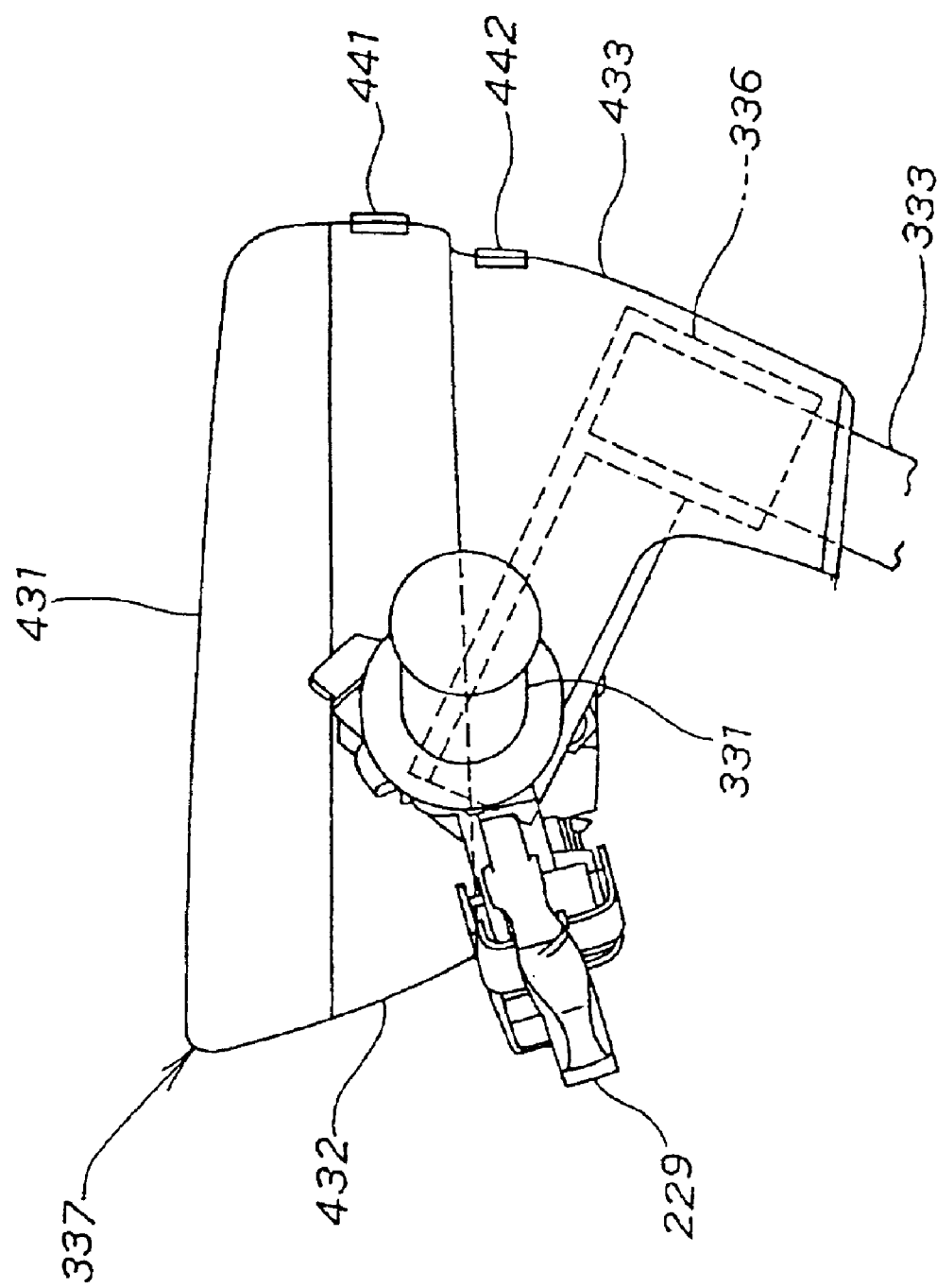
FIG. 49 is a side view showing a portion around the handlebar, for explaining a meter unit of another embodiment of the two-wheel vehicle according to the invention.

FIG. 49 is a side view showing a portion around the handlebar, for explaining the meter unit in the another embodiment of the two-wheel vehicle according to the invention. The meter unit 337 includes an upper case 431, a middle case 432, and a lower case 433.

The upper case 431 has, on its top face, a speed meter which will be described hereinlater.

The middle case 432 is a member which can be formed with the opened upper case 431 into a small-article rack.

The lower case 433 is a member for supporting the upper and middle cases 431 and 432 and covering the handle arm 336.

Figure 50:
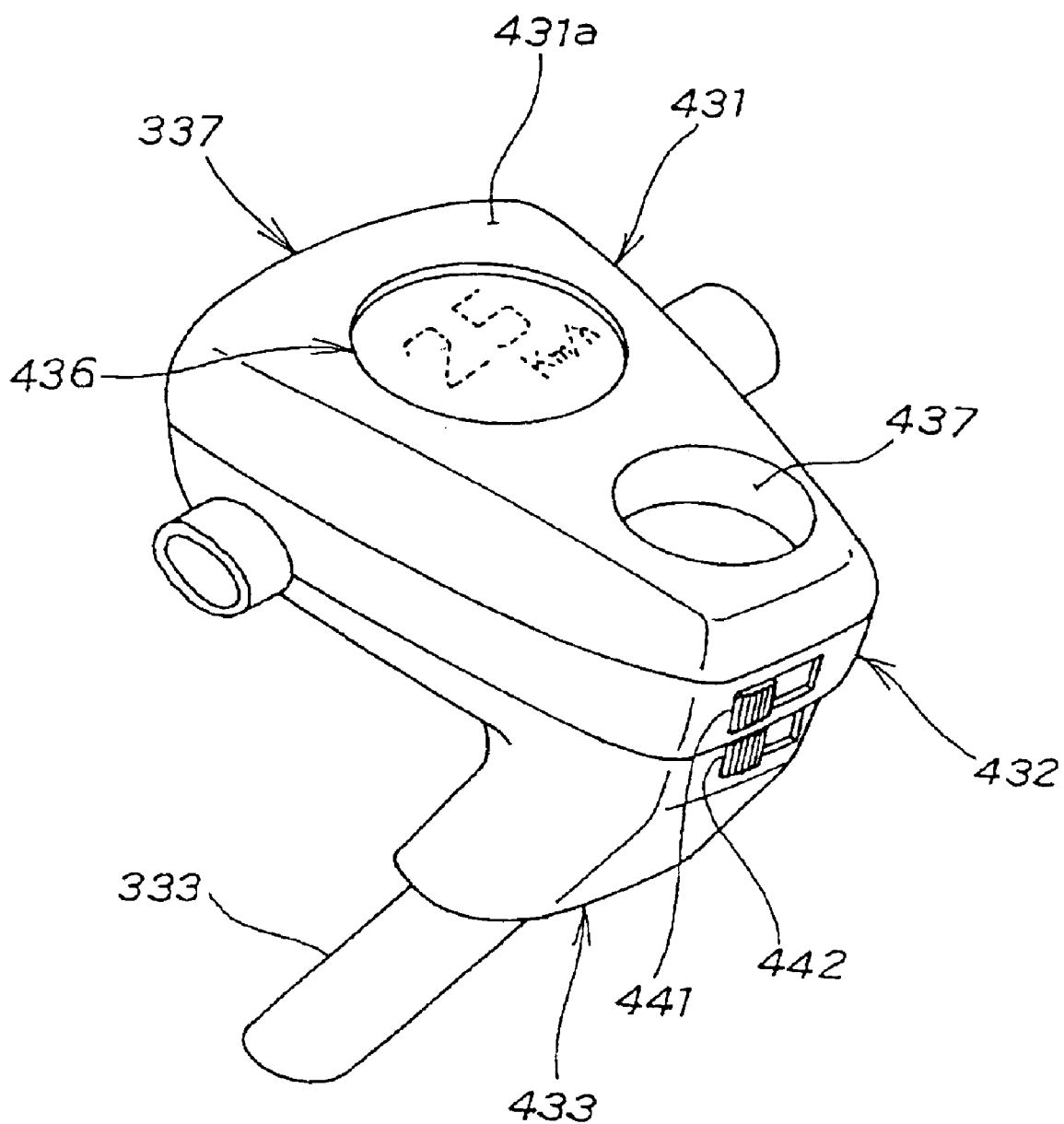
FIG. 50 is a perspective view of the meter unit according to the invention.

FIG. 50 is a perspective view of the meter unit according to the invention and shows that a speed meter 436 (a compact digital speed meter is employed in the example) is provided in the front portion of the top face 431a of the upper case 431 of the meter unit 337, and a through hole 437 in which a soft drink can, a paper cup, a PET bottle, or the like can be held is opened in the rear portion of the upper case 431. Also shown are a first unlocking knob 441 provided in the rear portion of the middle case 432 to open the upper case 431, and a second unlocking knob 442 provided in the rear portion of the lower case 433 to open the middle case 432.

Figure 51:
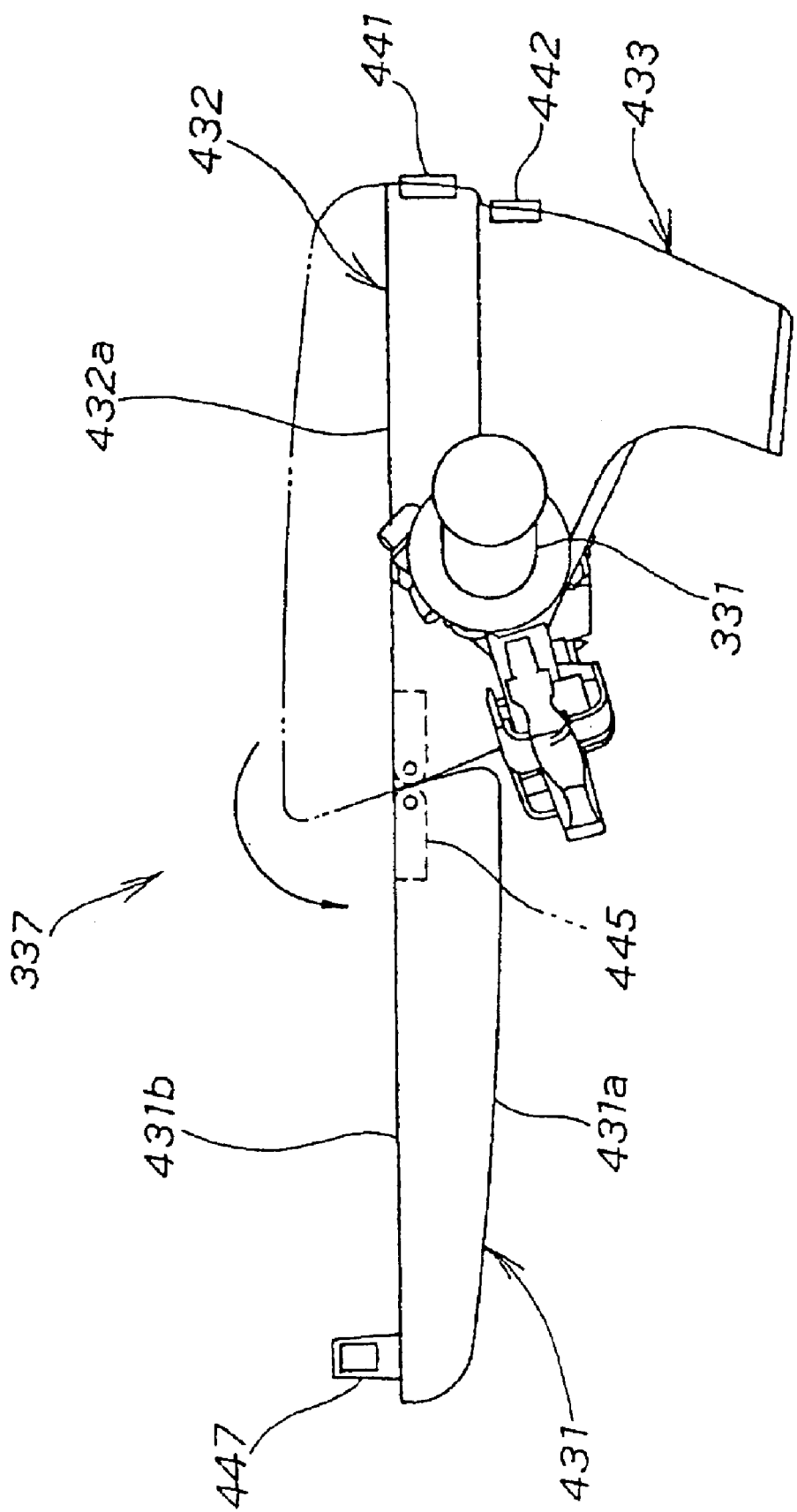
FIG. 51 is a side view for explaining a meter case according to the invention.

FIG. 51 is a side view for explaining a meter case according to the invention, and shows that the upper case 431 is opened by operating the first unlocking knob 441 to form an almost horizontal face by the bottom face 431b of the upper case 431 and the top face 432a of the middle case 432.

By contact between the upper and middle cases 431 and 432, the upper case 431 regulated, and an almost horizontal face is formed by the cases 431 and 432.

445 denotes a hinge attached to the front portion of each of the upper case 431 and lower case 432. In the meter unit 337, a hinge (not shown) similar to the hinge 445 is attached to the front portion of each of the middle case 432 and lower case 433. In association with the configuration, the meter unit in the upper case also swings, which is realized by routing a wire 434 near the hinge 445.

Figure 52:
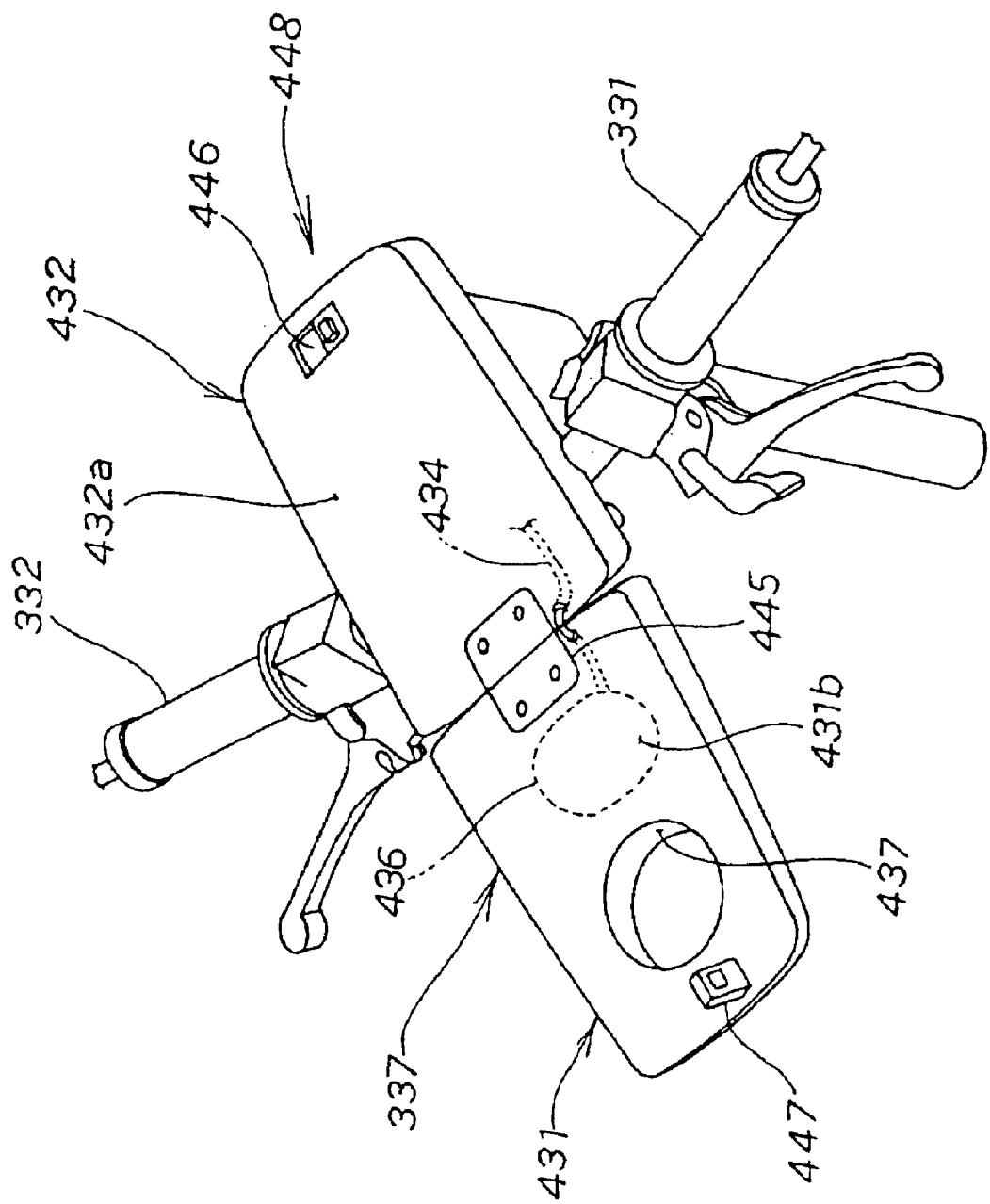
FIG. 52 is a first perspective view for explaining the meter case according to the invention.

FIG. 52 is a first perspective view for explaining the meter case according to the invention, which is a perspective view in the same state as that of the meter unit 337 shown in FIG. 51.

The meter unit 337 is an assembly in which each of the bottom face 431b of the upper case 431 and the top face 432a of the middle case 432 is a flat face, by the bottom face 431b and the top face 432a, a rack for small articles as a space in which small articles are put is formed by the bottom face 431b and the top face 432a, and a through hole 437 serving as a so-called drink holder, which can be used even the upper case 431 is open, is formed in the front portion of the small article rack.

For example, at the time of a meal, the user may stop the two-wheel vehicle 80, sit on the seat, and have a light meal by putting a can of coffee in the drink holder and putting his food, for example, on the small-article rack.

A body 446 and a projection piece 447, respectively, construct a first locking mechanism 448 for locking the upper and middle cases 431 and 432 in a closed state (the details will be described hereinlater).

Figure 53:
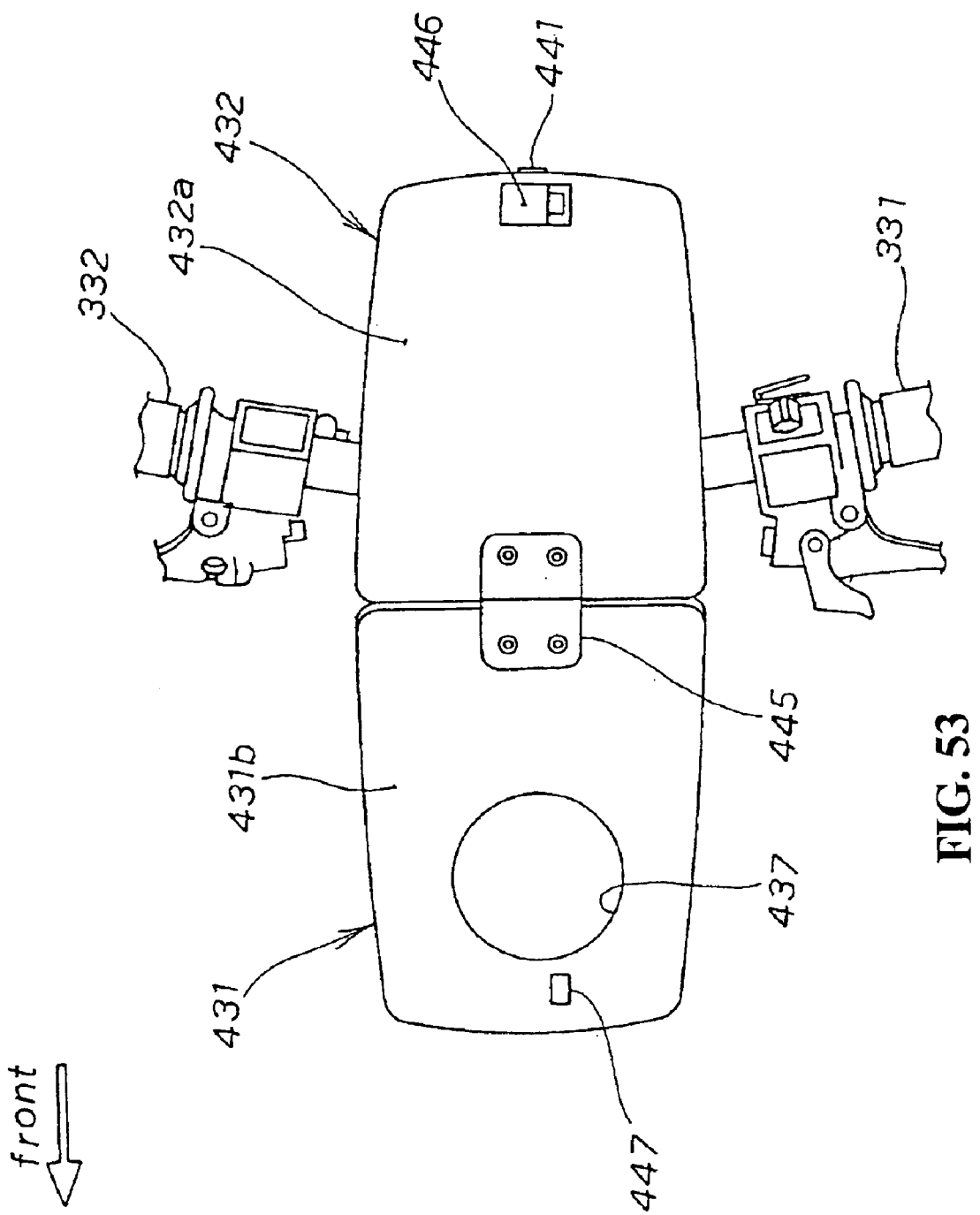
FIG. 53 is a plan view for explaining the meter case according to the invention.

FIG. 53 is a plan view for explaining the meter case according to the invention and shows the same state as that of the meter unit 337 shown in FIGS. 52 and 53.

The small-article rack formed by the bottom face 431b of the upper case 431 and the top face 432a of the middle case 432 has a flat face which is long in the longitudinal direction. The rack in this shape does not disturb the right and left handlebars 332 and 331 as much as conventional a rack, which is typically formed long in the vehicle width direction, and has a relatively large area.

Figure 54:
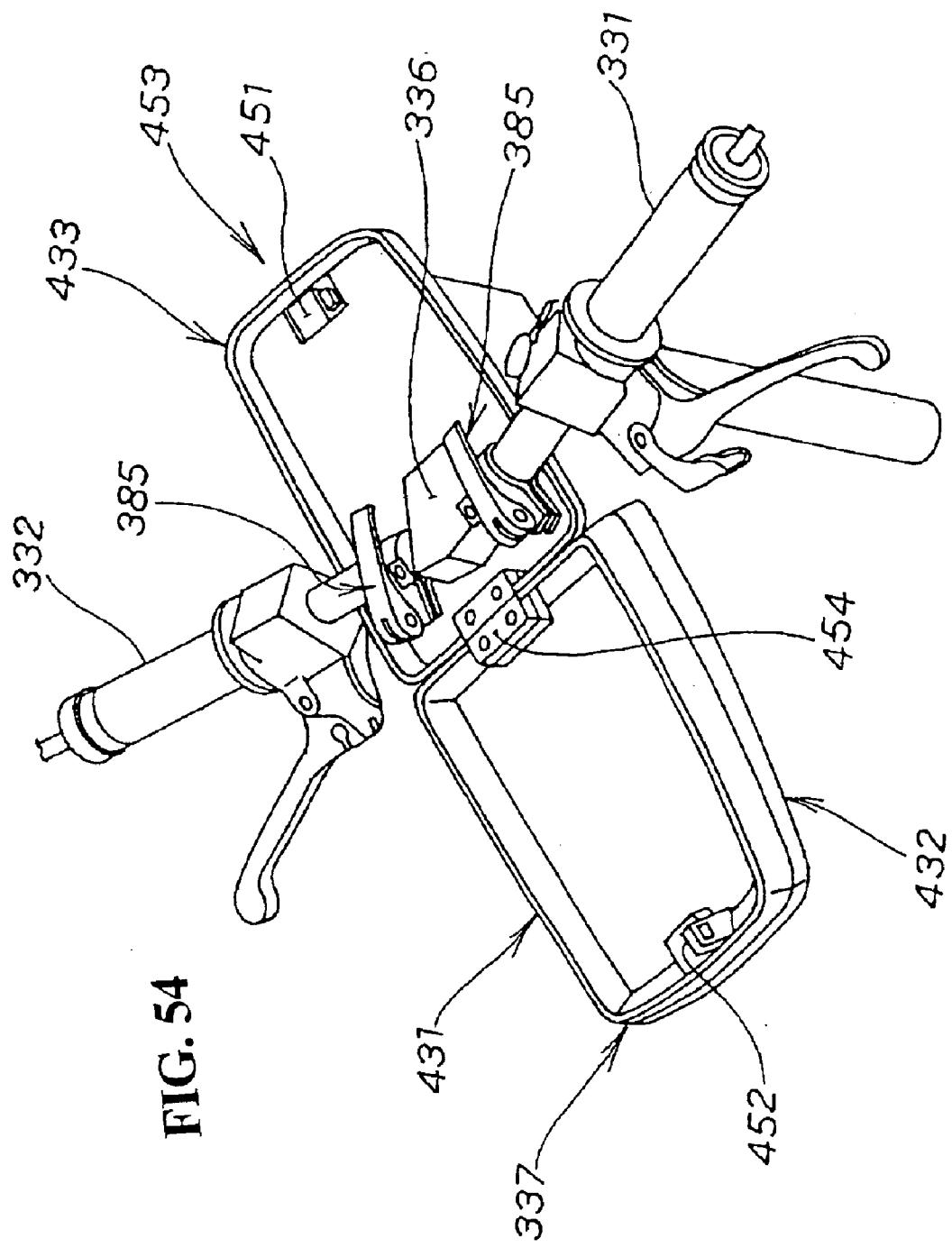
FIG. 54 is a second perspective view for explaining the meter unit according to the invention.

FIG. 54 is a second perspective view for explaining the meter unit according to the invention and shows a state where the middle case 432 is opened integrally with the upper case 431.

When the middle case 432 is opened, the quick release mechanisms 385 and 385 provided between the handlebars 331 and 332 appear. By operating the quick release mechanisms 385 and 385, the handlebars 331 and 332 can be folded. 451 and 452 denote a body and a projection piece, respectively, constructing a second locking mechanism 453 for locking the middle and lower cases 432 and 433 in a closed state, and 454 denotes a hinge provided between the middle and lower cases 432 and 433.

Figures 55A, 55B, 55C:
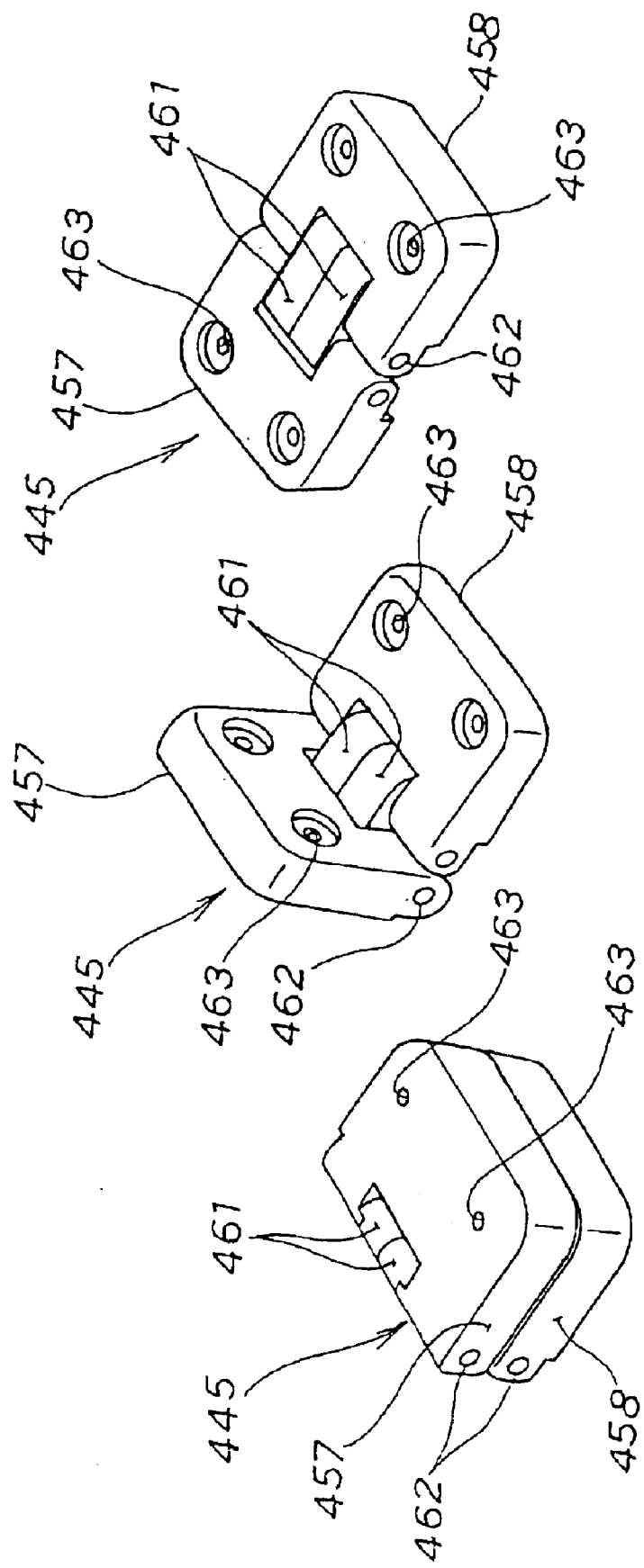
FIGS. 55(a) to 55(c) are explanatory diagram of a hinge of the meter unit according to the invention.

FIGS. 55(a) to 55(c) are diagrams illustrating the hinge of the meter unit according to the invention and with which the hinge 445 will be described. The hinge 454 has the same structure as that of the hinge 445.

FIG. 55(a) shows a state where the hinge 445 is closed. The hinge 445 includes two mounting plates 457 and 458 mounted to the upper case 431 (refer to FIG. 52) and the middle case 432 (refer to FIG. 52), and connecting blocks 461 and 461 for swingably connecting the mounting plates 457 and 458. Also shown are swing shafts 462, and a bolt insertion hole 463 used for mounting.

Since the two mounting plates 457 and 458 can be tightly attached to each other, the space occupied by the hinge 445 in the connecting portion between the upper and middle cases 431 and 432 can be reduced, and the meter unit 337 (refer to FIG. 53) can be therefore constructed compactly.

FIG. 55(b) shows a state where the hinge 445 is half open. FIG. 55(c) shows a state where the hinge 445 is totally open.

In FIGS. 55(a) to 55(c), when the hinge 445 is closed, the mounting plates 457 and 458 are tightly attached to each other so as to make the meter unit 337 compact. When the hinge 445 is totally open, the mounting plates 457 and 458 become a flat plate. Consequently, the hinge 445 can attribute to formation of the small-article rack without a projection.

Figure 56A:
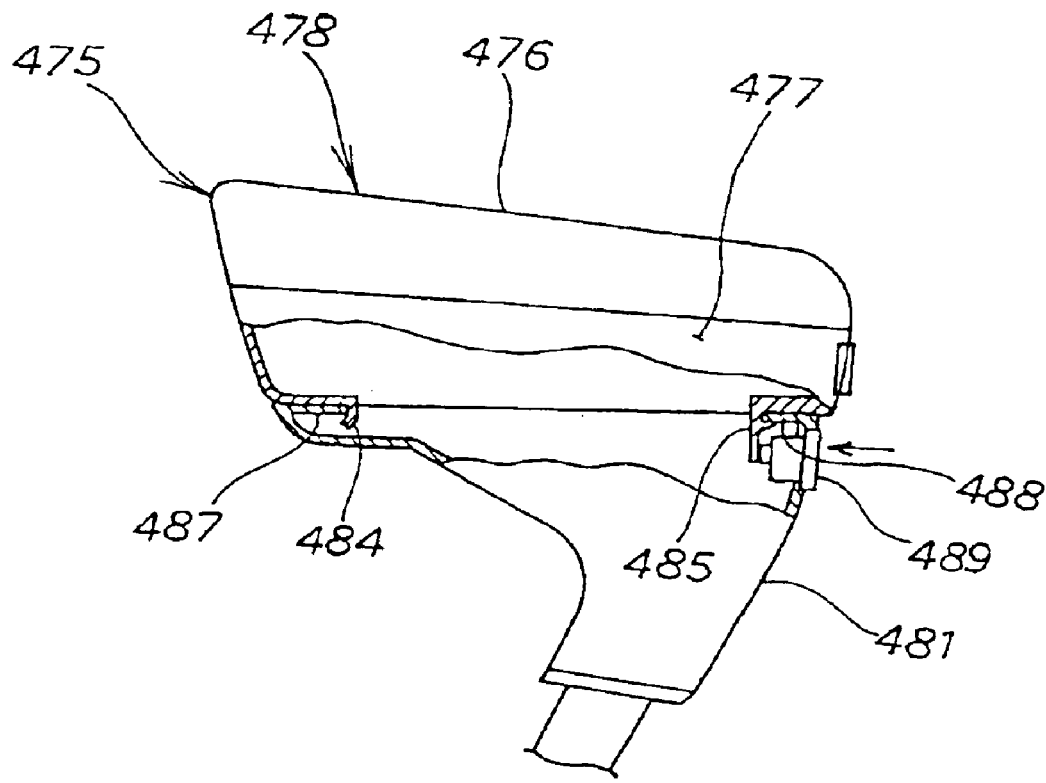
FIGS. 56(a) and 56(b) are explanatory diagrams illustrating a locking mechanism of the meter case according to the invention.
Figure 56B:
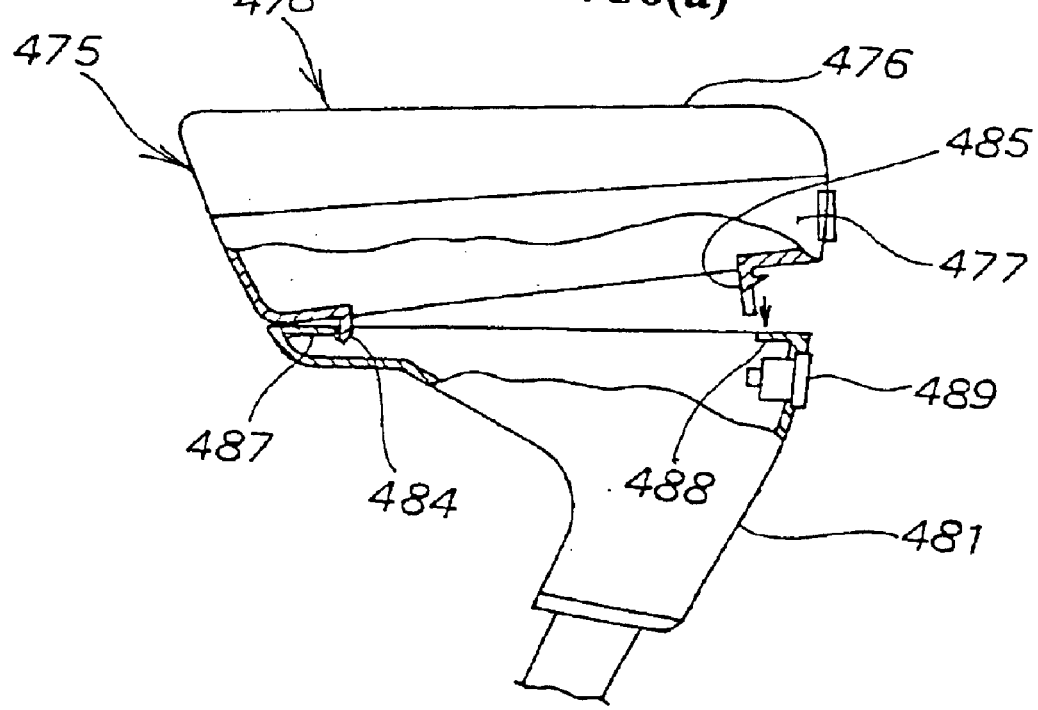

FIGS. 56(a) and 56(b) are explanatory diagrams illustrating the locking mechanism of the meter case according to the invention and with which the first locking mechanism 448 will be described. The second locking mechanism 453 has the same structure as that of the first locking mechanism 448.

In FIG. 56(a), in the case of opening the upper case 431, the first locking mechanism 448 operates the first unlocking knob 441 to cancel the connection between the body 446 and the projection piece 447. In the case of closing and locking the upper case 431, by pushing the upper case 431 toward the middle case 432 side in the direction of the arrow, the body 446 and the projection piece 447 are connected to each other.

FIG. 56(b) is a cross section showing a state where the body 446 and the projection piece 447 are connected to each other. The body 446 has a case 466, a locking piece 467 movably housed in the case 466, a spring 468 for pressing the locking piece 467 to the outside, and the first unlocking knob 441 provided on a side face of the locking piece 467.

The locking piece 467 is a member having a tapered portion 471 at its end so as to be easily connected to the projection piece 447. It is easily connected for the reason that when the projection piece 447 is pressed against the tapered portion 471 from the above, a component of force for pushing the locking piece 467 to the inside against the resilient force of the spring 468 is generated by the tapered portion 471 and applied to the locking piece 467.

The projection piece 447 has a lock hole 472 to which the locking piece 467 of the body 446 is inserted.

Figure 57A:
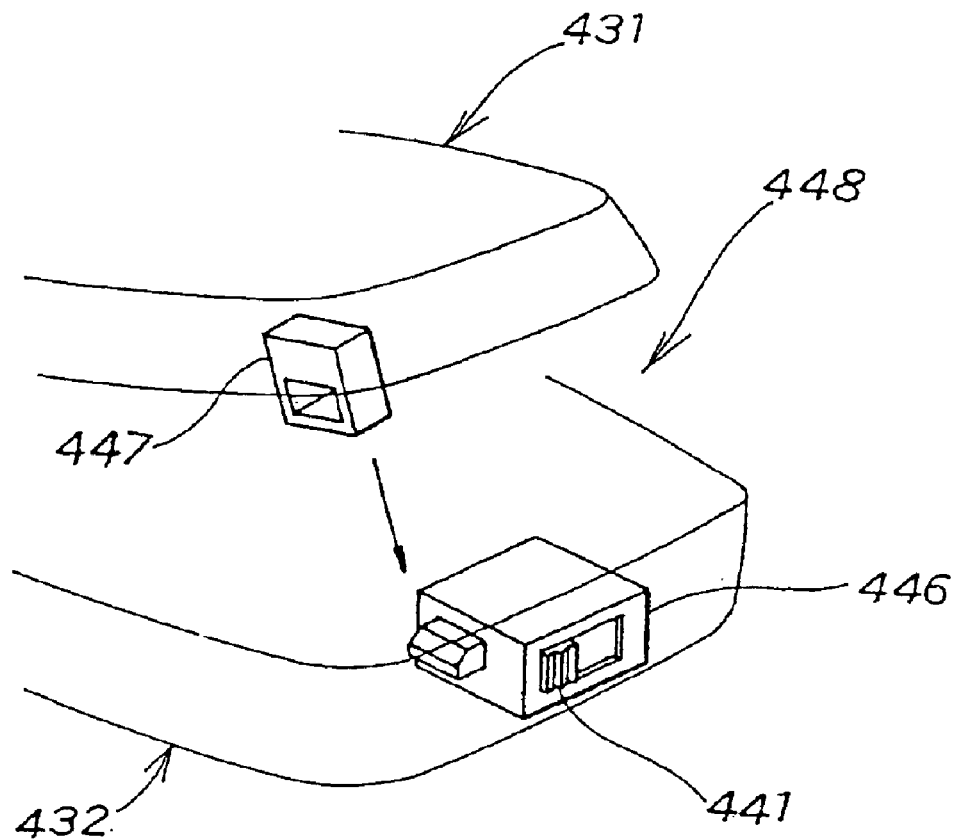
FIGS. 57(a) and 57(b) are explanatory diagrams illustrating another embodiment of the meter unit according to the invention.
Figure 57B:
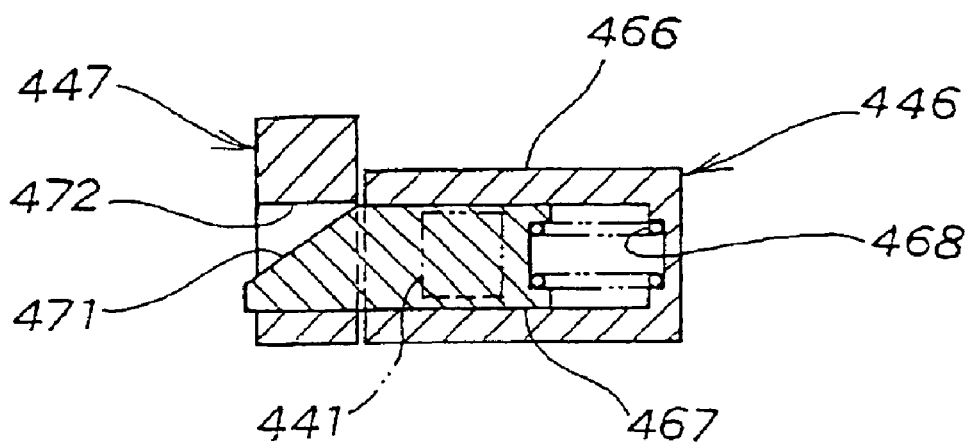

FIGS. 57(a) and 57(b) are explanatory diagrams illustrating another embodiment of the meter unit according to the invention.

In FIG. 57(a), a meter unit 475 is constructed by an upper-half case 478 in which an upper case 476 and a middle case 477 are integrated and a lower-half case 481 to which the upper case 478 is connected.

The front parts of the upper and middle cases 476 and 478 are connected to each other by a hinge in a manner similar to the meter unit 337 (refer to FIG. 49).

The middle case 477 has connecting nails 484 and 485 in its bottom portion.

The lower-half case 481 has receiving portions 487 and 488 to which the connecting nails 484 and 485 of the middle case 477 are connected. 489 denotes a button for pushing the connecting nail 485. By pushing the button 489 in the direction of the arrow, the connecting nail 485 is forcedly elastically deformed to cancel the connection.

In FIG. 57(b), to attach the upper-half case 478 to the lower-half case 481, first, the connecting nail 484 of the upper-half case 478 is retained by the receiving portion 487 of the lower-half case 481. In this state, the rear portion of the upper-half case 478 is pushed down to retain the connecting nail 485 by the receiving portion 488 as shown by the arrow. It completes the attachment of the upper-half case 478 to the lower-half case 481.

As described above, the upper-half case 478 is detachably attached to the lower-half case 481. Consequently, for example, the upper-half case 478 is detached from the lower-half case 481 and, in a place apart from the two-wheel vehicle 80 (refer to FIG. 28), the small-article rack can be formed by opening the upper case 476 in the upper-half case 478 and used.

Figures 58A, 58B, 58C:
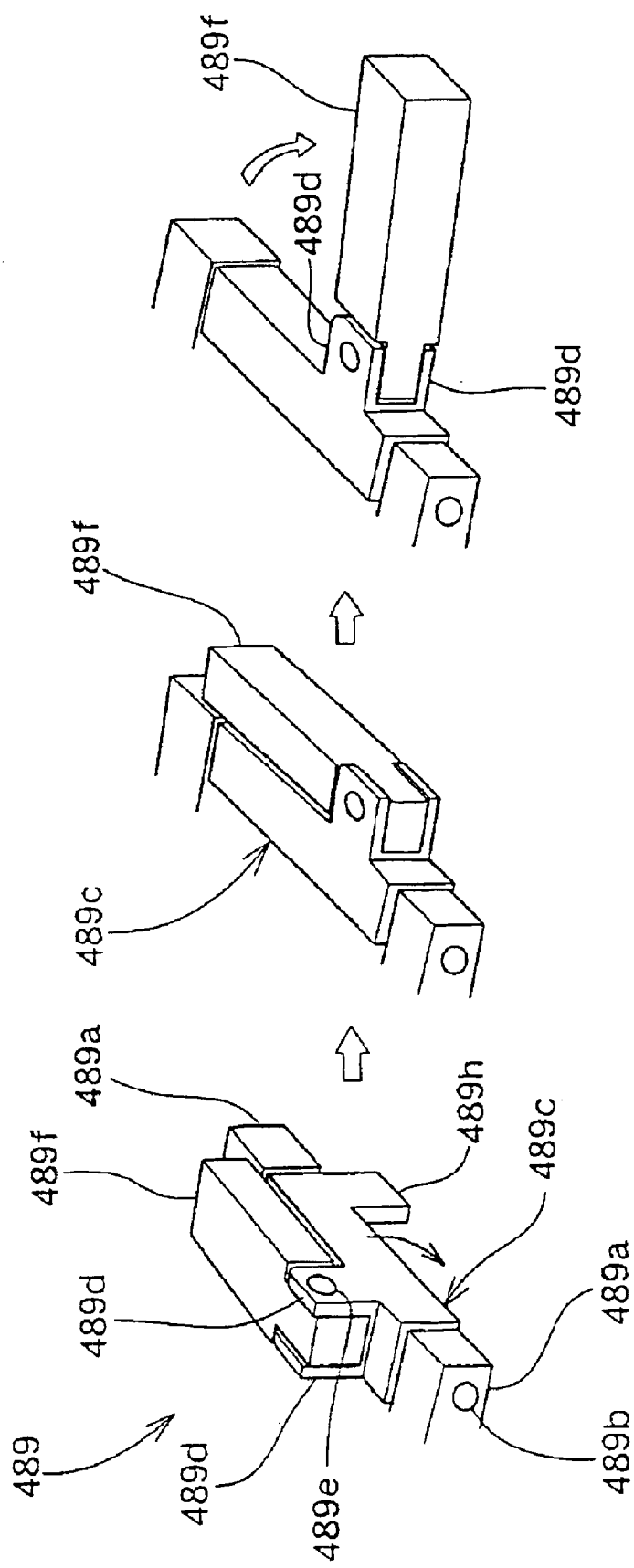
FIGS. 58(a) to 58(c) are explanatory diagrams showing another embodiment of a step of the two-wheel vehicle.

FIGS. 58(a) to 58(c) are explanatory diagrams of another embodiment of the step of the two-wheel vehicle according to the invention.

In FIG. 58(a), a step 489 includes: step supporting portions 489(a) and 489(a) attached to the body frame 25 (refer to FIG. 25) so as to face the sides; a movable portion 489c turnably attached to the step supporting portions 489(a) and 489(a) by spindles 489(b) and 489(b) (the spindle 489(b) on the depth side is not shown); and a step body 489f swingably attached to projected walls 489d and 489d provided in the movable portion 489c by a spindle 489e. Also shown is a stopper 489h for regulating the swing of the movable portion 489c when the movable portion 489c swings.

In the case of using the step 489c, first, the movable portion 489c is allowed to swing in the direction of the arrow. FIG. 58(b) shows a state after the movable portion 489c swings. When the step body 489f is allowed to swing to a side of the vehicle, the state of FIG. 58(c) is resulted. Since the stopper 489h of the movable portion 489c comes into contact with the body frame 25, the movable portion 489c and step body 489f do not swing downward.

The invention described above displays the following effects.

Since the seat holding structure of the two-wheel vehicle includes a seat holding mechanism for holding the seat so as to be rotatable in the horizontal direction at a predetermined height, when the seat is adjusted at the predetermined height so as to be rotatable in the horizontal direction and is adjusted and fixed at another height, by fixing the seat in the driving mode, the riding state can be assured. By adjusting the seat at the predetermined height in a non-driving mode, the seat can be rotated horizontally so that it can be used as a chair. Thus, new attractiveness of a product can be obtained.

Further, the seat holding mechanism is provided with the quick release mechanism for quickly releasing holding of the seat at the scat post, which fixes the seat at the seat post so as not to be rotatable by fitting a bolt of the quick release mechanism into a horizontal groove formed in the seat post at a seat height in a driving mode, and holds the seat at the seat post so as to be rotatable by fitting the bolt into an annular groove formed in the periphery of the seat post at the predetermined height. Consequently, by the quick release mechanism, operation of changing the position in the vertical direction of the seat is facilitated, and with the simple structure of the present invention, the seat can be held either rotatably or fixed.

Still further, the seat holding mechanism includes detecting means for detecting the predetermined height of the seat; and control means for controlling the vehicle so as not to be driven in response to a detection signal generated when the detecting means detects the predetermined height. Therefore, in a state where the seat can be used as a chair, the driving of the vehicle can be prevented.

Lastly, the vehicle body of the two-wheel vehicle is foldable, and the folded two-wheel vehicle is mounted on a four-wheel vehicle. After the two-wheel vehicle is mounted on the four-wheel vehicle, by attaching the seat to the seat post so as to be rotatable in the horizontal direction, the seat can be used as a chair in the four-wheel vehicle. Thus, the value of the onboard two-wheel vehicle can be increased.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A seat holding structure of a two-wheel vehicle, comprising:

a seat post mounted on a body of the vehicle;

a seat mounted on said seat post; and a seat holding mechanism attached to said seat post for holding the seat on the seat post, for changing a position of the seat and fixing the seat at a plurality of predetermined heights in a vertical direction, and also for rotating the seat in a horizontal direction while the seat is fixed at any of the plurality of predetermined heights.

2. The seat holding structure of a two-wheel vehicle according to claim 1, further comprising:

a quick release mechanism for quickly releasing the seat from the seat post, wherein the quick release mechanism is capable of fixing the seat at the seat post so as not to be rotatable by fitting a holding bolt of the quick release mechanism into a horizontal groove formed in the seat post at a seat height when the vehicle is in a driving mode, and also capable of holding the seat at the seat post so as to be rotatable by fitting the holding bolt into an annular groove formed in the periphery of the seat post at the predetermined height.

3. The seat holding structure of a two-wheel vehicle according to claim 2, wherein the horizontal groove is a plurality of horizontal grooves to make a height of the seat adjustable.

4. The seat holding structure of a two-wheel vehicle according to claim 2, further comprising:

base members fixed to an external face of the seat post;

a pin rotatably penetrating walls of the base member; and a lever integrally attached to both ends of the pin, wherein the holding bolt has one end swingably attached to an intermediate portion of the pin and another end in which a male screw is formed for engaging with a nut, the holding bolt being set near to the axis of the seat post by a torsion spring.

5. The seat holding structure of a two-wheel vehicle according to claim 4, wherein movement of the lever allows the holding bolt to swing around the pin and away from the horizontal groove so that the seat can be moved up and down.

6. The seat holding structure of a two-wheel vehicle according to claim 1, the seat holding mechanism comprising:

detecting means for detecting the predetermined height of said seat; and control means for controlling the vehicle so as not to be driven in response to a detection signal generated when the detecting means detects the predetermined height.

7. The seat holding structure of a two-wheel vehicle according to claim 6, wherein the detecting means includes a tip attached to the seat post which presses against a detection piece attached to the seat, the detecting means sends a signal to the control means when the seat is moved up or down from a driving mode height.

8. The seat holding structure of a two-wheel vehicle according to claim 7, wherein the seat is prevented from rotating when the vehicle is in the driving mode.

9. A two-wheel vehicle having said seat holding structure according to claim 1, said two-wheel vehicle comprising:

a vehicle body that is foldable, and when folded, the two-wheel vehicle is mountable on a four-wheel vehicle.

10. The two-wheel vehicle having a seat holding structure according to claim 9, wherein the seat is detachable.

11. A seat holding structure of a two-wheel vehicle, for holding a seat at a seat post and capable of changing a position in a vertical direction of the seat, said seat holding structure comprising:

a seat holding mechanism for holding said seat on the seat post, for changing the position of the seat to a plurality of predetermined heights in the vertical direction, and also for rotating the seat in a horizontal direction while the seat is fixed at any of the plurality of predetermined heights.

12. The seat holding structure of a two-wheel vehicle according to claim 11, further comprising:

a quick release mechanism for quickly releasing the seat from the seat post, wherein the quick release mechanism is capable of fixing the seat at the seat post so as not to be rotatable by fitting a holding bolt of the quick release mechanism into a horizontal groove formed in the seat post at a seat height when the vehicle is in a driving mode, and also capable of holding the seat at the seat post so as to be rotatable by fitting the holding bolt into an annular groove formed in the periphery of the seat post at the predetermined height.

13. The seat holding structure of a two-wheel vehicle according to claim 12, wherein the horizontal groove is a plurality of horizontal grooves to make a height of the seat adjustable.

14. The seat holding structure of a two-wheel vehicle according to claim 12, further comprising:

base members fixed to an external face of the seat post;

a pin rotatably penetrating walls of the base member; and a lever integrally attached to both ends of the pin, wherein the holding bolt has one end swingably attached to an intermediate portion of the pin and another end in which a male screw is formed for engaging with a nut, the holding bolt being set near to the axis of the seat post by a torsion spring.

15. The seat holding structure of a two-wheel vehicle according to claim 14, wherein movement of the lever allows the holding bolt to swing around the pin and away from the horizontal groove so that the seat can be moved up or down.

16. The seat holding structure of a two-wheel vehicle according to claim 11, the seat holding mechanism comprising:

detecting means for detecting the predetermined height of said seat; and control means for controlling the vehicle so as not to be driven in response to a detection signal generated when the detecting means detects the predetermined height.

17. The seat holding structure of a two-wheel vehicle according to claim 16, wherein the detecting means includes a tip attached to the seat post which presses against a detection piece attached to the seat, the detecting means sends a signal to the control means when the seat is moved up or down from a driving mode height.

18. The seat holding structure of a two-wheel vehicle according to claim 17, wherein the seat is prevented from rotating when the vehicle is in the driving mode.

19. A two-wheel vehicle having said seat holding structure according to claim 11, said two-wheel vehicle comprising:

a vehicle body that is foldable and the folded two-wheel vehicle is mountable on a four-wheel vehicle.

20. The two-wheel vehicle having a seat holding structure according to claim 19, wherein the seat is detachable.

* * * * *